United States Patent
Yamada et al.

(10) Patent No.: US 6,940,853 B2
(45) Date of Patent: Sep. 6, 2005

(54) DATAGRAM RELAYING APPARATUS WITH LOAD DISTRIBUTING FUNCTION

(75) Inventors: Kenshin Yamada, Tokyo (JP); Yasuhiro Miyao, Tokyo (JP); Motoo Nishihara, Tokyo (JP)

(73) Assignee: Juniper Networks, Inc., Sunnyvale, CA (US)

( * ) Notice: Subject to any disclaimer, the term of this patent is extended or adjusted under 35 U.S.C. 154(b) by 752 days.

(21) Appl. No.: 09/752,461

(22) Filed: Jan. 3, 2001

(65) Prior Publication Data

US 2001/0007557 A1 Jul. 12, 2001

(30) Foreign Application Priority Data

Jan. 11, 2000 (JP) .................................... 2000-006205

(51) Int. Cl.[7] .............................................. H04L 12/56
(52) U.S. Cl. ...................... 370/389; 370/428; 709/242; 711/216
(58) Field of Search ................................ 370/389, 400, 370/401, 395.1, 396, 397, 399, 398, 428, 230–235, 228, 218; 709/238–242, 703, 229; 711/216

(56) References Cited

U.S. PATENT DOCUMENTS 5,912,877 A * 6/1999 Shirai et al. ................ 370/228
6,081,506 A * 6/2000 Buyukkoc et al. .......... 370/235
6,195,680 B1 * 2/2001 Goldszmidt et al. ........ 709/203

FOREIGN PATENT DOCUMENTS

| JP | H60-64551 A | 4/1985 |
|---|---|---|
| JP | H03-112238 A | 5/1991 |
| JP | H04-117745 A | 4/1992 |
| JP | 7-115434 | 5/1995 |
| JP | 10-198642 | 7/1998 |
| JP | H63-275442 A | 11/1998 |
| JP | 11-239181 | 8/1999 |
| JP | H11-355310 A | 12/1999 |

* cited by examiner

Primary Examiner—John Pezzlo
(74) Attorney, Agent, or Firm—Harrity & Snyder, LLP

(57) ABSTRACT

A datagram relaying apparatus includes a plurality of protocol terminating units, and a destination determining processor. The destination determining processor includes a path selecting section which determines a transfer destination route for a stream of packets received from any of the protocol terminating units. The path selecting section determines whether or not transfer of the received stream of packets to the transfer destination route is in an inhibition state, and selects another transfer destination route when the transfer of the packet to the transfer destination route is in the inhibition state.

49 Claims, 32 Drawing Sheets

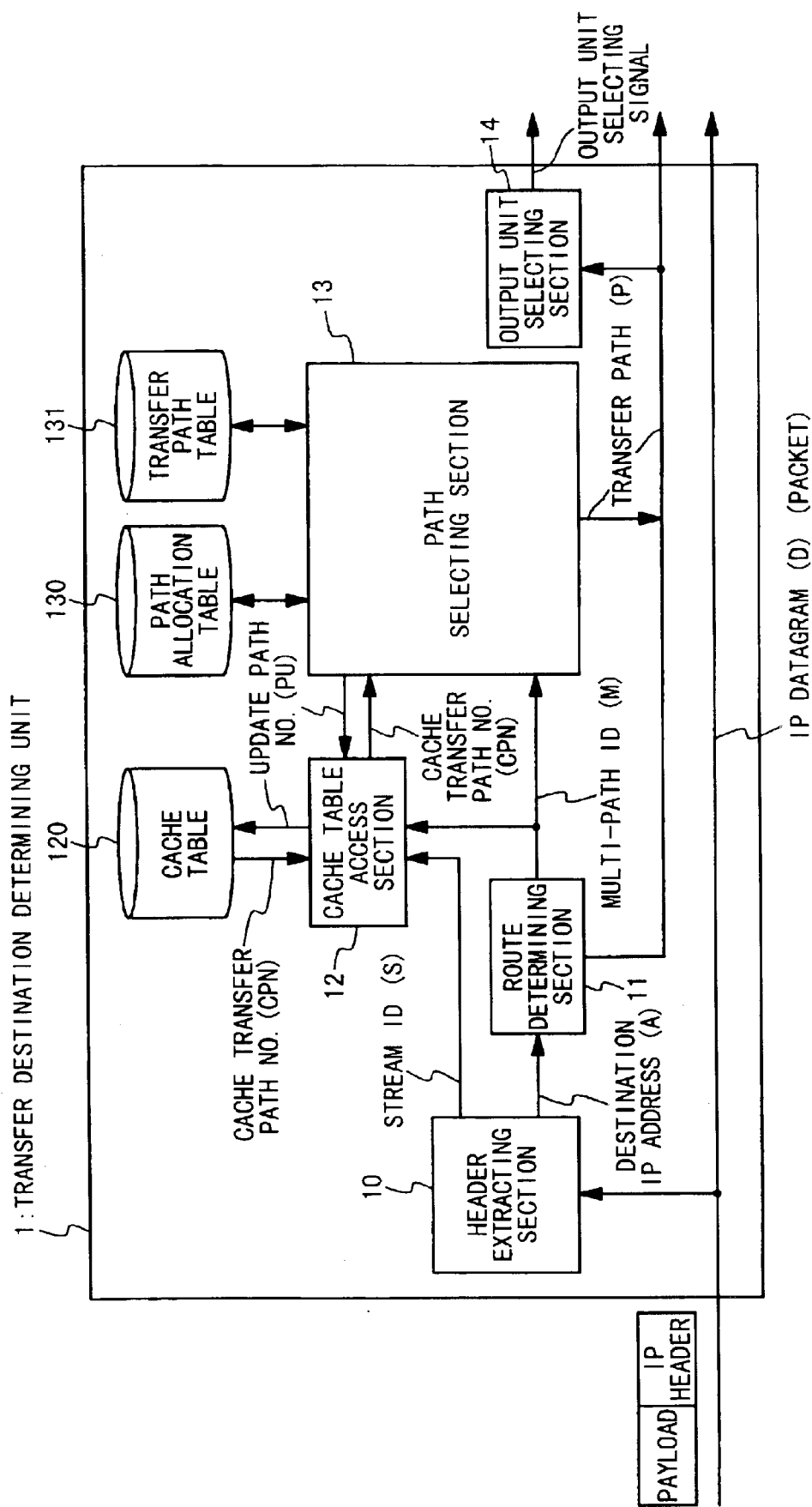

Fig. 8

120: CACHE TABLE

| ADDRESS SECTION | | DATA SECTION |
|---|---|---|
| MULTI-PATH ID (M) | STREAM ID (S) | CACHE TRANSFER PATH NO. (CPN) |
| 0 | 000 | 1 |
| | 001 | 2 |
| | 002 | 0 |
| | 003 | NON REGISTERED |
| | 004 | NON REGISTERED |
| | 005 | 0 |
| | ⋮ | ⋮ |
| | FFF | 3 |
| 1 | 000 | 1 |
| | 001 | NON REGISTERED |
| | 002 | 2 |

Fig. 9

130: PATH ALLOCATION TABLE

| ADDRESS SECTION | DATA SECTION | | | |
|---|---|---|---|---|
| MULTI-PATH ID (M) | TRANSFER INHIBITION BIT SEQUENCE (PX) | ALLOCATION INHIBITION BIT SEQUENCE (AX) | TRANSFER ALLOCATION PATH NO. (PA) | CONTINUOUS ALLOCATION COUNT (PS) |
| 0 | 00000000 | 00000000 | 1 | 1 |
| 1 | 11110000 | 11110000 | 2 | 2 |
| 2 | 11110010 | 11110010 | 3 | 0 |
| 3 | 11111001 | 11111001 | 3 | 0 |

CORRESPONDING TO PN = 7

CORRESPONDING TO PN = 0

Fig. 10

131: TRANSFER PATH TABLE

| ADDRESS SECTION | | DATA SECTION | | | |
|---|---|---|---|---|---|
| MULTI-PATH ID (M) | TRANSFER PATH NO. (PN) | ALLOCATION STREAM COUNT (PC) | MAX. STREAM COUNT (PH) | MAX. CONTINUOUS ALLOCATION COUNT (PW) | TRANSFER PATH (P) |
| 0 | 0 | 600 | 3 × 256 | 3 | PATH 0-0 |
| 0 | 1 | 650 | 3 × 256 | 3 | PATH 0-1 |
| 0 | 2 | 1000 | 5 × 256 | 5 | PATH 0-2 |
| 0 | 3 | 1200 | 5 × 256 | 5 | PATH 0-3 |
| 0 | 4 | 0 | 0 | 0 | NONE |
| 0 | 5 | 0 | 0 | 0 | NONE |
| 0 | 6 | 0 | 0 | 0 | NONE |
| 0 | 7 | 0 | 0 | 0 | NONE |
| 1 | 0 | 1500 | 6 × 256 | 1 | PATH 1-0 |
| 1 | 1 | | | | |
| 1 | 2 | | | | |
| 1 | 3 | | | | |

130: PATH ALLOCATION TABLE

| ADDRESS SECTION | DATA SECTION | | | |
|---|---|---|---|---|
| MULTI-PATH ID (M) | TRANSFER INHIBITION BIT SEQUENCE (PX) | ALLOCATION INHIBITION BIT SEQUENCE (AX) | TRANSFER ALLOCATION PATH NO. (PA) | CONTINUOUS ALLOCATION COUNT (PS) |
| 0 | 11100000 | 11100000 | 0 | 0 |

Fig. 14

131: TRANSFER PATH TABLE

| ADDRESS SECTION | | DATA SECTION | | | |
|---|---|---|---|---|---|
| MULTI-PATH ID (M) | TRANSFER PATH NO. (PN) | ALLOCATION STREAM COUNT (PC) | MAX. STREAM COUNT (PH) | MAX. CONTINUOUS ALLOCATION COUNT (PW) | TRANSFER PATH (P) |
| 0 | 0 | 0 | 2 × 256 | 2 | PATH 0-0 |
|  | 1 | 0 | 3 × 256 | 3 | PATH 0-1 |
|  | 2 | 0 | 5 × 256 | 5 | PATH 0-2 |
|  | 3 | 0 | 5 × 256 | 5 | PATH 0-3 |
|  | 4 | 0 | 1 × 256 | 1 | PATH 0-4 |
|  | 5 | 0 | 0 | 0 | NONE |
|  | 6 | 0 | 0 | 0 | NONE |
|  | 7 | 0 | 0 | 0 | NONE |

Fig. 15

130: PATH ALLOCATION TABLE

| ADDRESS SECTION | DATA SECTION | | | |
|---|---|---|---|---|
| MULTI-PATH ID (M) | TRANSFER INHIBITION BIT SEQUENCE (PX) | ALLOCATION INHIBITION BIT SEQUENCE (AX) | TRANSFER ALLOCATION PATH NO. (PA) | CONTINUOUS ALLOCATION COUNT (PS) |
| 0 | 11100000 | 11111111 | - | - |

Fig. 16

131: TRANSFER PATH TABLE

| ADDRESS SECTION | | DATA SECTION | | | |
|---|---|---|---|---|---|
| MULTI-PATH ID (M) | TRANSFER PATH NO. (PN) | ALLOCATION STREAM COUNT (PC) | MAX. STREAM COUNT (PH) | MAX. CONTINUOUS ALLOCATION COUNT (PW) | TRANSFER PATH (P) |
| 0 | 0 | 2 × 256 | 2 × 256 | 0 | PATH 0-0 |
| | 1 | 3 × 256 | 3 × 256 | 0 | PATH 0-1 |
| | 2 | 5 × 256 | 5 × 256 | 0 | PATH 0-2 |
| | 3 | 5 × 256 | 5 × 256 | 0 | PATH 0-3 |
| | 4 | 1 × 256 | 1 × 256 | 0 | PATH 0-4 |
| | 5 | 0 | 0 | 0 | NONE |
| | 6 | 0 | 0 | 0 | NONE |
| | 7 | 0 | 0 | 0 | NONE |

Fig. 17

130: PATH ALLOCATION TABLE

| ADDRESS SECTION | DATA SECTION | | | |
|---|---|---|---|---|
| MULTI-PATH ID (M) | TRANSFER INHIBITION BIT SEQUENCE (PX) | ALLOCATION INHIBITION BIT SEQUENCE (AX) | TRANSFER ALLOCATION PATH NO. (PA) | CONTINUOUS ALLOCATION COUNT (PS) |
| 0 | 11001100 | 11001110 | 0 | 0 |

Fig. 18

131: TRANSFER PATH TABLE

| ADDRESS SECTION | | DATA SECTION | | | |
|---|---|---|---|---|---|
| MULTI-PATH ID (M) | TRANSFER PATH NO. (PN) | ALLOCATION STREAM COUNT (PC) | MAX. STREAM COUNT (PH) | MAX. CONTINUOUS ALLOCATION COUNT (PW) | TRANSFER PATH (P) |
| 0 | 0 | 2 × 256 | 4 × 256 | 2 | PATH 0-0 |
| | 1 | 3 × 256 | 3 × 256 | 0 | PATH 0-1 |
| | 2 | 5 × 256 | 3 × 256 | 0 | PATH 0-2 |
| | 3 | 5 × 256 | 0 | 0 | (PATH 0-3) |
| | 4 | 1 × 256 | 4 × 256 | 3 | PATH 0-4 |
| | 5 | 0 | 1 × 256 | 1 | PATH 0-5 |
| | 6 | 0 | 0 | 0 | NONE |
| | 7 | 0 | 0 | 0 | NONE |

134: CHANNEL PATH TABLE

| ADDRESS SECTION | DATA SECTION | |
|---|---|---|
| CHANNEL ID (C) | MULTI-PATH ID (M) | TRANSFER PATH NO. (PN) |
| 0 | 0 | 0 |
| 1 | 0 | 1 |
| 2 | 1 | 0 |
| 3 | 1 | 1 |
| 4 | 1 | 2 |
| 5 | 2 | 0 |
| 6 | 2 | 1 |
| 7 | 2 | 2 |

Fig. 22

132: PATH ALLOCATION TABLE

| ADDRESS SECTION | | DATA SECTION | | | | |
|---|---|---|---|---|---|---|
| MULTI-PATH ID (M) | OPERATION MODE (AM) | TRANSFER PATH STATUS BIT SEQUENCE (PD) | TRANSFER INHIBITION BIT SEQUENCE (PX) | ALLOCATION INHIBITION BIT SEQUENCE (AX) | TRANSFER ALLOCATION PATH NO. (PA) | CONTINUOUS ALLOCATION COUNT (PS) |
| 0 | NORMAL | 11111100 | 11111100 | 11111111 | 0 | 0 |
| 1 | NORMAL | 11111000 | 11111000 | 11111111 | 0 | 0 |
| 2 | NORMAL | 11111000 | 11111000 | 11111111 | 0 | 0 |

Fig. 23

133: TRANSFER PATH TABLE

| ADDRESS SECTION | | DATA SECTION | | | |
|---|---|---|---|---|---|
| MULTI-PATH ID (M) | TRANSFER PATH NO. (PN) | ALLOCATION STREAM COUNT (PC) | MAX. STREAM COUNT (PH) | MAX. CONTINUOUS ALLOCATION COUNT (PW) | TRANSFER PATH (P) |
| 0 | 0 | 2048 | 2048 | 1 | PATH 0-0 |
|   | 1 | 2048 | 2048 | 1 | PATH 0-1 |
|   | 2 | 0 | 0 | 0 | NONE |
|   | 3 | 0 | 0 | 0 | NONE |
|   | 4 | 0 | 0 | 0 | NONE |
|   | 5 | 0 | 0 | 0 | NONE |
|   | 6 | 0 | 0 | 0 | NONE |
|   | 7 | 0 | 0 | 0 | NONE |
| 1 | 0 | 1365 | 1365 | 1 | PATH 1-0 |
|   | 1 | 1365 | 1365 | 1 | PATH 1-1 |
|   | 2 | 1366 | 1366 | 1 | PATH 1-2 |
|   | 3 | 0 | 0 | 0 | NONE |
|   | 4 | 0 | 0 | 0 | NONE |
|   | 5 | 0 | 0 | 0 | NONE |
|   | 6 | 0 | 0 | 0 | NONE |
|   | 7 | 0 | 0 | 0 | NONE |
| 2 | 0 | 1365 | 1365 | 1 | PATH 2-0 |
|   | 1 | 1365 | 1365 | 1 | PATH 2-1 |
|   | 2 | 1366 | 1366 | 1 | PATH 2-2 |
|   | 3 | 0 | 0 | 0 | NONE |
|   | 4 | 0 | 0 | 0 | NONE |
|   | 5 | 0 | 0 | 0 | NONE |
|   | 6 | 0 | 0 | 0 | NONE |
|   | 7 | 0 | 0 | 0 | NONE |

Fig. 24

132: PATH ALLOCATION TABLE

| ADDRESS SECTION | DATA SECTION | | | | | |
|---|---|---|---|---|---|---|
| MULTI-PATH ID (M) | OPERATION MODE (AM) | TRANSFER PATH STATUS BIT SEQUENCE (PD) | TRANSFER INHIBITION BIT SEQUENCE (PX) | ALLOCATION INHIBITION BIT SEQUENCE (AX) | TRANSFER ALLOCATION PATH NO. (PA) | CONTINUOUS ALLOCATION COUNT (PS) |
| 0 | NORMAL | 11111100 | 11111100 | 11111111 | 0 | 0 |
| 1 | NORMAL | 11111000 | 11111000 | 11111111 | 0 | 0 |
| 2 | FAULT STATE | 11111001 | 11111000 | 11111111 | 0 | 0 |

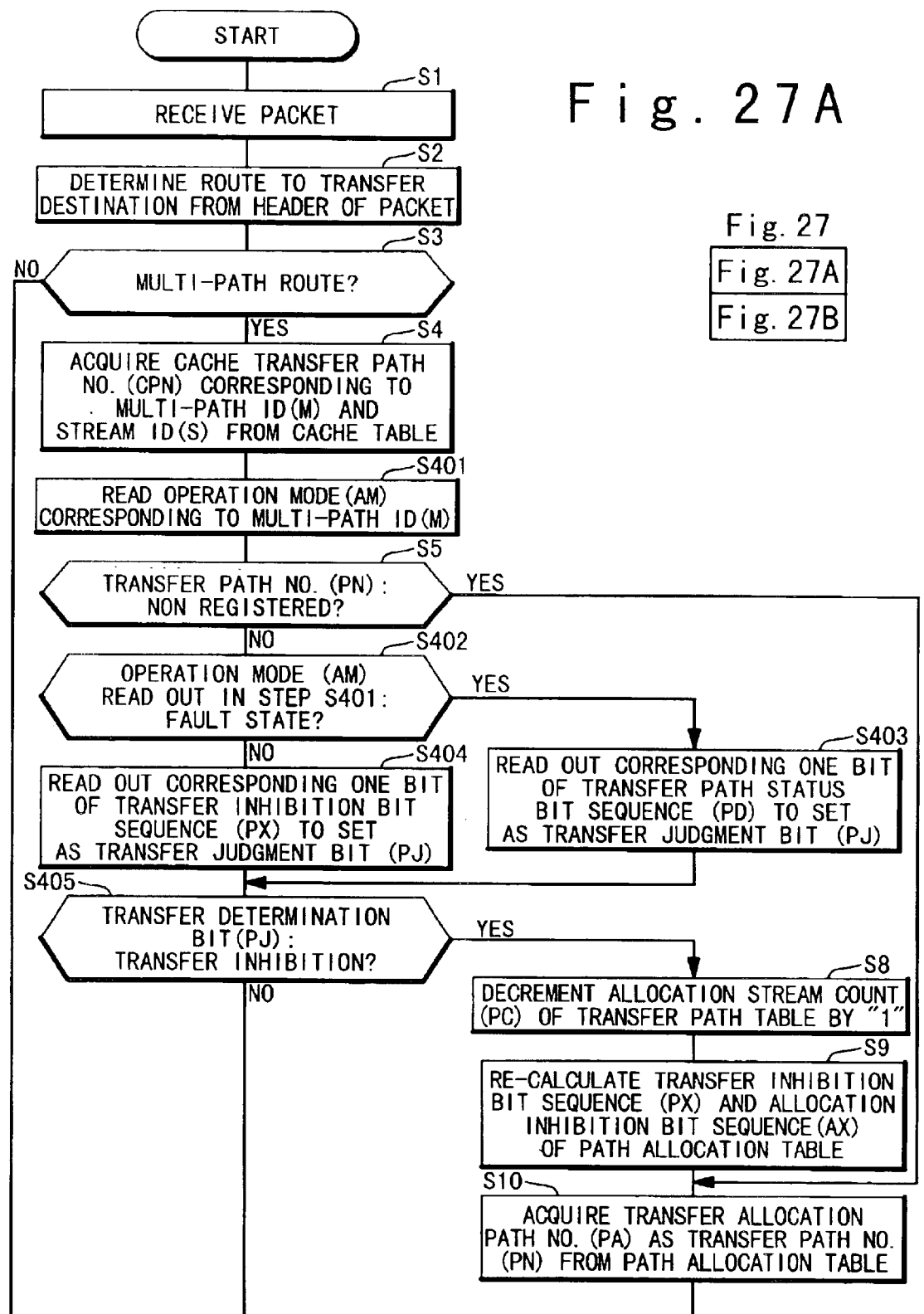

Fig. 31

135: PATH ALLOCATION TABLE

| ADDRESS SECTION | DATA SECTION | | | |
|---|---|---|---|---|
| MULTI-PATH ID (M) | USE PATH BIT SEQUENCE (UP) | TRANSFER INHIBITION BIT SEQUENCE (PX) | ALLOCATION INHIBITION BIT SEQUENCE (AX) | TRANSFER ALLOCATION PATH NO. (PA) | CONTINUOUS ALLOCATION COUNT (PS) |
| 0 | 11111100 | 11111100 | 11111111 | 0 | 0 |
| 1 | 11100011 | 11100011 | 11111111 | 0 | 0 |
| 2 | 00011111 | 00011111 | 11111111 | 0 | 0 |

Fig. 32

136: TRANSFER PATH TABLE

| ADDRESS SECTION | | DATA SECTION | | |
|---|---|---|---|---|
| MULTI-PATH ID (M) | TRANSFER PATH NO. (PN) | ALLOCATION STREAM COUNT (PC) | MAX. STREAM COUNT (PH) | MAX. CONTINUOUS ALLOCATION COUNT (PW) |
| 0 | 0 | 2048 | 2048 | 1 |
| | 1 | 2048 | 2048 | 1 |
| | 2 | 0 | 0 | 0 |
| | 3 | 0 | 0 | 0 |
| | 4 | 0 | 0 | 0 |
| | 5 | 0 | 0 | 0 |
| | 6 | 0 | 0 | 0 |
| | 7 | 0 | 0 | 0 |
| 1 | 0 | 0 | 0 | 0 |
| | 1 | 0 | 0 | 0 |
| | 2 | 1365 | 1365 | 1 |
| | 3 | 1365 | 1365 | 1 |
| | 4 | 1366 | 1366 | 1 |
| | 5 | 0 | 0 | 0 |
| | 6 | 0 | 0 | 0 |
| | 7 | 0 | 0 | 0 |
| 2 | 0 | 0 | 0 | 0 |
| | 1 | 0 | 0 | 0 |
| | 2 | 0 | 0 | 0 |
| | 3 | 0 | 0 | 0 |
| | 4 | 0 | 0 | 0 |
| | 5 | 1365 | 1365 | 1 |
| | 6 | 1365 | 1365 | 1 |
| | 7 | 1366 | 1366 | 1 |

Fig. 33

137: TRANSFER PATH STATUS TABLE

| TRANSFER PATH STATUS BIT SEQUENCE (PD) |
|---|
| 00000000 |

Fig. 34

135: PATH ALLOCATION TABLE

| ADDRESS SECTION | DATA SECTION | | | | |
|---|---|---|---|---|---|
| MULTI-PATH ID (M) | USE PATH BIT SEQUENCE (UP) | TRANSFER INHIBITION BIT SEQUENCE (PX) | ALLOCATION INHIBITION BIT SEQUENCE (AX) | TRANSFER ALLOCATION PATH NO. (PA) | CONTINUOUS ALLOCATION COUNT (PS) |
| 0 | 11111100 | 11111100 | 11111111 | 0 | 0 |
| 1 | 11100011 | 11100011 | 11111111 | 0 | 0 |
| 2 | 00011111 | 00011111 | 11111111 | 0 | 0 |

Fig. 35

137: TRANSFER PATH STATUS TABLE

| TRANSFER PATH STATUS BIT SEQUENCE (PD) |
|---|
| 00000000 |

DATAGRAM RELAYING APPARATUS WITH LOAD DISTRIBUTING FUNCTION

BACKGROUND OF THE INVENTION

1. Field of the Invention

The present invention relates to a datagram transfer apparatus and a datagram transfer method for executing a transfer destination determining process.

2. Description of the Related Art

Conventionally, the allocation of a load to a plurality of resources has been mainly developed in a field such as a load distribution within a client side proxy server firm on Web and selection of a rendezvous point in PIM-SM (Protocol Independent Multicast-Sparse Mode) that is one of multicast routing protocols. On the other hand, recently, the quick increase of Internet traffic makes data transmission in sufficient traffic difficult, even if only a TDM (Time Division Multiplexing) rate is increased in a link between routers, as in OC (Optical Carrier)-48 or OC-192. For this reason, a configuration in which a plurality of DWDM (Dense Wavelength Division Multiplexer) channels are set in parallel is already introduced in North America.

FIG. 1 shows an example of the configuration in which a plurality of DWDM channels are set in parallel. Referring to FIG. 1, data transfer apparatuses 100a to 100f have optical wave communication apparatuses 101a to 101f, respectively. The data transfer apparatuses 100a to 100f are connected by the plurality of optical wave channels through the optical wave communication apparatuses so that an optical wave link is established. Therefore, in FIG. 1, a router receiving a packet needs to select a router to be next transferred and additionally to select one of a plurality of paths connected to the selected router.

As another technique for data transmission in a sufficient throughput, an MPLS (MultiProtocol Label Switching) based traffic engineering is studied. This technique is aimed at optimization of load balance in a network or speed-up of a fault recovery in a complicated IP backbone network to which a recent topology technique is applied. For this purpose, a plurality of label switching paths (LSP) are set between an input router and an output router in the same area to accurately control a load without conventional destination address based transfer and a shortest path routing. FIG. 2 shows the configuration of a network of the MPLS-based traffic engineering as mentioned above. Referring to FIG. 2, two routers are used as an input router and an output router and two of LSP1 and LSP2 are allocated between the input router and output router. Also, a distribution ratio allocated to each LSP is set such that LSP1: LSP2=60%: 40%. Therefore, a stream that reaches the input router and is transferred to the output router is divided to have the ratio of 3 to 2.

In the above next generation network, one or more paths are set for the same next hop router. For this reason, if different paths are allocated to packets forming the same flow, delay times in packet transmission are different for the respective routes. Therefore, there may be a case that an order of packets to be received by an end user is different from an order at a transmission source. In such a case, a re-transmission process may be carried out when packets including TCP segments such as a TCP (Transmission Control Protocol) session are transmitted through different paths so that the order is changed. The thus-retransmitted traffic is the additionally necessary traffic, which is not originally necessary. Therefore, the traffic amount is increased to thereby cause a network throughput to be deteriorated. Moreover, the change of a packet order in a real time session such as VoIP (Voice over Internet Protocol) causes deterioration in the transmission quality to an end user.

Therefore, in a router in a next generation network, it is important to allocate the same path to the packets of the same stream. Here, as a technique for allocating the same path to the packets of the same stream, a Hash-Threshold method disclosed by D. Thaler is known.

This Hash-Threshold method extracts a result after a HASH operation is carried out to flow identification data for identifying a flow included in a header of a received packet, as "Key". A CRC16 operation and the like may be considered as an example of the Hash operation. Therefore, this operation result implies the degeneration of the flow identification data, and is used when a transfer path is allocated to the flow in the following process. Also, in the Hash-Threshold method, if N kinds of next hop routers are present, a space defined in "Key" is divided into a plurality of sub-spaces in accordance with a distribution ratio of traffic, so that regions are defined.

Therefore, a boundary value between the regions is compared with "key" that is degeneration of the flow identification data and one of the regions to which the received packet belongs is specified. Then, the packet is transferred to a next hop router corresponding to the specified region. Therefore, a load is distributed.

FIG. 3 shows a specific example of such a method. Referring to FIG. 3, there are four kinds of next hop routers as a transfer destination of a packet. A space defined in "Key" is divided into four spaces. Also, boundary values between respective spaces are 16383, 32767 and 49151. In addition, it is supposed that a value of "Key" calculated by carrying out the CRC16 operation to a bit sequence of a total of 64 bits of an IP destination address (32 bits) and an IP Src address (32 bits) serving as data for identifying a packet is 35000. In this case, the value of 35000 that is the calculated "Key" is greater than the boundary value of 32767 and less than 49151. Therefore, a transfer destination is determined to be a next hop router 3, and the packet is transferred.

Through the above-mentioned operation, the Hash-Threshold method can attain "keeping of Packet Order" in the above-mentioned end user in the configuration in which a plurality of paths are listed as candidates with regard to a certain flow. Therefore, it is ensured that the same path can be allocated to the packets of the same flow.

However, the Hash-Threshold method has several problems represented as follows.

At first, a first problem is a problem that it is difficult to attain the Hash-Threshold method at a high speed in hardware. That is, in the Hash-Threshold method, it is necessary to read out a threshold data of "(transfer destination candidate count)—1" when a transfer destination candidate is solved in accordance with a flow identification data. For this reason, if there are 32 transfer destination candidates in maximum, it is necessary to read out the threshold hold data of 31 kinds within a minimum packet process time for arrival of each packet. Therefore, it is necessary to frequently carry out a memory access. This results in a problem that its process requires a long time.

A second problem is that the number of flows cannot be suppressed in which it is necessary to change allocation paths when the increase/decrease of parallel paths and the change in a load distribution ratio between the parallel paths are induced. Here, a rate of the flows having the allocation paths to be changed to the whole flows is referred to as "deterioration rate".

The above-mentioned problems imply that in a datagram transfer apparatus, especially, in the router for the above-mentioned next generation Internet, it is important to minimize the number of flows having the allocation path to be changed because of the increase/decrease of those parallel paths and the change in the load distribution ratio between array paths, namely, to minimize "deterioration rate". Therefore, "keeping of packet order" in the end user is important not only to protect a deterioration of a network throughput but also to improve a communication quality to the end user.

On the contrary, the reason why the order of the packets is not kept is that the packets of the same flow reach the end user through different routes. The reason why the packets of the same flow reach the end user through the different routes is that the different paths are allocated to the packets of the same flow.

For example, in the MPLS traffic engineering, there may be a case that a predetermined load allocation to LSP is changed in order to keep a load balance in a whole network. Similarly, on a plurality of channels set in parallel, if a load distribution of the best effort traffic is attained by using a non-reservation band, there may be a case that the load distribution ratio is changed in correspondence to a variation of a reservation band.

Moreover, in a network using a future WDM (Wavelength Division Multiplex), a case is expected in which the number of parallel channels is increased because of switching between wavelength channels in accordance with a traffic variation, in addition to a reduction in the number of parallel channels caused by a communication fault or a maintenance.

In this way, the change of the load allocation to LSP, the change of the load distribution ratio to match with the variation of the reservation band, and the decrease/increase of the parallel channels cause the router to inevitably change the allocation of the path to the stream. Here, the change of the allocation of the path implies that the stream after the change is transmitted through a route different from a transmission route prior to the change. Therefore, a timing of a reception of the end user is deviated by a difference of a delay time peculiar to each route.

Therefore, naturally, when the flows for allocation paths to be changed are increased, namely, the so-called "deterioration rate" is increased, the order of the packets in the end user cannot be kept, which brings about the adverse influence such as the severe deterioration in the communication quality.

The process of the occurrence of the adverse influence in the Hash-Threshold method will be described below in detail by using the actual example shown in the drawings.

Referring to FIG. 4A, it is supposed that the equal load distribution by four next hop routers is attained to a space defined in a stream identifier. At this time, it is supposed that a fifth next hop router is newly added and the setting is changed such that the load distribution is equally carried out by the five next hop routers. In this case, the usage of the load distribution method according to the Hash-Threshold method results in the following problem. That is, besides a region in which a transfer destination is changed to a next hop router 5, the regions such as a region in which a transfer destination is changed from a next hop router 1 to a next hop router 2, a region in which a transfer destination is changed from the next hop router 2 to a next hop router 3 and a region which a transfer destination is changed from the next hop router 3 to a next hop router 4 is 30% of the whole region. Such a useless change of a transfer destination makes the transfer order of the packets impossible. This results in a problem that a throughput is largely deteriorated in the TCP traffic and the like.

If it is tried to theoretically solve the above-mentioned problems, it may be considered that the setting of regions shown in FIG. 4B can eliminate the region in which the transfer destination is uselessly changed except the next hop router 5. However, irrespectively of the existence of such theoretical concept, the reason why the above problems are present is that the Hash Threshold method directly compares the value of the boundary between the next hop routers with "Key" obtained as the operation result. For this reason, the Hash Threshold method can select the region to be allocated to one next hop router only in a continuous manner. This results in the problem of the occurrence of the unnecessarily many regions in which the transfer destination is changed. Hence, this leads to a problem of the increase of the "deterioration rate".

In conjunction with the above description, a routing apparatus is disclosed in Japanese Laid Open Patent Application (JP-A-Heisei 7-115434). The routing apparatus in a packet telecommunication network in which a transmission route of packets from among a plurality of routes in accordance with a predetermined order of priority levels. In the routing apparatus, a first route registering section stores ones having higher priority levels of the plurality of routes in the order of higher priority levels. A second route registering section stores ones of said plurality of routes other than said routes having higher priority levels in a predetermined ratio. A first route read section reads said routes from the first route registering section in the order of priority levels every time a call is originated. A first route selecting section determines whether the route read out by the first route read section could transmit the packets, to select the route, which can transmit the packets. A second route registering section sequentially updates a read start point each time a case where a route cannot be selected by the first route selecting section occurs, and reads the routes from the second route read section in order. A second route selecting section determines whether or not the route read out by the second route read section could transmit the packets, to select the route, which can transmit the packets.

Also, a server apparatus is disclosed in Japanese Laid Open Patent Application (JP-A-Heisei 10-198642). In this reference, the server apparatus is composed of a plurality of back-end servers 12 in which server processes 21 are provided to process a request of a client. Also, the server apparatus is composed of a front-end server 11 which receives a request from the client and which includes a request transfer control mechanism 113 for transferring the received request to an appropriate ones of said back-end servers 12. The request transfer control mechanism 113 determines said appropriate back-end servers 12 to which requests from the clients to the same service should be transferred, using the identification data of the clients. Therefore, he processing of one kind of service is distributed the plurality of back-end servers to improve the processing performance.

Also, a routing method is disclosed in Japanese Laid Open Patent Application (JP-A-Heisei 11-239181). In this reference, a connectionless packet transmission network is composed of a central processor and a plurality of router units provided at a plurality of nodes and connected with the above central processor. The central processor executes a process composed of a step of previously storing a loop from each of the router units to a destination and all routes without an excessive way, of a step of calculating a distribution ratio to all of the routes to a produce a routing table, using an evaluation function which contains a delay time of the packet from a transmission origin to the destination and a usage rate of the maximum load router unit having a maximum load in the packet transmission network, such that the value of the evaluation function is smaller, and of a step of transmits the routing table to each of the router units. Each of the router units executes a process composed of a step of storing the routing table transmitted from the central processor and of a step of routing an input packet using the stored routing table.

SUMMARY OF THE INVENTION

Therefore, an aspect consistent with the principles of the invention is directed to a datagram transferring apparatus and a datagram transferring method in which the same stream of packets is transferred to a same transfer path while load distribution is carried out.

Another aspect consistent with the principles of the invention is directed to a datagram transferring apparatus and a datagram transferring method in which only a minimum of a stream to be allocated to a transfer path that has been set to a transfer inhibition state is allocated to a different transfer path.

Still another aspect consistent with the principles of the invention is directed to a datagram transferring apparatus and a datagram transferring method in which allocation of a stream can be changed immediately after a change of a setting table.

Yet still another aspect consistent with the principles of the invention is directed to a datagram transferring apparatus and a datagram transferring method in which packet load distribution can be attained such that a deterioration rate can be minimized.

An aspect consistent with the principles of the invention is directed to a datagram transferring apparatus and a datagram transferring method in which it can be prevented that a packet necessary to change of a transfer path is transferred to a network without any change of the transfer path.

Another aspect consistent with the principles of the invention is directed to a datagram transferring apparatus and a datagram transferring method in which a packet can be allocated to a transfer path by referring to two transfer paths at a maximum without referring to all transfer paths numbers.

Still another aspect consistent with the principles of the invention is directed to a datagram transferring apparatus and a datagram transferring method in which a packet can be allocated at a high speed in accordance with a load distribution ratio.

In order to achieve an aspect of the present invention, a datagram relaying apparatus includes a plurality of protocol terminating units, and a destination determining processor. The destination determining processor includes a path selecting section which determines a transfer destination route for a stream of packets received from any of the protocol terminating units. The path selecting section determines whether or not transfer of the received stream of packets to the transfer destination route is in an inhibition state, and selects another transfer destination route when the transfer of the packet to the transfer destination route is in the inhibition state.

Here, the path selecting section may determine the transfer destination route or the another transfer destination route based on a load distribution ratio previously set for each the transfer destination route. In this case, the path selecting section may manage the stream count being currently allocated and the maximum stream count to be allocated, for each the transfer destination route, and may determine whether or not the transfer of the received steam of packets to the transfer destination route is in the inhibition state, based on comparison between the stream count being currently allocated and the maximum stream count to be allocated. Also, the path selecting section may determine that the transfer of the received stream of packets to the transfer destination route is in the inhibition state, when the stream count being currently allocated is greater than the maximum stream count to be allocated. In this case, the path selecting section may determine whether or not the transfer of the received stream of packets to the another transfer destination route is in the inhibition state, when determining the another transfer destination route for the received stream of packets.

Also, the path selecting section may manage the stream count being currently allocated and the maximum stream count to be allocated, for each the transfer destination route, and may determine whether or not the transfer of the received stream of packets to the another transfer destination route is in the inhibition state, based on the comparison between the stream count being currently allocated and the maximum stream count to be allocated.

Also, the path selecting section may manage the stream count being currently allocated and the maximum stream count to be allocated, for each the transfer destination route, and may determine that the transfer of the received stream of packets to the another transfer destination route is in the inhibition state when the stream count being currently allocated is equal to or greater than the maximum stream count to be allocated.

Also, the path selecting section may monitor whether or not a fault has occurred on the transfer destination route, and may allocate a stream of packets allocated to the transfer destination route to the other transfer destination route when the fault has occurred on the transfer destination route. In this case, the path selecting section may manage whether or not the fault has occurred, for every transfer destination route, and may determine the other transfer destination route based on the faults managed for the respective transfer destination routes. In this case, the path selecting section may manage the transfer destination routes individually based on single data.

Also, the path selecting section may determine the other transfer destination route based on a predetermined order.

Also, the path selecting section may manage a maximum stream count to be continuously allocated, for each the transfer destination route, and may continuously determine the other transfer destination routes for the received stream of packets of packets to the maximum stream count to be continuously allocated, and then may determine still another transfer destination route for another received stream of packets.

Also, the path selecting section may change the transfer destination route each time the transfer destination route is determined.

Also, the path selecting section may manage the stream count being currently allocated and the maximum stream count to be allocated, for each the transfer destination route, and after continuously allocating the other transfer destination routes until the stream count being currently allocated reaches the maximum stream count to be allocated, may determine a still another transfer destination route.

Also, the path selecting section may calculate an allocation rate of the stream count being currently allocated to a load distribution ratio for each the transfer destination route, and may determine the transfer destination route having the smallest allocation rate as the other calculation result, when determining the other transfer destination route for the received stream of packets.

Also, the path selecting section may manage the stream count being currently allocated and the maximum stream count to be allocated, for each the transfer destination route, and may determine the transfer destination route having the smallest value when the stream count being currently allocated is divided by the maximum stream count to be allocated, as the other transfer destination route.

Also, the path selecting section may discard a correspondence between the transfer destination route and the received stream of packets when a packet does not arrive for a predetermined time.

In order to achieve another aspect of the present invention, a datagram relaying apparatus includes a plurality of protocol terminating units, a destination address extracting section, a stream identifier calculating section, a route determining section, a cache transfer path number memory, a cache table accessing section, a transfer inhibition bit sequence memory, a transfer allocation path number memory, a transfer path memory, a path selecting section and an output device selecting section. The destination address extracting section extracts a destination address data to determine a transfer destination route from a header data of a packet received from any of the protocol terminating units. The stream identifier calculating section calculates a stream identifier to identify a stream from the header data of the packet received from any of the protocol terminating units. The route determining section determines a multi-path identifier to uniquely identify a transfer path serving or a plurality of transfer destination routes as the transfer destination route, based on the destination address data. The cache transfer path number memory stores the stream identifier and the multi-path identifier in an address section, and stores as a cache transfer path number, a transfer path number corresponding to the transfer path, based on a combination of the stream identifier and the multi-path identifier in a data section. The cache table accessing section reads out the cache transfer path number corresponding to the combination of the stream identifier and the multi-path identifier from the cache transfer path number memory. The transfer inhibition bit sequence memory stores the multi-path identifier in an address section, and stores in a data section, a transfer inhibition bit sequence indicating whether or not transfer of the received stream of packets to the transfer path corresponding to the combination of the transfer path number and the multi-path identifier, for each the transfer path number, based on the multi-path identifier. The transfer allocation path number memory stores the multi-path identifier in an address section, and stores in a data section, the transfer path number corresponding to the transfer path as a transfer allocation path number, based on the multi-path identifier. The transfer path memory stores the multi-path identifier and the transfer path number in an address section, and stores the transfer path in a data section, based on the combination of the multi-path identifier and the transfer path number. The path selecting section may determine the transfer path serving as the transfer destination route for the received stream of packets, based on the multi-path identifier and the cache transfer path number. The output device selecting section transfers the received stream of packets to the transfer path. The destination address extracting section outputs the destination address data to the route determining section. The stream identifier calculating section outputs the stream identifier to the cache table accessing section and the path selecting section. The route determining section outputs the multi-path identifier to the cache table accessing section and the path selecting section. The cache table accessing section outputs the cache transfer path number to the path selecting section. The path selecting section defines the cache transfer path number as the transfer path number, and reads out the transfer inhibition bit sequence based on the multi-path identifier, and may determine whether or not the transfer of the packets to the transfer path corresponding to the combination of the transfer path number and the multi-path identifier is in an inhibition state based on the read out transfer inhibition bit sequence, and when the transfer of the packets to the transfer path is in the inhibition state, reads out the transfer allocation path number based on the multi-path identifier, and updates the transfer path number from the cache transfer path number to the read out the transfer allocation path number, and outputs the transfer path corresponding to the combination of the updated the transfer path number and the multi-path identifier to the output device selecting section.

Here, the datagram relaying apparatus may further include an allocation inhibition bit sequence memory which stores the multi-path identifier in an address section, and stores in a data section, an allocation inhibition bit sequence indicating whether or not allocation of the received stream of packets to the transfer path corresponding to the combination of the transfer path number and the multi-path identifier is in the inhibition state, for each the transfer path number, based on the multi-path identifier. Also, the path selecting section may read out the allocation inhibition bit sequence based on the input the multi-path identifier, when updating the transfer path number from the cache transfer path number to the transfer allocation path number, and may specify the transfer path number in which allocation of the received stream of packets is not in the inhibition state in the read out allocation inhibition bit sequence, and then may update the transfer allocation path number corresponding to the multi-path identifier in the data section of the transfer allocation path number memory, based on the specified transfer path number.

Also, the datagram relaying apparatus may further include an allocation stream count memory which stores the multi-path identifier and the transfer path number in an address section, and storing in a data section an allocation stream count indicating the stream count being currently allocated to the transfer path number, based on the combination of the multi-path identifier and the transfer path number; and a maximum stream count memory when stores the multi-path identifier and the transfer path number in an address section, and stores in a data section, a maximum stream count indicating the maximum stream count to be allocated to the transfer path number, based on the combination of the multi-path identifier and the transfer path number. The path selecting section reads out the allocation stream count and the maximum stream count based on the combination of the transfer path number based on the input the cache transfer path number and the input the multi-path identifier, and compares the read out allocation stream count with the maximum stream count, and when the allocation stream count is greater than the maximum stream count, stores a fact that transfer of the received stream of packets to the transfer path corresponding to the combination of the multi-path identifier and the transfer path number is in an inhibition state in the transfer inhibition bit sequence, and when the allocation stream count is equal to or less than the maximum stream count, stores a fact that the transfer of the packet to the transfer path corresponding to the combination of the multi-path identifier and the transfer path number is in a permission state in the transfer inhibition bit sequence.

In this case, the path selecting section may store a fact that the allocation of the received stream of packets to the transfer path corresponding to the combination of the multi-path identifier and the transfer path number is in the inhibition state in the allocation inhibition bit sequence when the allocation stream count is equal to or greater than the maximum stream count, and may store a fact that the allocation of the stream to the transfer path corresponding to the combination of the multi-path identifier and the transfer path number is at the permission state in the allocation inhibition bit sequence, when the allocation stream count is less than the maximum stream count. Also, the path selecting section may subtract one from the allocation stream count corresponding to the combination of the multi-path identifier and the transfer path number corresponding to the cache transfer path number, when updating the transfer path number from the cache transfer path number to the transfer allocation path number, and may add one to the allocation stream count corresponding to the combination of the multi-path identifier and the transfer path number after the update, may compare the subtracted allocation stream count and the added allocation stream count with the maximum stream count, may update the transfer inhibition bit sequence and the allocation inhibition bit sequence based on the comparison result, and may specify the transfer path number to update the transfer allocation path number stored in the transfer allocation path number memory, based on the updated transfer inhibition bit sequence and the allocation inhibition bit sequence.

Also, the path selecting section may define a start value as a value next to a value of the transfer allocation path number in which the transfer path number is updated, and the path selecting section may specify the transfer path number in which the allocation of the received stream of packets is not in the inhibition state based on the allocation inhibition bit sequence, and then may sequentially determine whether or not the allocation of the received stream of packets to the transfer path corresponding to a combination of the multi-path identifier and the transfer path number is in a permission state in the allocation inhibition bit sequence, and may define a value targeted for a next determination as a minimum value of the transfer path number, when a value targeted for the determination becomes a maximum value of the transfer path number in the determination, and may determine whether or not the allocation of the stream to the transfer path corresponding to the combination of the multi-path identifier and the transfer path number is in the permission state in the allocation inhibition bit sequence.

Also, the path selecting section may set the transfer path number to update the transfer allocation path number corresponding to the multi-path identifier in the transfer allocation path number memory as a transfer path number corresponding to the start value, when the value targeted for the determination becomes the same value as the transfer allocation path number in which the transfer path number is updated.

Also, the path selecting section may read out the allocation stream count and the maximum stream count for each the transfer path number based on the multi-path identifier, when specifying the transfer path number in which the allocation of the received stream of packets is not in the inhibition state based on the transfer allocation path number, and may divide the read out allocation stream count by the maximum stream count to calculate an allocation rate for each the transfer path number, and then may update the transfer allocation path number stored in the transfer allocation path number memory based on the transfer path number having the smallest allocation rate.

Also, the datagram relaying apparatus may further include a continuous allocation count memory which stores the multi-path identifier in an address section, and stores in a data section, a continuous allocation count indicating the stream count continuously allocated to the transfer path number until this time, based on the multi-path identifier; and a maximum continuous allocation count memory which stores the multi-path identifier and the transfer path number in an address section, and stores a maximum continuous allocation count indicating the maximum stream count continuously allocated to the transfer path number in a data section, based on the combination of the multi-path identifier and the transfer path number. The path selecting section may add one to the continuous allocation count corresponding to the multi-path identifier, after updating the transfer path number based on the transfer allocation path number read out from the transfer allocation path number memory, and may compare the added continuous allocation count with the maximum continuous allocation count, and may specify the transfer path number in which the allocation of the received stream of packets is not in the inhibition state in the allocation inhibition bit sequence corresponding to the multi-path identifier, when the continuous allocation count is equal to or greater than the maximum continuous allocation count, and then may update the transfer allocation path number corresponding to the multi-path identifier in the data section of the transfer allocation path number memory based on the specified transfer path number.

Also, the path selecting section may update the transfer allocation path number corresponding to the multi-path identifier in the data section of the transfer allocation path number memory, each time the path selecting section updates the transfer path number from the cache transfer path number based on the transfer allocation path number read out from the transfer allocation path number memory.

Also, the path selecting section may update the transfer allocation path number corresponding to the multi-path identifier in the data section of the transfer allocation path number memory, when the allocation stream count corresponding to the transfer allocation path number stored in the transfer allocation path number memory reaches the maximum stream count.

Also, the datagram relaying apparatus may further include a channel identifier memory which stores a channel identifier corresponding to the transfer path in a one-to-one correspondence relationship in an address section, and stores the multi-path identifier and the transfer path number in a data section, based on the channel identifier; an operation mode memory which stores the multi-path identifier in an address section, and stores an operation mode indicating whether or not a fault has occurred on a physical link corresponding to the transfer path in a data section, based on the multi-path identifier; and a transfer path status bit sequence memory which stores the multi-path identifier in an address section, and stores in a data section, a transfer path status bit sequence indicating whether or not the allocation of the received stream of packets and the transfer of the received stream of packets to the transfer path corresponding for each the transfer path number are in the inhibition state because of the fault occurrence, based on the multi-path identifier. The path selecting section may specify the channel identifier corresponding to the transfer path corresponding to the physical link having the fault from a fault occurrence report signal, when the fault occurrence report signal reporting the fault occurrence is received from the physical link, and may specify the transfer path number and the multi-path identifier corresponding to the specified channel identifier from the channel identifier memory, and may update the operation mode corresponding to the specified multi-path identifier to a fault occurrence state, and further stores the fact that the allocation of the received stream of packets and the transfer of the received stream of packets to the specified transfer path number are in the inhibition state in the transfer path status bit sequence corresponding to the specified multi-path identifier, may read out the operation mode corresponding based on the multi-path identifier received from the route determining section, when the stream is received from the protocol terminating unit, may read out the transfer path status bit sequence based on the multi-path identifier, when the read out operation mode indicates the fault occurrence state, and may determine whether or not the allocation and transfer of the received stream of packets to the transfer path number are in the inhibition state in the read out the transfer path status bit sequence, and may read out the transfer allocation path number based on the multi-path identifier, when the allocation of the received stream of packets and the transfer of the stream to the transfer path number are in the inhibition state, and may update the transfer path number to the read out transfer allocation path number based on the cache transfer path number, and outputs the transfer path corresponding to the combination of the updated transfer path number and the multi-path identifier to the output device selecting section.

Also, the path selecting section may read out the transfer path status bit sequence based on the multi-path identifier, when the read out operation mode indicates the fault occurrence state based on the input the multi-path identifier, and may specify the transfer path number in which the allocation and transfer of the received stream of packets are not in the inhibition state in the read out transfer path status bit sequence, and then may update the transfer allocation path number corresponding to the multi-path identifier in the data section of the transfer allocation path number memory based on the specified the transfer path number.

Also, the datagram relaying apparatus may further include a usage path bit sequence memory which stores the multi-path identifier in an address section, and stores a usage path bit sequence indicating one ore more of the transfer paths corresponding to the multi-path identifier in a data section, based on the multi-path identifier. The transfer path number may correspond to each of the transfer paths different from each other in a one-to-one relationship, and the transfer path number may be further constituted of the same data as the corresponding transfer path. The path selecting section may store the transfer path status bit sequence indicating whether or not the allocation and transfer of the received stream of packets to each transfer path number and each transfer path are in the inhibition state, and may specify the transfer path corresponding to the physical link having the fault from the fault occurrence report signal when the fault occurrence report signal reporting the fault occurrence is received from the physical link, and may store a fact that the allocation and transfer of the received stream of packets to the specified transfer path number are in the inhibition state in the transfer path status bit sequence, and may read out the corresponding usage path bit sequence based on the multi-path identifier received from the route determining section, when the received stream of packets is received from the protocol terminating units, and may determine presence or absence of the transfer path which is used in the read out usage path bit sequence and in which the allocation and transfer of the received stream of packets are in the inhibition state in the transfer path status bit sequence, and may determine whether or not the allocation and transfer of the received stream of packets to the transfer path number corresponding to the cache transfer path number received from the cache table accessing section are in the inhibition state based on the transfer path status bit sequence, in the case of the presence of the transfer path which is used in the usage path bit sequence and in which the allocation and transfer of the received stream of packets are in the inhibition state in the transfer path status bit sequence, and may read out the transfer allocation path number based on the multi-path identifier, when the allocation and transfer of the received stream of packets to the transfer path number are in the inhibition state, and may update the transfer path number based on the read out transfer allocation path number based on the cache transfer path number, and then may output the updated transfer path number to the output device selecting section. The output device selecting section may transfer the received stream of packets based on the transfer path number received from the path selecting section.

Also, the path selecting section may specify the transfer path number in which the allocation and transfer of the received stream of packets are not in the inhibition state in the transfer path status bit sequence, in the case of the presence of the transfer path and the transfer path number which are used in the usage path bit sequence and in which the allocation and transfer of the received stream of packets the packet are in the inhibition state in the transfer path status bit sequence, and may update the transfer allocation path number corresponding to the multi-path identifier in the data section of the transfer allocation path number memory based on the specified transfer path number.

Also, the cache transfer path number may further have a bit different from a bit indicating the corresponding transfer path number. The different bit may store therein a registration state bit indicating whether or not the cache transfer path number received from the cache table accessing section is at a non-registered state. The path selecting section may determine whether or not the received cache transfer path number is in a non-registered state based on the different bit, and may update the transfer path number from the cache transfer path number to the transfer allocation path number when the cache transfer path number is in the non-registered state.

Also, the path selecting section may store a predetermined bit pattern. The cache transfer path number may be composed of the predetermined bit pattern, when the transfer path number corresponding to the combination of the stream identifier and the multi-path identifier is in the non-registered state. The path selecting section may determine whether or not the cache transfer path number received from the cache table accessing section is composed of the predetermined bit pattern, and may determine whether or not the cache transfer path number is in the non-registered state, and may update the transfer path number from the cache transfer path number to the transfer allocation path number when the cache transfer path number is in the non-registered state.

Also, the path selecting section may output the specified transfer path number as an update path number to the cache table accessing section, after specifying the transfer path number to update the transfer allocation path number stored in the transfer allocation path number memory. The cache table accessing section may update the cache transfer path number corresponding to the combination of the multi-path identifier and the stream identifier in a data section based on the update path number, when the update path number is received.

The transfer inhibition bit sequence may be composed of the number of bits equal to or greater than kinds of the transfer path numbers divided by the corresponding multi-path identifier. In each of the respective bits constituting the transfer inhibition bit sequence, each of the respective bits may correspond to the transfer path number divided by the multi-path identifier in a one-to-one relationship, and a fact may be stored indicating that the transfer of the received stream of packets to the transfer path corresponding to the corresponding the transfer path number for each the bit is in the inhibition state.

Also, the allocation inhibition bit sequence may be composed of the number of bits equal to or greater than kinds of the transfer path numbers divided by the corresponding the multi-path identifier. In each of the respective bits constituting the allocation inhibition bit sequence, each of the respective bits may correspond to the transfer path number divided by the multi-path identifier in a one-to-one relationship, and a fact may be stored indicating that the allocation of the received stream of packets to the transfer path corresponding to the corresponding the transfer path number for each the bit is in the inhibition state.

Also, the transfer path status bit sequence may be composed of the number of bits equal to or greater than kinds of the transfer path numbers divided by the corresponding the multi-path identifier. In each of the respective bits constituting the transfer path status bit sequence, each of the respective bits may correspond to the transfer path number divided by the multi-path identifier in a one-to-one relationship, and a fact may be stored indicating that the allocation and transfer of the received stream of packets to the transfer path corresponding to the corresponding transfer path number for each the bit are in the inhibition state.

Also, the transfer path status bit sequence may be composed of the number of bits equal to or greater than kinds of the transfer path numbers. In each of the respective bits constituting the transfer path status bit sequence, each of the respective bits may correspond to the transfer path and the transfer path number in a one-to-one relationship, and a fact may be stored indicating that an allocation and transfer of the received stream of packets to the corresponding the transfer path and the transfer path number for each the bit are in the inhibition state.

Also, the datagram relaying apparatus may further include an aging processing section which detects the combination of the transfer path number and the multi-path identifier corresponding to the transfer path to which the received stream of packets is not transferred for a predetermined time, and may set the cache transfer path number stored in the data section of the cache transfer path number memory corresponding to the combination of the transfer path number and the detected the multi-path identifier, to the non-registered state.

Also, the path selecting section subtracts one from the allocation stream count corresponding to the detected combination of the transfer path number and the multi-path identifier to which the received stream of packets is not transferred for the predetermined time, and may update the transfer inhibition bit sequence and the allocation inhibition bit sequence, based on the subtracted allocation stream count and the maximum stream count.

In a still another aspect, a datagram relaying method may be attained by receiving a stream of packets; and by determining a transfer destination route for the received stream of packets. The step of determining a transfer path may be attained by determining whether or not the transfer of the received stream of packets to the determined transfer destination route is in an inhibition state, when the transfer destination route for the received stream of packets; and by determining another transfer destination route, when the transfer of the received stream of packets to the transfer destination route is in the inhibition state.

Here, the step of determining a transfer path may be attained by determining the transfer destination route or the other transfer destination route based on a load distribution ratio preliminarily set for each the transfer destination route.

Also, the step of determining a transfer path may be attained by determining whether or not the transfer of the received stream of packets to the transfer destination route is in the inhibition state, based on a comparison between the stream count being currently allocated and the maximum stream count to be allocated, which are managed for each the transfer destination route.

Also, the step of determining a transfer path may be attained by determining that the transfer of the received stream of packets to the transfer destination route is in the inhibition state, when the stream count being currently allocated is greater than the maximum stream count to be allocated.

Also, the step of determining a transfer path may be attained by determining whether or not allocation of the received stream to the other transfer destination route is in the inhibition state.

Also, the step of determining a transfer path may be attained by determining whether or not the allocation of the received stream of packets to the other transfer destination route is in the inhibition state, based on the comparison between the stream count being currently allocated and the maximum stream count to be allocated, which are managed for each the transfer destination route, when the other transfer destination route is determined for the received stream of packets.

Also, the step of determining a transfer path may be attained by determining that the allocation of the received stream of packets to the other transfer destination route is in the inhibition state, when the stream count being currently allocated which is managed for each the transfer destination route is equal to or greater than the maximum stream count to be allocated which is managed for each the transfer destination route.

Also, the step of determining a transfer path may be attained by allocating the received stream allocated to the transfer destination route having a fault to the other transfer destination route, when the fault has occurred on the transfer destination route.

Also, the step of determining a transfer path may be attained by determining the other transfer destination route based on the fault occurrence managed for each the transfer destination route, when the other transfer destination route is determined.

Also, the transfer destination route is managed individually based on each single data.

Also, the step of determining a transfer path may be attained by determining the other transfer destination route based on a preset predetermined order.

Also, the step of determining a transfer path may be attained by continuously determining the other transfer destination route for the received stream of packets until arrival of the maximum stream count to be continuously allocated, which is managed for each the transfer destination route; and then, by determining still another transfer destination route for the received stream.

Also, the step of determining a transfer path may be attained by changing the transfer destination route every time, when the other transfer destination route is determined for the received stream of packets.

Also, the step of determining a transfer path may be attained by continuously determining the still another transfer destination routes, until the stream count being currently allocated which is managed for each the transfer destination route reaches the maximum stream count to be allocated which is managed for each the transfer destination route.

Also, the step of determining a transfer path may be attained by calculating an allocation rate of the stream count being currently allocated to the load distribution ratio for each the preset the transfer destination route, when the other transfer destination route is determined for the received stream of packets; and by determining the transfer destination route having the smallest allocation rate as the other transfer destination route.

Also, the step of determining a transfer path may be attained by determining as the other transfer destination route, the transfer destination route having the smallest value when the stream count being currently allocated which is managed for each the transfer destination route is divided by the maximum stream count to be allocated which is managed for each transfer destination route, when the other transfer destination route is determined for the received stream of packets.

Also, the step of determining a transfer path may be attained by discarding a correspondence between the received stream of packets and the transfer destination route for the stream in which a packet does not arrive for a predetermined time.

In yet still another aspect, a datagram relaying method is attained by extracting a destination address data from header data of each of received packets of a stream to determine a transfer destination route; by calculating a stream identifier to identify the stream from the header data of the packet; by determining a multi-path identifier to uniquely identify a transfer path serving as the transfer destination route, or a plurality of transfer destination routes, based on the destination address data; by reading out the cache transfer path number from a cache transfer number memory for storing the stream identifier and the multi-path identifier in an address section based on a combination of the stream identifier and the multi-path identifier and storing as a cache transfer path number, a transfer path number corresponding to the transfer path in a data section based on the combination of the stream identifier and the multi-path identifier; by determining a transfer path serving as the transfer destination route, based on the multi-path identifier and the cache transfer path number, by using a transfer path memory for storing the multi-path identifier and the transfer path number in an address section, and for storing the transfer path in a data section based on the combination of the multi-path identifier and the transfer path number; and by transferring the received stream of packets to the transfer path. The step of determining a transfer path may be attained by defining the cache transfer path number as the transfer path number; by reading out a transfer inhibition bit sequence, based on the multi-path identifier, from a transfer inhibition bit sequence memory for storing the multi-path identifier in an address section and storing in a data section, the transfer inhibition bit sequence indicating whether or not transfer of the received stream of packets to the transfer path corresponding to the combination of the multi-path identifier and the transfer path number is in an inhibition state, for each the transfer path number, based on the multi-path identifier; by judging whether or not the transfer of the received stream of packets to the transfer path corresponding to the combination of the multi-path identifier and the transfer path number is in the inhibition state based on the read out transfer inhibition bit sequence; by when the transfer of the received stream of packets to the transfer path is in the inhibition state, reading out a transfer allocation path number, based on the multi-path identifier, from a transfer allocation path number memory for storing the multi-path identifier in an address section, and storing as the transfer allocation path number, the transfer path number corresponding to the transfer path in a data section, based on the multi-path identifier; and by updating the transfer path number from the cache transfer path number to the read out the transfer allocation path number.

Also, the step of determining a transfer path may be attained by, when updating the transfer path number from the cache transfer path number to the transfer allocation path number, reading out an allocation inhibition bit sequence, based on the multi-path identifier, from an allocation inhibition bit sequence memory for storing the multi-path identifier in an address section, storing in a data section for each the transfer path number, the allocation inhibition bit sequence indicating whether or not allocation of the received stream of packets to the transfer path corresponding to the combination of the transfer path number and the multi-path identifier is in the inhibition state, based on the multi-path identifier; by specifying the transfer path number in which allocation of the received stream is not in the inhibition state in the read out allocation inhibition bit sequence; and by updating the transfer allocation path number corresponding to the multi-path identifier in the data section of the transfer allocation path number memory, based on the specified the transfer path number.

Also, the step of determining a transfer path may be attained by reading out an allocation stream count and a maximum stream count, based on the combination of the transfer path number corresponding to the cache transfer path number and the multi-path identifier, from an allocation stream count memory for storing the multi-path identifier and the transfer path number in an address section and storing an allocation stream count indicating the stream count being currently allocated to the transfer path number corresponding to the combination of the multi-path identifier and the cache transfer path number in a data section, and a maximum stream count memory for storing the multi-path identifier and the transfer path number in an address section, and storing a maximum stream count indicating the maximum stream count to be allocated to the transfer path number in a data section, based on the combination of the multi-path identifier and the transfer path number; by comparing the read out the allocation stream count with the maximum stream count, by, when the allocation stream count is greater than the maximum stream count, storing in the transfer inhibition bit sequence, a fact that the transfer of the received stream of packets to the transfer path corresponding to the combination of the multi-path identifier and the transfer path number is in the inhibition state; by, when the allocation stream count is equal to or less than the maximum stream count as the comparison result between the allocation stream count and the maximum stream count, storing in the transfer inhibition bit sequence, a fact that the transfer of the received stream of packets to the transfer path corresponding to the combination of the multi-path identifier and the transfer path number is in a permission state.

Also, the step of determining a transfer path may be attained by, when the allocation stream count is equal to or greater than the maximum stream count as the comparison result between the allocation stream count and the maximum stream count, storing in the allocation inhibition bit sequence, a fact that the allocation of the received stream of packets to the transfer path corresponding to the combination of the multi-path identifier and the transfer path number is in the inhibition state; and by when the allocation stream count is less than the maximum stream count as the comparison result between the allocation stream count and the maximum stream count, storing in the allocation inhibition bit sequence, a fact that the allocation of the received stream of packets to the transfer path corresponding to the combination of the multi-path identifier and the transfer path number is at the permission state.

Also, the step of determining a transfer path may be attained by, when updating the transfer path number from the cache transfer path number to the transfer allocation path number, subtracting one from the allocation stream count corresponding to the combination of the multi-path identifier and the transfer path number corresponding to the cache transfer path number; by adding one to the allocation stream count corresponding to the combination of the multi-path identifier and the transfer path number after the update; by comparing the subtracted allocation stream count and the added allocation stream count with the maximum stream count; by updating the transfer inhibition bit sequence and the allocation inhibition bit sequence based on the comparison result; and by specifying the transfer path number to update the transfer allocation path number stored in the transfer allocation path number memory, based on the updated transfer inhibition bit sequence and the allocation inhibition bit sequence.

Also, the step of determining a transfer path may be attained by, when specifying the transfer path number in which the allocation of the received stream of packets is not in the inhibition state based on the allocation inhibition bit sequence, defining a start value as a value next to a value of the transfer allocation path number in which the transfer path number is updated; by judging whether or not sequential allocation of the received stream of packets to the transfer path corresponding to the combination of the multi-path identifier and the transfer path number is in a permission state in the allocation inhibition bit sequence; by, when a value targeted for the determination becomes a maximum value of the transfer path number in the determination, defining a value targeted for a next determination as a minimum value of the transfer path number; and by judging whether or not the sequential allocation of the received stream of packets to the transfer path corresponding to the combination of the multi-path identifier and the transfer path number is in the permission state in the allocation inhibition bit sequence.

Also, the step of determining a transfer path may be attained by, when the value targeted for the determination becomes the same value as the transfer allocation path number in which the transfer path number is updated, setting the transfer path number to update the transfer allocation path number corresponding to the multi-path identifier in the transfer allocation path number memory as a transfer path number corresponding to the start value.

Also, the step of determining a transfer path may be attained by, when specifying the transfer path number in which the allocation of the received stream of packets is not in the inhibition state based on the transfer allocation path number, reading out the allocation stream count and the maximum stream count for each the transfer path number based on the multi-path identifier; by dividing the read out allocation stream count by the maximum stream count, to calculate an allocation rate for each the transfer path number; and by updating the transfer allocation path number stored in the transfer allocation path number memory based on the transfer path number having the smallest allocation rate.

Also, the step of determining a transfer path may be attained by, after updating the transfer path number based on the transfer allocation path number read out from the transfer allocation path number memory, adding one to the corresponding continuous allocation count, based on the multi-path identifier, by using a continuous allocation count memory for storing the multi-path identifier in an address section, and storing a continuous allocation count indicating the stream count continuously allocated to the transfer path number until this time in a data section, based on the multi-path identifier; by comparing the added continuous allocation count with the maximum continuous allocation count read out from a maximum continuous allocation count memory for storing the multi-path identifier and the transfer path number in an address section, based on the multi-path identifier, and storing the maximum continuous allocation count indicating the maximum stream count continuously allocated to the transfer path number in a data section, based on the combination of the multi-path identifier and the transfer path number; by, when the continuous allocation count is equal to or greater than the maximum continuous allocation count, specifying the transfer path number in which the allocation of the received stream of packets is not in the inhibition state in the allocation inhibition bit sequence corresponding to the multi-path; and by updating the transfer allocation path number corresponding to the multi-path identifier in the data section of the transfer allocation path number memory based on the specified the transfer path number.

Also, the step of determining a transfer path may be attained by each time the transfer path number is updated from the cache transfer path number based on the transfer allocation path number read out from the transfer allocation path number memory, updating the transfer allocation path number corresponding to the multi-path identifier in the data section of the transfer allocation path number memory.

Also, the step of determining a transfer path may be attained by when the allocation stream count corresponding to the transfer allocation path number stored in the transfer allocation path number memory reaches the maximum stream count, updating the transfer allocation path number corresponding to the multi-path identifier in the data section of the transfer allocation path number memory.

Also, the step of determining a transfer path may be attained by, when a fault occurrence report signal reporting the fault occurrence is received from a physical link, based on the channel identifier to identify the transfer path corresponding to the physical link having the fault from the fault occurrence report signal, specifying the transfer path number and the multi-path identifier, from a channel identifier memory for storing a channel identifier corresponding to the transfer path in a one-to-one relationship in an address section, and storing the multi-path identifier and the transfer path number in a data section, based on the channel identifier; by updating to a fault occurrence state based on the specified multi-path identifier, the operation mode stored in an operation mode memory for storing the multi-path identifier in an address section, and storing an operation mode indicating whether or not a fault has occurred on the physical link corresponding to the transfer path in a data section, based on the multi-path identifier; by, based on the specified the multi-path identifier, storing a fact that the allocation and transfer of the received stream of packets to the specified transfer path number are in the inhibition state in the transfer path status bit sequence in a transfer path status bit sequence memory for storing the multi-path identifier in an address section, and storing in a data section, a transfer path status bit sequence indicating whether or not the allocation and transfer of the received stream of packets to the transfer path corresponding for each the transfer path number are in the inhibition state because of the fault occurrence, based on the multi-path identifier; by, when the packets are received from the protocol terminating units, reading out the operation mode corresponding based on the multi-path identifier; by, when the read out operation mode indicates the fault occurrence state, reading out the transfer path status bit sequence based on the multi-path identifier; by judging whether or not the allocation and transfer of the received stream of packets to the transfer path number are in the inhibition state in the read out the transfer path status bit sequence; by, when the allocation and transfer of the received stream of packets to the transfer path number are in the inhibition state, reading out the transfer allocation path number based on the multi-path identifier; and by updating the transfer path number to the read out transfer allocation path number based on the cache transfer path number.

Also, the step of determining a transfer path may be attained by, when the read out operation mode indicates a fault occurrence state based on the multi-path identifier, reading out the transfer path status bit sequence based on the multi-path identifier; by specifying the transfer path number in which the allocation and transfer of the received stream of packets are not in the inhibition state in the read out the transfer path status bit sequence; and by updating the transfer allocation path number corresponding to the multi-path identifier in the data section of the transfer allocation path number memory based the specified the transfer path number.

Also, the transfer path number may correspond to each of the transfer paths different from each other in a one-to-one relationship, and is further constituted of the same data as the corresponding the transfer path. The step of determining a transfer path may be attained by, when the fault occurrence report signal reporting the fault occurrence is supplied from the physical link, specifying the transfer path corresponding to the physical link having the fault from the fault occurrence report signal; by storing a fact that the allocation and transfer of the received stream of packets to the specified the transfer path are in the inhibition state, in the transfer path status bit sequence indicating whether or not the allocation and transfer of the received stream of packets to each of the transfer paths and each of the transfer path numbers; by, when the packet is received from the protocol terminating units, based on the multi-path identifier, reading out the corresponding usage path bit sequence from a usage path bit sequence memory for storing the multi-path identifier in an address section, and storing a usage path bit sequence indicating one ore more the transfer paths corresponding to the multi-path identifier in a data section, based on the multi-path identifier; by judging a presence or absence of the transfer path which is used in the read out the usage path bit sequence and in which the allocation and transfer of the received stream of packets are in the inhibition state in the transfer path status bit sequence; by, in the case of the presence of the transfer path which is used in the usage path bit sequence and in which the allocation and transfer of the received stream of packets are in the inhibition state in the transfer path status bit sequence, judging whether or not the allocation and transfer of the received stream of packets to the transfer path number corresponding to the cache transfer path number are in the inhibition state based on the transfer path status bit sequence; by, when the allocation and transfer of the received stream of packets to the transfer path number are in the inhibition state, reading out the transfer allocation path number based on the multi-path identifier; and by updating the transfer path number based on the read out transfer allocation path number based on the cache transfer path number.

Also, the step of determining a transfer path may be attained by, in the case of the presence of the transfer path and the transfer path number which are used in the usage path bit sequence and in which the allocation and transfer of the received stream of packets are in the inhibition state in the transfer path status bit sequence, specifying the transfer path number in which the allocation and transfer of the received stream of packets are not in the inhibition state in the transfer path status bit sequence; and by updating the transfer allocation path number corresponding to the multi-path identifier in the data section of the transfer allocation path number memory based on the specified transfer path number.

Also, the cache transfer path number may further have a bit different from a bit indicating the corresponding the transfer path number. The different bit may store therein a registration state bit indicating whether or not the cache transfer path number is in a non-registered state. The step of determining a transfer path may be attained by determining whether or not the cache transfer path number is in the non-registered state based on the different bit; and by, when the cache transfer path number is in the non-registered state, updating the transfer path number from the cache transfer path number to the transfer allocation path number.

Also, the cache transfer path number may be composed of the predetermined bit pattern, when the transfer path number corresponding to the combination of the stream identifier and the multi-path identifier is in the non-registered state. The step of determining a transfer path may be attained by determining whether or not the cache transfer path number defined as the transfer path number is composed of the predetermined bit pattern which is stored in advance; by determining whether or not the cache transfer path number is in the non-registered state; and by, when the cache transfer path number is in the non-registered state, updating the transfer path number from the cache transfer path number to the transfer allocation path number.

Also, the step of determining a transfer path may be attained by, after specifying the transfer path number to update the transfer allocation path number stored in the transfer allocation path number memory, based on the specified the transfer path number, updating the cache transfer path number corresponding to the combination of the multi-path identifier and the stream identifier in a data section of the cache transfer path number memory.

Also, the transfer inhibition bit sequence may be composed of the number of bits equal to or greater than kinds of the transfer path numbers divided by the corresponding multi-path identifier. In each of the respective bits constituting the transfer inhibition bit sequence, each of the respective bits may correspond to the transfer path number divided by the multi-path identifier in a one-to-one relationship. The step of determining a transfer path may be attained by storing a fact that the transfer of the received steam of packets to the transfer path corresponding to the corresponding transfer path number for each the bit is in the inhibition state.

Also, the allocation inhibition bit sequence may be composed of the number of bits equal to or greater than kinds of the transfer path numbers divided by the corresponding multi-path identifier. In each of the respective bits constituting the allocation inhibition bit sequence, each of the respective bits may correspond to the transfer path number divided by the multi-path identifier in a one-to-one relationship. The step of determining a transfer path may be attained by storing a fact that the allocation of the received stream of packets to the transfer path corresponding to the corresponding transfer path number for each the bit is in the inhibition state.

Also, the transfer path status bit sequence may be composed of the number of bits equal to or greater than kinds of the transfer path numbers divided by the corresponding multi-path identifier. In each of the respective bits constituting the transfer path status bit sequence, each of the respective bits may correspond to the transfer path number divided by the multi-path identifier in a one-to-one relationship. The step of determining a transfer path may be attained by storing a fact that the allocation and transfer of the received stream of packets to the transfer path corresponding to the corresponding transfer path number for each the bit are in the inhibition state.

Also, the transfer path status bit sequence may be composed of the number of bits equal to or greater than kinds of the transfer path numbers. In each of the respective bits constituting the transfer path status bit sequence, each of the respective bits may correspond to the transfer path and the transfer path number in a one-to-one relationship. The step of determining a transfer path may be attained by storing a fact that the allocation and transfer of the received stream of packets to the corresponding transfer path and the transfer path number for each the bit are in the inhibition state.

Also, the datagram relaying method may further include: detecting the combination of the transfer path number and the multi-path identifier corresponding to the transfer path to which the received stream of packets is not transferred for a predetermined time; and setting the cache transfer path number stored in the data section of the cache transfer path number memory corresponding to the combination of the transfer path number and the detected multi-path identifier, to a non-registered state.

Also, the step of determining a transfer path may be attained by subtracting one from the allocation stream count corresponding to the detected combination of the transfer path number and the multi-path identifier to which the received stream of packets is not transferred for the predetermined time; and by updating the transfer inhibition bit sequence and the allocation inhibition bit sequence, based on the subtracted allocation stream count and the maximum stream count.

BRIEF DESCRIPTION OF THE DRAWINGS

FIG. 7 is a block diagram showing the configuration of a transfer destination determining unit according to the first embodiment of the present invention;

FIG. 8 is a diagram showing a configuration example of a cache table in the transfer destination determining unit according to the first embodiment of the present invention;

FIG. 9 is a diagram showing a configuration example of a path allocation table in the transfer destination determining unit according to the first embodiment of the present invention;

FIG. 10 is a diagram showing a configuration example of a transfer path table in the transfer destination determining unit according to the first embodiment of the present invention;

FIG. 13 is a diagram showing the path allocation table before the update in the transfer destination determining unit according to the first embodiment of the present invention;

FIG. 14 is a diagram showing the transfer path table before the update in the transfer destination determining unit according to the first embodiment of the present invention;

FIG. 15 is a diagram showing the path allocation table after the update in the transfer destination determining unit according to the first embodiment of the present invention;

FIG. 16 is a diagram showing the transfer path table after the update in the transfer destination determining unit according to the first embodiment of the present invention;

FIG. 17 is a diagram showing the path allocation table after further update in the transfer destination determining unit according to the first embodiment of the present invention;

FIG. 18 is a diagram showing the transfer path table after further update in the transfer destination determining unit according to the first embodiment of the present invention;

FIG. 22 is a diagram showing a path allocation table before update in the transfer destination determining unit according to the second embodiment of the present invention;

FIG. 23 is a diagram showing a transfer path table in the transfer destination determining unit according to the second embodiment of the present invention;

FIG. 24 is a diagram showing the path allocation table after the update in the transfer destination determining unit according to the second embodiment of the present invention;

FIGS. 27A and 27B are a flow chart showing an operation of the transfer destination determining unit according to the second embodiment of the present invention;

FIG. 31 is a diagram showing a path allocation table before update in the transfer destination determining unit according to the third embodiment of the present invention;

FIG. 32 is a diagram showing a transfer path table in the transfer destination determining unit according to the third embodiment of the present invention;

FIG. 33 is a diagram showing a transfer path status table before update in the transfer destination determining unit according to the third embodiment of the present invention;

FIG. 34 is a diagram showing a path allocation table before the update in the transfer destination determining unit according to the third embodiment of the present invention;

FIG. 35 is a diagram showing a path allocation table after the update in the transfer destination determining unit according to the third embodiment of the present invention;

FIG. 36 is a flow chart showing an operation of the transfer destination determining unit according to the second embodiment of the present invention when the operation mode (AM) and the transfer path status bit sequence are updated based on a fault;

DESCRIPTION OF THE PREFERRED EMBODIMENTS

Figure 1:
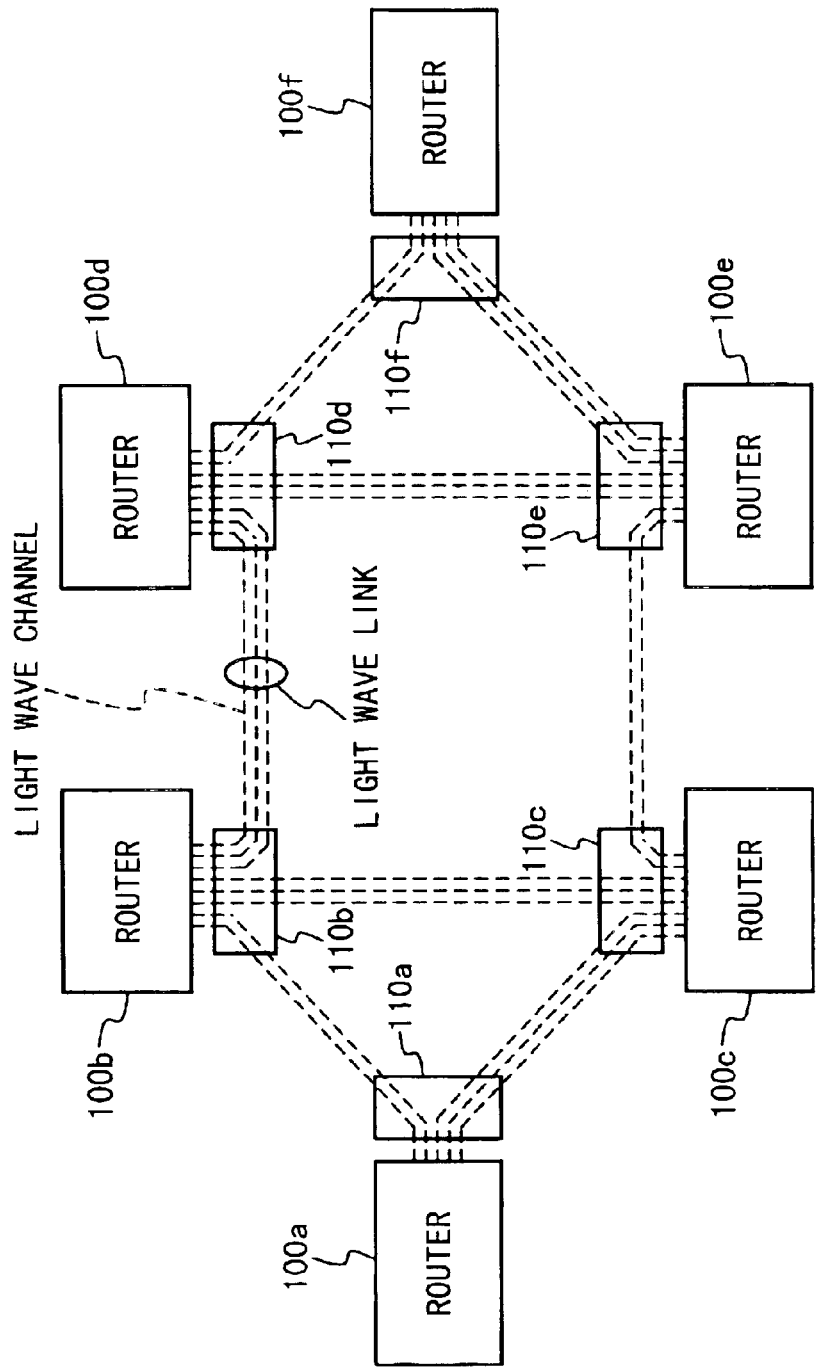
FIG. 1 is a diagram showing a conventional configuration of a network in which a plurality of DWDM channels are set in parallel.
Figure 2:
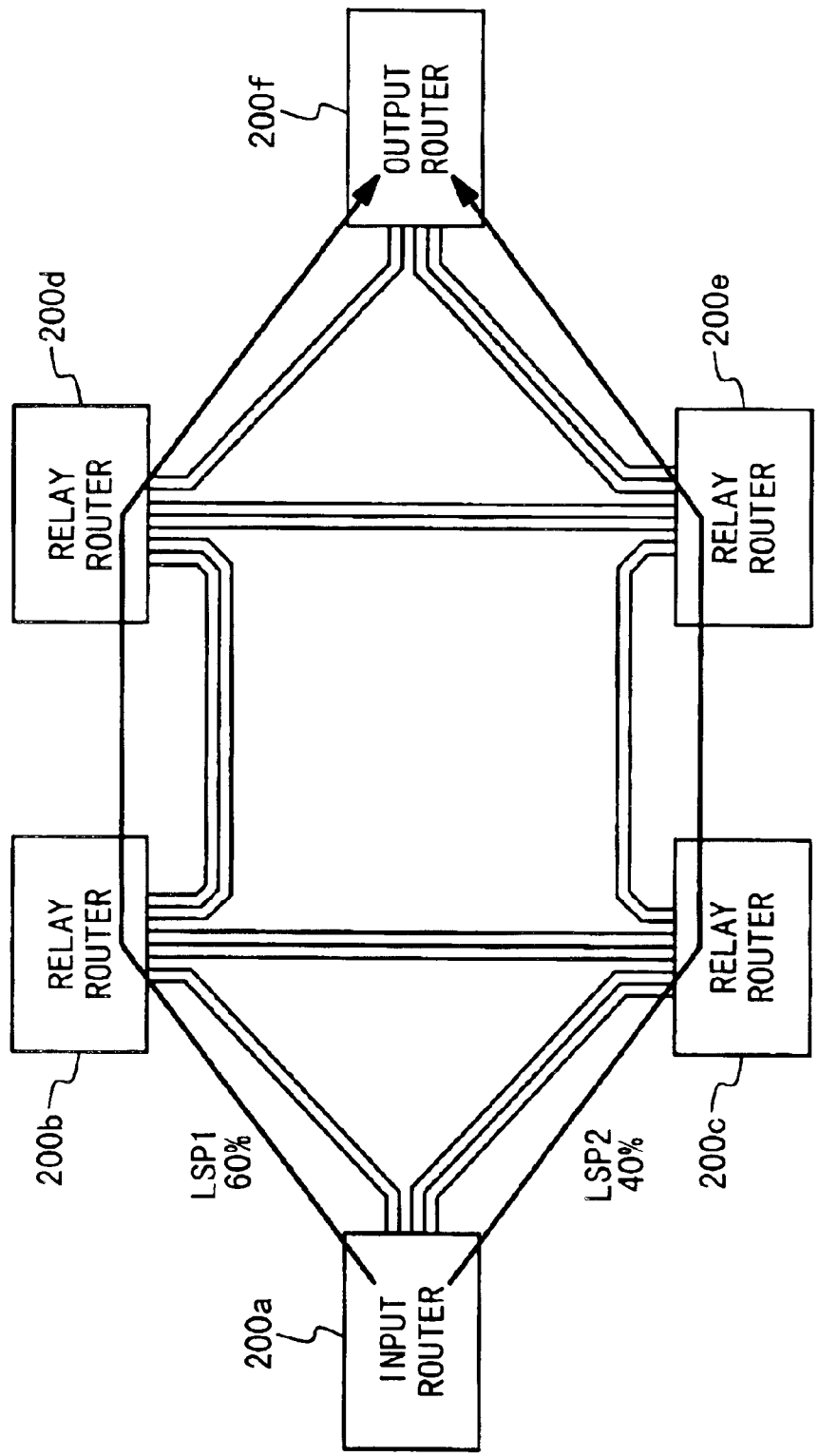
FIG. 2 is a diagram showing a conventional configuration of the network of the MPLS-based traffic engineering.
Figure 3:
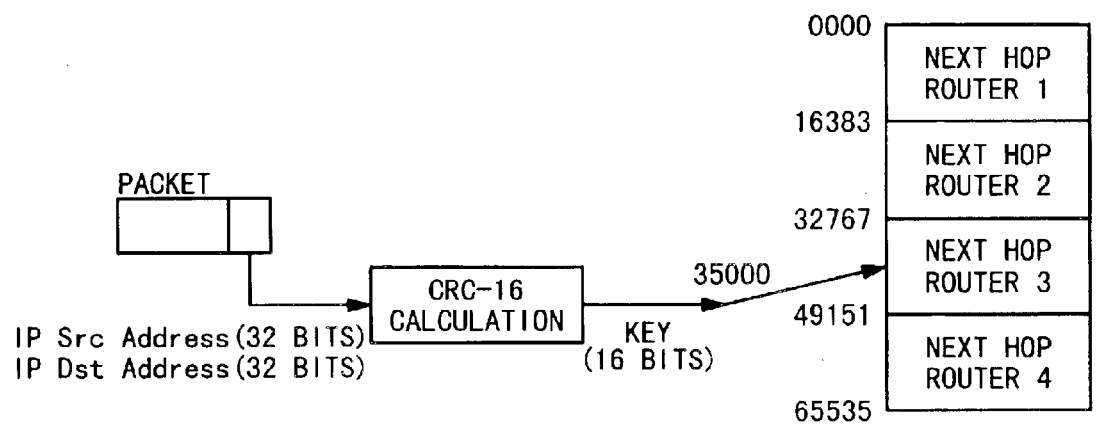
FIG. 3 is a diagram showing regions to which keys calculated through CRC calculation are allocated in Hash-Threshold method.
Figure 4A:
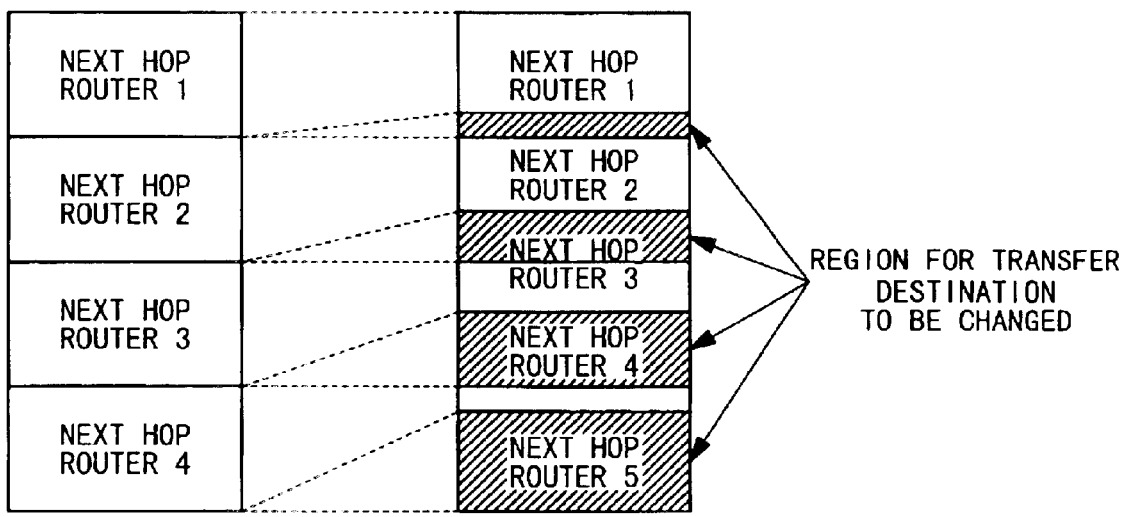
FIG. 4A is a diagram showing regions in which destinations are changed in conjunction with the change of a next hop router in the conventional examples.
Figure 4B:
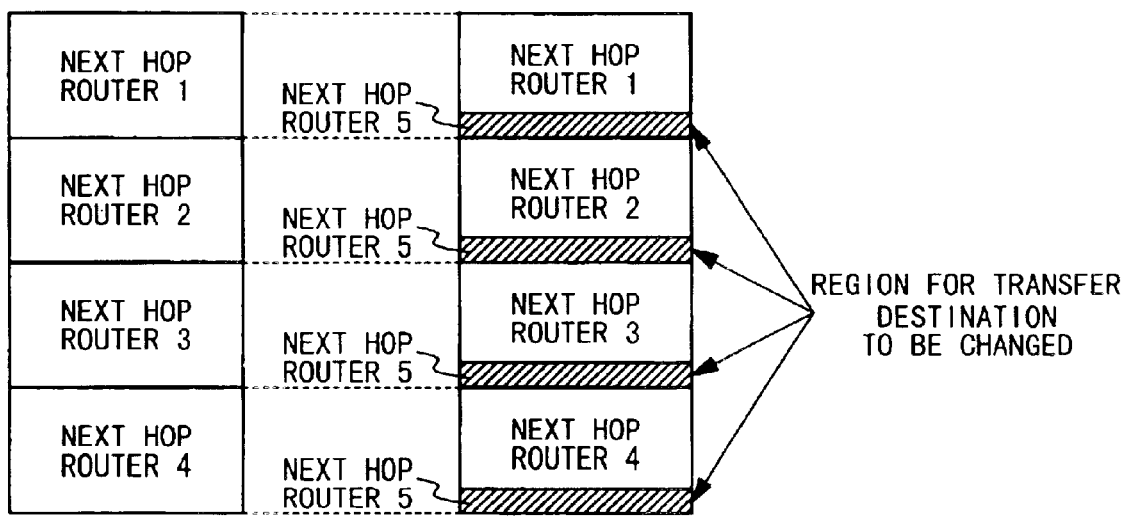
FIG. 4B is a diagram showing regions in which destinations are changed in conjunction with the change of a next hop router on theory.

Hereinafter, a datagram transfer unit such as a router of the present invention will be described below in detail with reference to the attached drawings.

In the datagram transfer unit according to the present invention, a transfer path number (PN) corresponding to a multi-path identifier (M) and a stream identifier (S) is held in a cache table 120 of a transfer destination determining unit. Thereby, execution of a datagram transfer is insured to allocate the same transfer path (P) to the same stream, and further it is determined whether or not the transfer path number (PN) determined by use of the cache table 120 is in [Transfer Inhibition State] in this datagram transferring process. Here, the stream identifier (S) is a flow identification data to identify gathered flows, and is calculated from data included in the header of a datagram. Moreover, the multi-path identifier (M) is data to uniquely recognize one or more transfer destination routes determined from a destination IP address (A) included in the header of an input datagram.

Therefore, in a first embodiment, in a case of an occurrence of an addition/deletion of a transfer path, or in a case of an occurrence of a change in a distribution ratio for each transfer path, it is possible to avoid a transfer to a transfer path (P) in [Transfer Inhibition State] and thereby possible to allocate to another transfer path (P), by changing only a transfer path table 131 and a path allocation table 130 in a path selecting section 13, without changing a correspondence to the transfer path (P) and the multi-path identifier (M) held in the cache table 120.

Also, in the first embodiment, with regard to the streams already allocated to the transfer path (P) changed to [Transfer Inhibition State] immediately after the change of the transfer path table 131 and the path allocation table 130 in the path selecting section 13, it is possible to change so as to allocate only a minimum number of streams among those allocated streams to another transfer path (P). Hence, it is possible to attain the allocating process of the transfer path (P) in accordance with the load distribution ratio minimizing the deterioration ratio.

Also, in the process for executing the allocation change of the transfer path (P) in the present invention, in order to carry out the allocation change of the transfer path (P) for each arrival of the datagram having the stream identifier (S) allocated to the transfer path (P) changed to [Transfer Inhibition State], after the change of the transfer path table 131 and the path allocation table 130 in the path selecting section 13, it is not necessary to perform the similar process for changing the allocation of the transfer path (P) on the datagram having the same stream identifier (S) as the datagram on which the allocation change is once performed. Moreover, with regard to the datagram needing the change of the transfer path (P), a transfer path number (PN) corresponding to a combination of a multi-path identifier (M) and a stream identifier (S) to be required is updated to a newly required transfer path number (PN). Therefore, after the update, it is never sent out to a network without any change of the transfer path (P) to the datagram on which the allocation changing process is performed.

Moreover, the present invention is designed such that the path selecting section 13 manages a maximum continuous allocation count (PW) of the streams for each transfer path and allocates the streams by each maximum continuous allocation count (PW). Therefore, the transfer path (P) can be allocated in accordance with the load distribution ratio only by referring to a registration state with regard to a maximum of two transfer paths (P), without referring to all the registration states of the transfer path numbers (PN) managed by the multi-path identifier (M). Hence, the transfer path number (PN) to be allocated can be updated in a short time.

In addition, U.S. patent application Ser. No. 09/511,773 filed on Feb. 24, 1999 by two inventors, one of who is an inventor of the present invention discloses an invention of transfer destination determining apparatus. The disclosure of the above application is incorporated herein by reference.

<First Embodiment>

Figure 5:
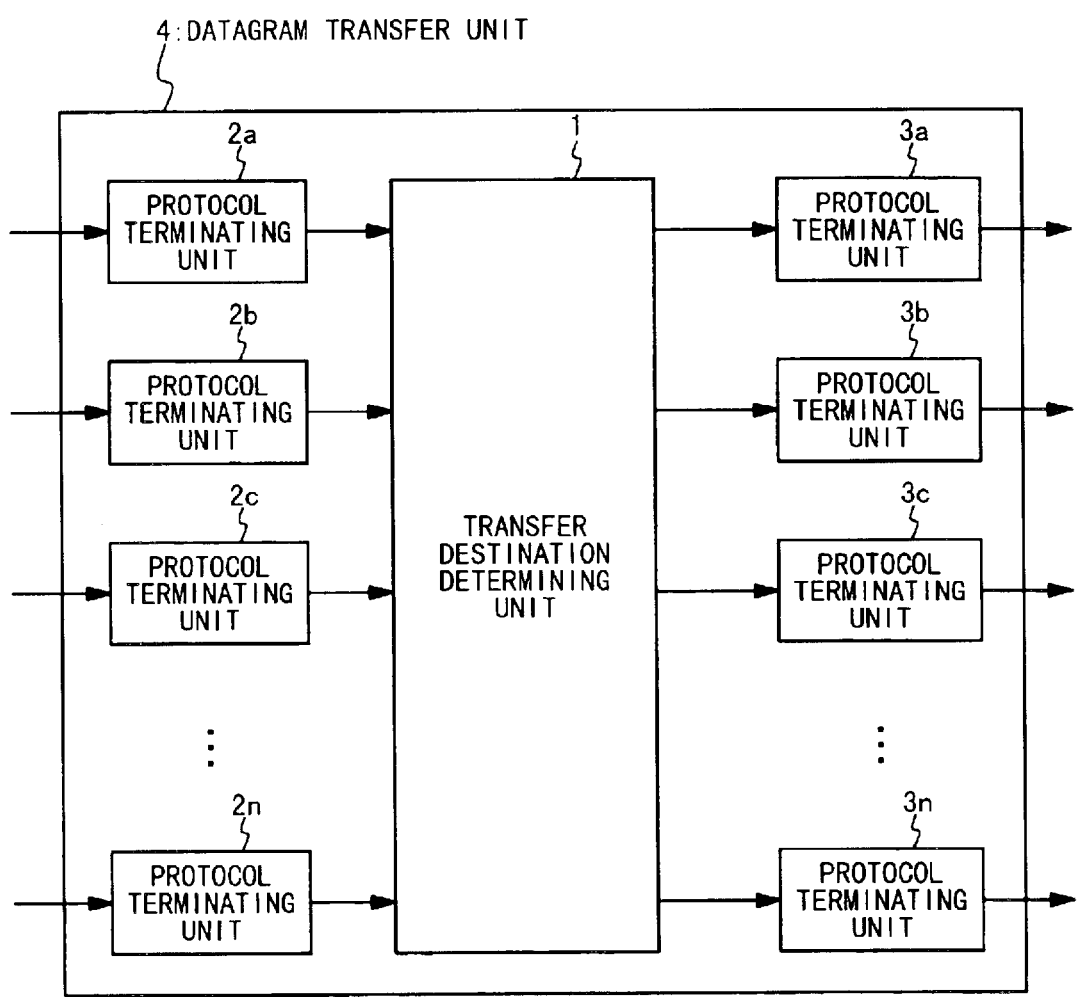
FIG. 5 is a block diagram showing the structure of a datagram transfer unit according to a first embodiment of the present invention.

The datagram transfer unit according to the first embodiment of the present invention will be described below in detail with reference to the attached drawings. FIG. 5 is a block diagram showing the structure of a datagram transfer unit 4 according to the first embodiment of the present invention.

Referring to FIG. 5, the datagram transfer unit 4 in the first embodiment is composed of a plurality of protocol terminating units 2a, 2b, 2c, . . . , 2n and 3a, 3b, 3c, . . . , 3n, and a transfer destination determining unit 1 which is selectively connected to the respective protocol terminating units. Here, each of the protocol terminating units 2a, 2b, 2c, . . . , 2n terminates a layer 3 or lower layers such as a network layer with regard to a received datagram, and transfers to the transfer destination determining unit 1.

On the contrary, the transfer destination determining unit 1 refers to a destination address included in a header of the datagram transferred from each of the protocol terminating units 2a, 2b, 2c, . . . , 2n, and determines a transfer destination based on the destination address. Then, the transfer destination determining unit 1 transfers the datagram to a corresponding one of the protocol terminating units 3a, 3b, 3c, . . . , 3n. Especially, if there are a plurality of transfer destination candidates, a stream identifier (S) calculated from a flow identification data for identifying a flow included in the received datagram is linked to a transfer destination corresponding to the stream identifier (S). Therefore, a transfer to a transfer destination allocated to each stream identifier (S) is attained.

Also, each of the protocol terminating units 3a, 3b, 3c, . . . , 3n, when receiving a datagram and an data for specifying a transfer destination from the transfer destination determining unit 1, carries out the setting of the layer 3 based on the data specifying the transfer destination, and transfers the received datagram to an external network. Here, the transfer destination determining unit 1 is logically composed of a plurality of protocol terminating units. However, all of the respective protocol terminating units or some of them may be physically composed of the same hardware circuit.

As an actual example, if a layer 2 is ATM, a virtual path to a destination is installed for each VP (Virtual Path). Therefore, there may be a case that although each VP is designed to be logically terminated at one network terminator, a network terminator terminating one physical line is designed to physically terminate a plurality of VPs.

Also, the protocol terminating units 2a, 2b, 2c, . . . , 2n on a transmitting side and the protocol terminating units 3a, 3b, 3c, . . . , 3n on a receiving side carry out logically different functions such as a transmission and a reception. However, they may be physically composed of the same hardware.

Figure 6:
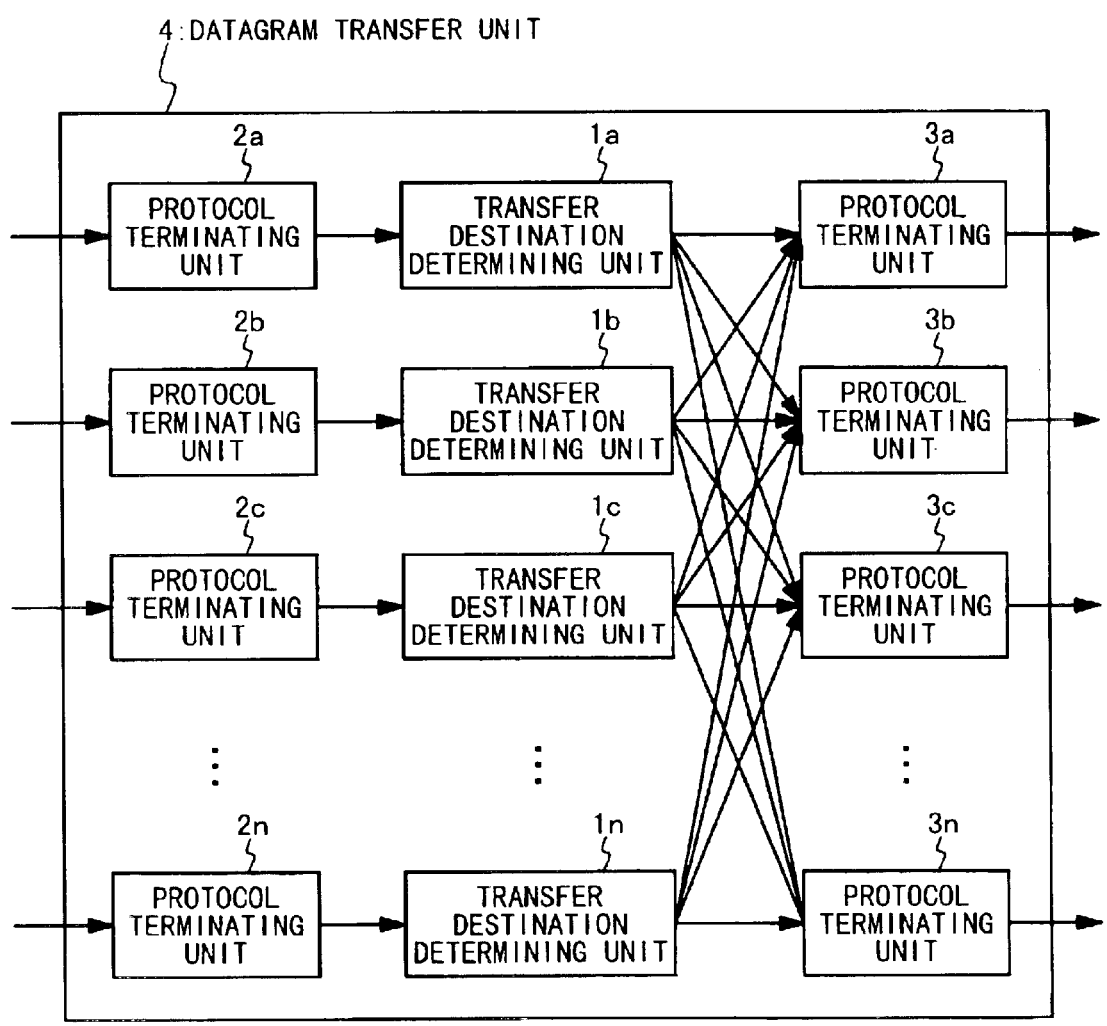
FIG. 6 is a block diagram showing that each of protocol terminating units is connected to each of dedicated transfer destination determining units.

Therefore, in the configuration exemplified in FIG. 5, one datagram transfer unit 4 has one transfer destination determining unit 1, and the plurality of protocol terminating units are connected to this transfer destination determining unit 1. However, it may be designed such that each of the protocol terminating units 2a, 2b, 2c, . . . , 2n is connected to each of dedicated transfer destination determining units 1a, 1b, 1c . . . , 1n, as shown in FIG. 6.

The configuration example of the transfer destination determining unit 1 shown in FIGS. 5 and 6 will be described below with reference to FIG. 7. FIG. 7 is a block diagram showing the configuration example of the transfer destination determining unit 1 according to the first embodiment.

Referring to FIG. 7, the transfer destination determining unit 1 is composed of a header extracting section 10, a route determining section 11, cache table access section 12, a path selecting section 13, an output unit selecting section 14, a cache table 120, a path allocation table 130 and a transfer path table 131. Here, in FIG. 7, when an IP datagram (D) (hereafter, referred to as a packet) is inputted from any of the protocol terminating units 2a, 2b, 2c, . . . , 2n, the header extracting section 10 extracts a destination IP address (A) for determining a transfer route from a header of this packet (D) and a stream identifier (S) that is an data for identifying gathered flows, and outputs the destination IP address (A) to the route determining section 11, and outputs the stream identifier (S) to the cache table access section 12.

The stream identifier (S) is the value calculated from the flow identification data included in the header of the packet (D). A plurality of flows are allocated to one stream identifier (S). Here, if the cache table access section 12 determines a plurality of transfer paths (P) for one stream identifier (S), the path selecting section 13 determines a transfer path (P) to which a packet is transferred, for each input stream identifier (S).

In this way, the packet belonging to the same flow can be transferred to the same transfer path by determining the transfer path (P) for each stream identifier (S). Therefore, it is possible to insure the order of packets reaching an end. Moreover, as mentioned above, the stream identifier (S) is calculated for the input packet (D), and the process is done in accordance with it. Hence, as compared with the management of the transfer path (P) for each flow, the number of entries can be largely dropped to thereby reduce the necessary memory capacity.

Also, the route determining section 11 determines a transfer destination route defined by the input destination IP address (A). The transfer destination route to be determined contains a single path having one transfer destination and a multi-path having a plurality of transfer destination candidates.

If the transfer destination is the single path, the route determining section 11 outputs the transfer path (P) to the output unit selecting section 14. Also, if the transfer destination is the multi-path, the route determining section 11 outputs the multi-path identifier (M) that is the data for uniquely identifying the route which becomes multi, to the cache table access section 12.

The multi-path identifier (M) and the stream identifier (S) are held each time they are calculated for the input packet (D). Then, after an input of a next packet (D), each time they are again required for this packet (D), they are updated. However, as this holding device, a register comprised by the cache table access section 12 and the like may be considered. However, the holding device according to the present invention is not limited to them. Various variations can be used without departing from the spirit and the scope of the present invention.

The cache table access section 12 reads out a cache transfer path number (CPN) corresponding to a combination of the multi-path identifier (M) and the stream identifier (S) from the cache table 120, and outputs this read out cache transfer path number (CPN) to the path selecting section 13. On the contrary, the path selecting section 13 receives this input cache transfer path number (CPN) as a temporary transfer path number (PN). [Temporary] is a concept on the processing. It is updated in the subsequent processes, as necessary. Therefore, this is described by using such a representation.

FIG. 8 shows the configuration example of the cache table 120. Referring to FIG. 8, the cache table 120 stores the multi-path identifier (M) and the stream identifier (S) in an address section, and stores the cache transfer path number (CPN) in a data section, correspondingly to the combination of the multi-path identifier (M) and the stream identifier (S). Here, the cache transfer path number (CPN) is an index number for identifying the plurality of transfer paths (P) prepared for each multi-path identifier (M). Therefore, at an initial state, [Non-Registered State] is stored in the cache transfer path number (CPN) of the data section. For this reason, the path selecting section 13 has a mechanism for identifying whether the cache transfer path number (CPN) received as the temporary transfer path number (PN) is at [Registered State] or [Non-Registered State].

The mechanism for identifying between [Registered State] and [Non-Registered State] may be attained such that one bit for an identification is installed and then the path selecting section 13 determines this bit, or may be attained such that, for example, in a case of a special index number in which all bits are 1, the path selecting section 13 receiving this determines as [Non-Registered State].

The path selecting section 13 will be described below in detail. The path selecting section 13, after the inputs of the multi-path identifier (M) and the cache transfer path number (CPN), uses the input cache transfer path number (CPN) as the temporary transfer path number (PN), and uses a path allocation table 130 shown in FIG. 9 and a transfer path table 131 shown in FIG. 10, and then determines a transfer path (P). FIG. 9 shows the configuration example of the path allocation table 130, and FIG. 10 shows the configuration example of the transfer path table 131.

Referring to FIG. 9, the path allocation table 130 manages a transfer inhibition bit sequence (PX), an allocation inhibition bit sequence (AX), a transfer allocation path number (PA), a continuous allocation count (PS) and the like, in the data section, correspondingly to the multi-path identifier (M) of the address section.

Also, referring to FIG. 10, the transfer path table 131 manages an allocation stream count (PC), a maximum stream count (PH), a maximum continuous allocation count (PW), a transfer path (P) and the like, in the data section, correspondingly to the combination of the transfer path number (PN) and the multi-path identifier (M) of the address section.

The respective data stored in the data sections of FIGS. 9 and 10 are treated as the data as described below.

At first, the transfer inhibition bit sequence (PX) stored in the data section of FIG. 9 is the bit sequence indicating whether or not for the transfer path (P) defined by the multi-path identifier (M) and the transfer path number (PN), the packet transfer is at [Transfer Inhibition State] for each transfer path (P). Here, for the convenience of explanation, let us suppose that the transfer allocation bit sequence is composed of 8 bits, and in those bits, in a case of [1], it is at [Transfer Inhibition State], and in a case of [0], it is at [Transfer Allowance State], and the n-th bit from a low order corresponds to a transfer path number (PN)=n−1.

By using the transfer inhibition bit sequence (PX) having the above-mentioned configuration, the path selecting section 13, if the transfer inhibition bit sequence (PX) corresponding to the cache transfer path number (CPN) determined by the cache table access section 12 is at [Transfer Allowance State], treats the cache transfer path number (CPN) in its original state as an effective transfer path number (PN), and outputs the transfer path (P) corresponding to this effective transfer path number (PN) to the output unit selecting section 14. Therefore, the packet transferring process is done. On the contrary, if the corresponding transfer inhibition bit sequence (PX) is at [Transfer Inhibition State], the transfer path number (PN) is changed from the cache transfer path number (CPN) to the transfer allocation path number (PA). It is used as the effective transfer path number (PN), and transferred to the corresponding transfer path (P).

Also, the allocation inhibition bit sequence (AX) is the bit sequence for indicating whether or not a new stream can be allocated to the transfer path (P) defined by the multi-path identifier (M) and the transfer path number (PN), for each transfer path (P). Here, for the convenience of explanation, similarly to the transfer inhibition bit sequence (PX), let us suppose that it is composed of 8 bits, and in the respective bits, in the case of [1], it is at [Transfer Inhibition State], and in the case of [0], it is at [Transfer Allowance State], and the n-th bit from the low order corresponds to the transfer path number (PN)=n−1.

Therefore, if the temporary transfer path number (PN) is at [Non-Registered State] or if the transfer inhibition bit sequence (PX) corresponding to the temporary transfer path number (PN) is at [Transfer Inhibition State], the path selecting section 13 carries out the process for selecting the transfer allocation path number (PA).

Also, the transfer allocation path number (PA) is composed of the same data as the transfer path number (PN) to be next re-allocated to a stream in which a transfer destination is not determined or it needs to be changed. Therefore, it is determined whether or not this transfer allocation path number (PA) needs to be changed each time it is allocated to the stream. If it is necessary, it is changed. The changed result is stored in the path allocation table 130. This process for changing the transfer allocation path number (PA) will be described below in detail with reference to FIGS. 12A and 12B.

Also, the continuous allocation count (PS) indicates how many streams are continuously allocated to the transfer path number (PN) at present. Therefore, each time the path selecting section 13 allocates the transfer allocation path number (PA) to the stream, the continuous allocation count (PS) correlated to the same transfer path number (PN) as the transfer allocation path number (PA) is added by 1.

Moreover, the allocation stream count (PC) stored in the data section of FIG. 10 indicates how many streams are actually allocated to the transfer path (P) defined by the transfer path number (PN) and the multi-path identifier (M). Therefore, this allocation stream count (PC) is changed in conjunction with the change of the number of actually allocated streams.

Also, the maximum stream count (PH) indicates a maximum number of streams that can be covered by each transfer path (P), for the transfer path (P) defined by the transfer path number (PN) and the multi-path identifier (M).

Also, the maximum continuous allocation count (PW) indicates how many streams can be continuously allocated to the transfer path (P) defined by the transfer path number (PN) and the multi-path identifier (M).

Therefore, the path selecting section 13, after the inputs of the multi-path identifier (M) and the cache transfer path number (CPN), reads out the transfer inhibition bit sequence (PX) corresponding to the multi-path identifier (M) from the path allocation table 130, and further obtains the allocation inhibition bit sequence (AX), the transfer allocation path number (PA) and the continuous allocation count (PS), as necessary.

On the basis of such data, the path selecting section 13 selects the transfer path number (PN) for the packet (D), and attains the allocating process in accordance with the load distribution ratio.

Also, the setting and the change of the setting are performed on the cache table 120, the path allocation table 130 and the transfer path table 131, as necessary. As the device for executing the setting and the change of the setting, there may be a manner done through a system by a user, a manner in which the system itself detects its necessity and it is done, and the like. However, it is not especially limited, in the present invention. Various variations can be carried out without departing from the spirit and the scope of the present invention.

Moreover, the output unit selecting section 14 in FIG. 7, when receiving the transfer path (P) and the packet (D), determines a protocol terminating unit 3 to be transferred from the transfer path (P), and outputs an output destination selection signal, and accordingly outputs the transfer path (P) and the packet (D) to the protocol terminating unit 3.

The transfer path (P) in this operation is the data required to determine the transfer destination and then transfer the packet to the transfer destination.

(Operation of First Embodiment)

The operation of the datagram transfer unit 4 according to the first embodiment will be described below in detail.

[When Cache Transfer Path Number (CPN) is in [Non-Registered State]]

At first, the operation is described which is executed when the cache transfer path number (CPN) inputted to the path selecting section 13 from the cache table access section 12 is the bit indicating [Non-Registered State].

(Allocation Changing Process)

In this operation, the cache transfer path number (CPN) inputted from the cache table access section 12 is at [Non-Registered State]. Therefore, the path selecting section 13 obtains a transfer allocation path number (PA) to be newly allocated from the path allocation table 130 based on the multi-path identifier (M), and sets this obtained transfer allocation path number (PA) as an effective transfer path number (PN).

(Transfer Path Output Process)

The transfer allocation path number (PA) is newly allocated as the effective transfer path number (PN) as mentioned above. Therefore, after the allocation, the path selecting section 13 reads out the corresponding transfer path (P) from the transfer path table 131 based on this effective transfer path number (PN) and the multi-path identifier (M) inputted from the route determining section 11, and outputs to the output unit selecting section 14.

(Transferring Process)

On the contrary, the output unit selecting section 14 executes the transfer in accordance with this input transfer path (P).

(Process of Updating Transfer Allocation Path Number)

Also, the path selecting section 13, in order to execute the transfer allocation process based on the load distribution ratio, determines a transfer allocation path number (PA) stored in the path allocation table 130 so as to be next allocated, in accordance with the load distribution ratio, and thereby updates the path allocation table 130.

Therefore, the path selecting section 13 adds one to an allocation stream count (PC) corresponding to the appropriate multi-path identifier (M) and transfer path number (PN), and stores it.

In accordance with the thus-updated transfer path table 131, the path selecting section 13 again determines the transfer inhibition bit sequence (PX) and the allocation inhibition bit sequence (AX) in the path allocation table 130, and stores them, and accordingly determines the transfer path table 131 and the path allocation table 130 in which the current allocation situation is reflected.

After that, the path selecting section 13 re-calculates the transfer allocation path number (PA) in the path allocation table 130 in accordance with the re-determined path allocation table 130 and the path allocation table 130, and stores it.

(Process of Updating Cache Table)

Moreover, in order to update the transfer path number (PN) stored in the cache table 120, the path selecting section 13 outputs the determined transfer path number (PN) as an update path number (PU) to the cache table access section 12. Also, the cache table access section 12 receiving this update path number (PU) uses the received update path number (PU) as the cache transfer path number (CPN), and updates a corresponding cache transfer path number in a transfer path number data defined by the stream identifier (S) and the multi-path identifier (M) stored in the cache table 120, to the received cache transfer path number (CPN).

[When Cache Transfer Path Number (CPN) is in [Registered State]]

In contrast to the above-mentioned case, the operation is described which is executed when the cache transfer path number (CPN) inputted to the path selecting section 13 from the cache table access section 12 is at [Registered State].

(Process of Determining Transfer Inhibition Bit Sequence)

In this operation, the cache transfer path number (CPN) inputted from the cache table access section 12 is at [Registered State]. Therefore, the path selecting section 13 reads out a corresponding transfer inhibition bit sequence (PX) by referring to the path allocation table 130 in accordance with the multi-path identifier (M), and determines whether or not a bit corresponding to the cache transfer path number (CPN) on this read out transfer inhibition bit sequence (PX) is at [Transfer Inhibition State]. {If Transfer Inhibition Bit Sequence (PX) Is At [Transfer Inhibition State]}. Here, as this determination result, if the corresponding bit on the transfer inhibition bit sequence (PX) is at [Transfer Inhibition State], the following process is carried out.

(Process of Re-calculating Transfer Inhibition Bit Sequence and Allocation Inhibition Bit Sequence)

At first, the path selecting section 13 refers to the transfer path table 131 in accordance with the multi-path identifier (M) inputted from the route determining section 11 and the temporary transfer path number (PN) inputted from the cache table access section 12, and subtracts 1 from a corresponding allocation stream count (PC), and then stores it.

In accordance with the transfer path table 131 newly obtained as mentioned above, the path selecting section 13 re-calculates the transfer inhibition bit sequence (PX) and the allocation inhibition bit sequence (AX) in the path allocation table 130, and stores them.

(Allocation Changing Process, Transfer Path Output Process and Transferring Process)

Similarly to the above-mentioned case, the path selecting section 13, in order to update the input transfer path number (CPN) to the transfer allocation path number (PA) and thereby specify the effective transfer path number (PN), obtains a transfer allocation path number (PA) to be newly allocated from the path allocation table 130 based on the multi-path identifier (M), and uses this obtained transfer allocation path number (PA) as the effective transfer path number (PN), and newly allocates the transfer allocation path number (PA) as the transfer path number (PN) in this way. Accordingly, after the allocation, the path selecting section 13 reads out a corresponding transfer path (P) from the transfer path table 131 based on this effective transfer path number (PN) and the multi-path identifier (M) inputted from the route determining section 11, and outputs to the output unit selecting section 14. On the contrary, the output unit selecting section 14 executes the transfer in accordance with this input transfer path (P).

(Process of Updating Transfer Allocation Path Number)

Moreover, the path selecting section 13 adds one to an allocation stream count (PC) corresponding to the combination of the appropriate multi-path identifier (M) and transfer path number (PN) in the transfer path table 131, and stores the added result. In accordance with the thus-updated transfer path table 131, the path selecting section 13 again determines the transfer inhibition bit sequence (PX) and the allocation inhibition bit sequence (AX) in the path allocation table 130, and stores them, and accordingly determines the transfer path table 131 and the path allocation table 130 in which the current allocation situation is reflected. After that, the path selecting section 13 re-calculates the transfer allocation path number (PA) in the path allocation table 130 based on the re-determined path allocation table 130 and the path allocation table 130, and stores it.

(Process of Updating Cache Table)

Moreover, similarly to the above-mentioned case, the path selecting section 13, in order to update the transfer path number (PN) stored in the cache table 120, outputs the determined transfer path number (PN) as the update path number (PU) to the cache table access section 12. Therefore, the cache table access section 12 receiving this update path number (PU) uses the received update path number (PU) as the transfer path number (PN), and updates the corresponding cache transfer path number in the transfer path number data defined by the stream identifier (S) and the multi-path identifier (M) stored in the cache table 120, to the received transfer path number (PN).

(When Transfer Inhibition Bit Sequence (PX) is in [Transfer Allowance State])

Also, in the process for determining the transfer inhibition bit sequence (PX), if a corresponding bit on the transfer inhibition bit sequence (PX) is at [Transfer Allowance State], the following processes are done.

(Transfer Path Output Process and Transferring Process)

In this case, similarly to the above-mentioned case, the path selecting section 13 recognizes the cache transfer path number (CPN) inputted from the cache table access section 12 as the effective transfer path number (PN), reads out the transfer path (P) from the transfer path table 131 based on this effective transfer path number (PN) and the multi-path identifier (M) inputted from the route determining section 11, and outputs to the output unit selecting section 14. On the contrary, the output unit selecting section 14 executes the transfer in accordance with this input transfer path (P).

(Whole Operation)

Figure 11:
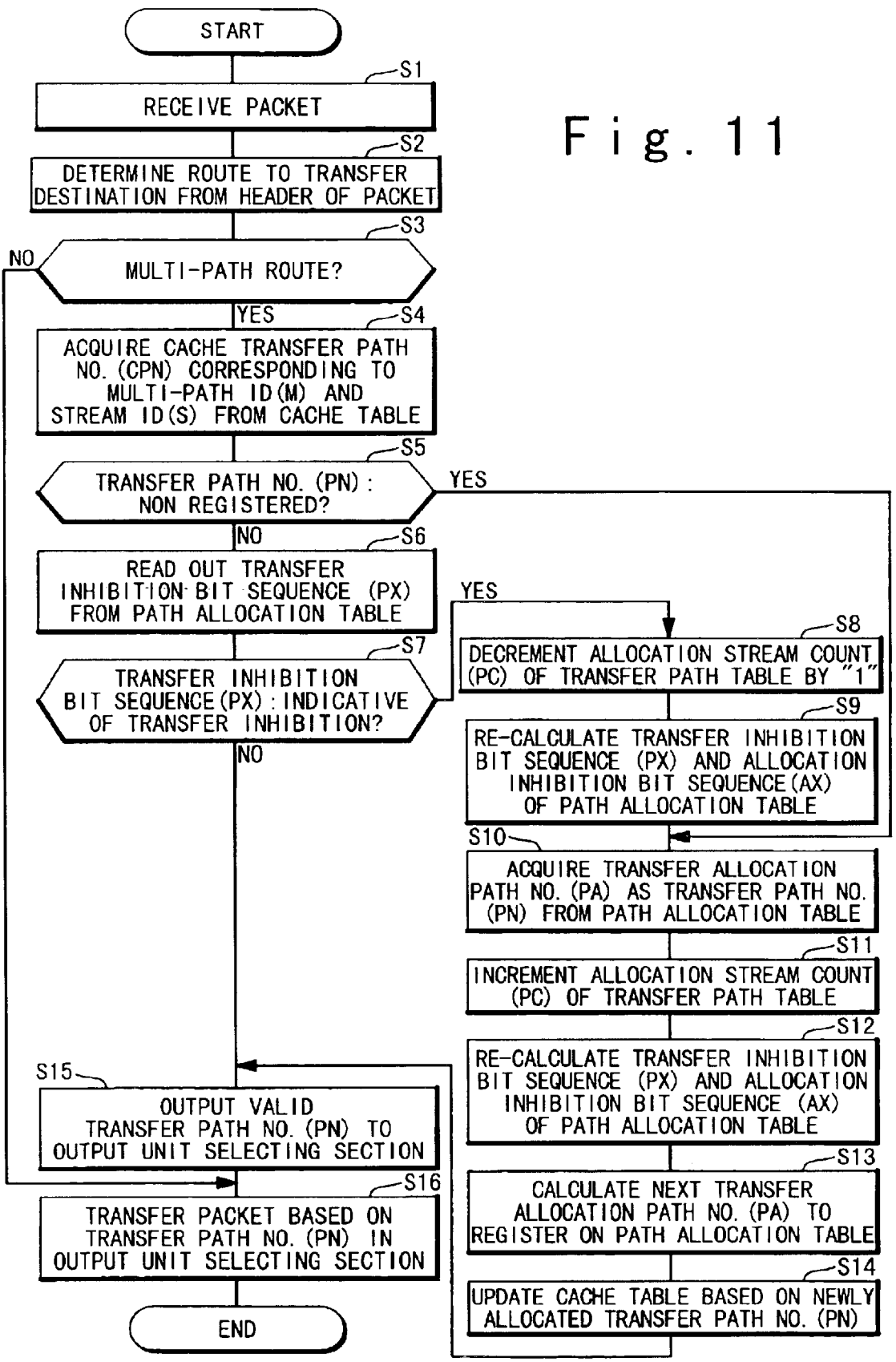
FIG. 11 is a flowchart showing an operation of the transfer destination determining unit according to the first embodiment of the present invention.

The whole operation according to the first embodiment including the above-mentioned respective operations will be described below in detail with reference to a flowchart shown in FIG. 11. FIG. 11 is the flowchart showing the flow of the operations in the process for determining the transfer destination of the packet according to the transfer destination determining unit 1 of the present invention.

Referring to FIG. 11, when a packet is firstly inputted to the datagram transfer unit 4 according to the present invention (Step S1), in the transfer destination determining unit 1, the header extracting section 10 extracts a destination IP address (A) and a stream identifier (S) from a header of the packet, outputs the stream identifier (S) to the cache table access section 12, and outputs the destination IP address (A) to the route determining section 11. The route determining section 11 determines a transfer destination route (Step S2).

Next, it is determined whether or not the transfer destination route determined at the step S2 targets a multi-path (Step S3). If it targets a single path (Step S3; No), a transfer path (P) implying the determined transfer destination route is outputted to the output unit selecting section 14, and the packet transfer is executed (Step S16).

On the contrary, if the transfer destination route determined at the step S2 targets the multi-path (Step S3; Yes), the route determining section 11 outputs the determined multi-path identifier (M) to the cache table access section 12 and the path selecting section 13. The cache table access section 12 uses this multi-path identifier (M) and the stream identifier (S) inputted from the header extracting section 10, and specifies a corresponding cache transfer path number (CPN) from the cache table 120 (Step S4).

When the cache transfer path number (CPN) is inputted from the cache table access section 12 as mentioned above, the path selecting section 13 sets this input cache transfer path number (CPN) as a temporary transfer path number (PN), and determines whether or not this temporary transfer path number (PN) is at [Non-Registered State] (Step S5). In this determination, as mentioned above, there may be a method of determining it on the basis of the bits indicating [Non-Registered State] installed in the transfer path number (PN) or the special bits in which all the bits are composed of 1, and the like.

Here, at the step S5, if the transfer path number (PN) indicates [Registered State] (Step S5; No), the path selecting section 13 refers to the path allocation table 130 in accordance with the input multi-path identifier (M), and reads out a transfer inhibition bit sequence (PX) (Step S6).

Next, it is determined whether or not a bit corresponding to the temporary transfer path number (PN) on this read out transfer inhibition bit sequence (PX) is a state bit indicating [Transfer Inhibition State] (Step S7).

As the determined result at the step S7, if the corresponding bit on the transfer inhibition bit sequence (PX) is at [Transfer Allowance State] (Step S7; No), the path selecting section 13 sets the temporary transfer path number (PN) as the effective transfer path number (PN), uses the multi-path identifier (M) and this transfer path number (PN), specifies the corresponding transfer path (P), and outputs this transfer path (P) to the output unit selecting section 14 (Step S15). After that, the output unit selecting section 14 transfers the packet in accordance with the input transfer path (P) (Step S16).

Also, as the determined result at the step S7, if the corresponding bit on the transfer inhibition bit sequence (PX) is at [Transfer Inhibition State] (Step S7; Yes), the path selecting section 13 refers to the allocation stream count (PC) from the transfer path table 131, in accordance with the combination of the multi-path identifier (M) and the temporary transfer path number (PN), and subtracts 1 from this value, and again stores it (Step S8).

Next, the path selecting section 13 re-calculates the transfer inhibition bit sequence (PX) and the allocation inhibition bit sequence (AX) on the path allocation table 130, in accordance with the allocation stream count (PC) stored in the transfer path table 131 updated at the step S8, and again stores this re-calculated transfer inhibition bit sequence (PX) and allocation inhibition bit sequence (AX) in the path allocation table 130 (Step S9).

The path selecting section 13 reads out the transfer allocation path number (PA) from the path allocation table 130 based on the multi-path identifier (M), and sets this value as the effective transfer path number (PN) (Step S10). Here, the cache transfer path number (CPN) set as the temporary transfer path number (PN) is discarded, and the transfer path number (PN) is replaced by the transfer allocation path number (PA).

After that, the path selecting section 13 adds one to the allocation stream count (PC) corresponding to the transfer path number (PN) that becomes effective on the transfer path table 131, and again stores it (Step S11).

Moreover, the path selecting section 13 recalculates the transfer inhibition bit sequence (PX) and the allocation inhibition bit sequence (AX) based on the transfer path table 131 re-calculated at the step S11, and updates the path allocation table 130 based on this value (Step S12).

After that, the path selecting section 13 reads out the allocation inhibition bit sequence (AX) by using the multi-path identifier (M), and calculates a next transfer allocation path number (PA) by using this allocation inhibition bit sequence (AX), and then stores it in the path allocation table 130 (Step S13). This method of calculating the next transfer allocation path number (PA) will be described below in detail with reference to FIGS. 12A and 12B.

Also, the path selecting section 13, in order to update the cache transfer path number (CPN) on the cache table 120 read out at the step S4 to the transfer path number (PN) re-allocated at the step S10, outputs this re-allocated transfer path number (PN) as the update path number (PU) to the cache table access section 12. On the contrary, the cache table access section 12, in accordance with the multi-path identifier (M) and the stream identifier (S) held in the register and the like, stores the update path number (PU) inputted from the path selecting section 13 in a corresponding cache transfer path number (CPN) in the data section, and updates it (Step S14).

After that, the path selecting section 13 outputs the transfer path (P) corresponding to the effective transfer path number (PN) to the output unit selecting section 14, as mentioned above (Step S15). On the contrary, the output unit selecting section 14 transfers the packet in accordance with the input transfer path (P) (Step S16).

Also, as the determined result at the step S5, if the transfer path number (PN) is at [Non-Registered State] (Step S5; Yes), the operational flow proceeds to the step S10. As mentioned above, the path selecting section 13 reads out the transfer allocation path number (PA) from the path allocation table 130 based on the multi-path identifier (M), and sets this value as the effective transfer path number (PN) (Step S10). After that, it adds one to the allocation stream count (PC) corresponding to the transfer path number (PN) that becomes effective on the transfer path table 131, and again stores it (Step S11).

Moreover, the path selecting section 13 re-calculates the transfer inhibition bit sequence (PX) and the allocation inhibition bit sequence (AX) on the basis of the transfer path table 131 re-calculated at the step S11, and updates the path allocation table 130 based on this value (Step S12). After that, it reads out the allocation inhibition bit sequence (AX) by using the multi-path identifier (M), calculates a next transfer allocation path number (PA) by using this allocation inhibition bit sequence (AX), and stores in the path allocation table 130 (Step S13).

Also, the path selecting section 13, in order to update the cache transfer path number (CPN) on the cache table 120 read out at the step S4 to the transfer path number (PN) re-allocated at the step S10, outputs this re-allocated transfer path number (PN) as the update path number (PU) to the cache table access section 12. On the contrary, the cache table access section 12, in accordance with the stream identifier (S) and the multi-path identifier (M) held in the register and the like, stores the update path number (PU) inputted from the path selecting section 13 in the corresponding cache transfer path number (CPN) in the data section, and updates it (Step S14).

After that, the path selecting section 13 outputs the transfer path (P) corresponding to the effective transfer path number (PN) to the output unit selecting section 14, as mentioned above (Step S15). On the contrary, the output unit selecting section 14 transfers the packet in accordance with the input transfer path (P) (Step S16).

The operation for calculating the next transfer allocation path number (PA) at the step S13 in the flowchart shown in FIG. 11 and re-calculating the transfer allocation path number (PA) to be stored in the path allocation table 130 will be described below in detail with reference to a flowchart shown in FIGS. 12A and 12B.

Figure 12:
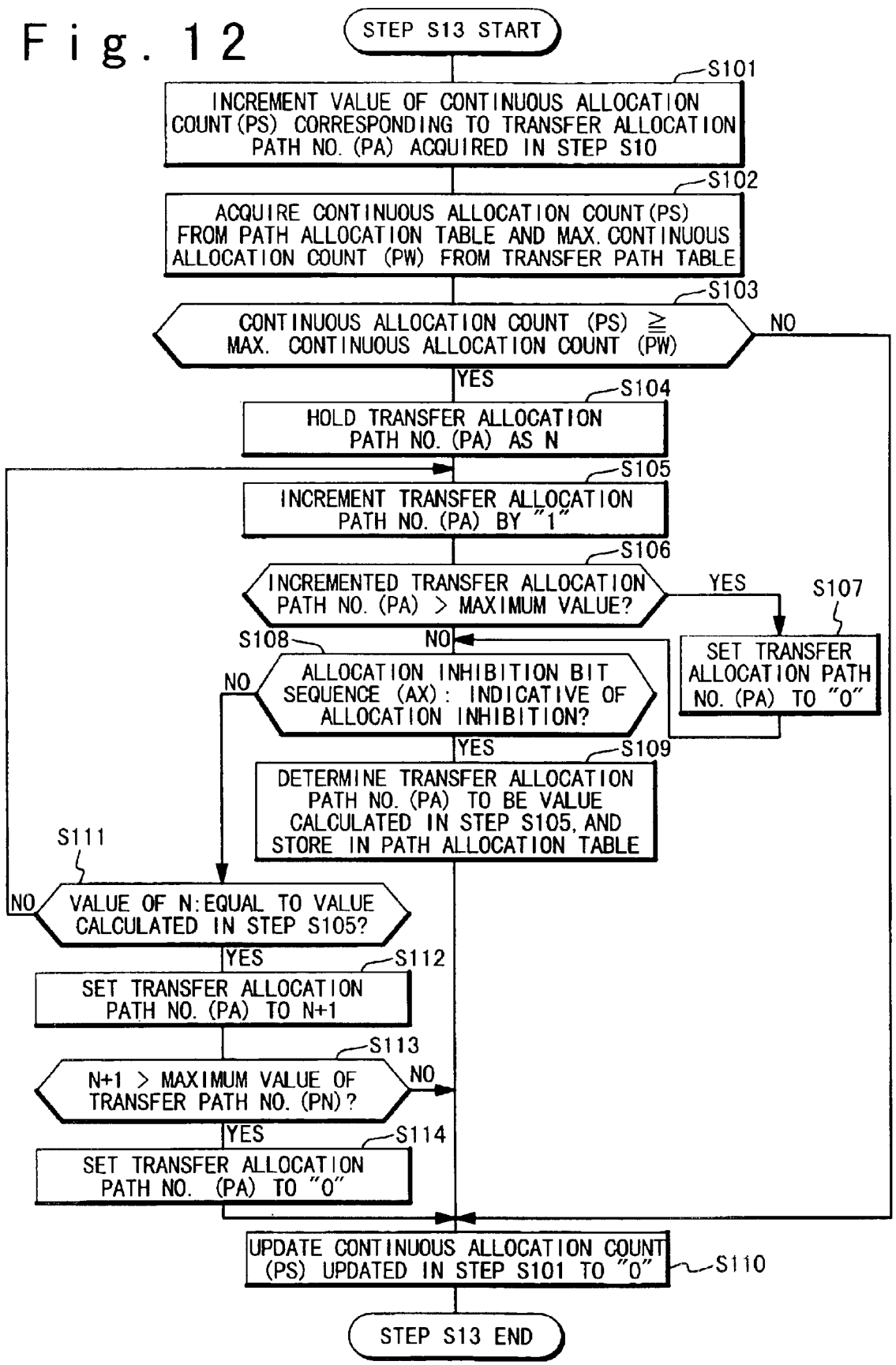
FIG. 12 is a flowchart showing an operation of the transfer destination determining unit when transfer allocation path number (PA) is updated.

Referring to FIGS. 12A and 12B, the path selecting section 13 adds one to the continuous allocation count (PS) corresponding to the transfer allocation path number (PA) obtained at the step S10 of FIG. 11 on the transfer path table 131 and updates it (Step S101).

Next, the path selecting section 13 specifies the continuous allocation count (PS) from the path allocation table 130 based on the multi-path identifier (M), and also specifies the maximum continuous allocation count (PW) from the transfer path table 131 based on the multi-path identifier (M) and the transfer allocation path number (PA) obtained at the step S10 of FIG. 11 (Step S102).

After that, it compares the continuous allocation count (PS) specified at the step S101 with the maximum continuous allocation count (PW) (Step S103).

As the comparison result at the step S103, if the continuous allocation count (PS) is the value less than the maximum continuous allocation count (PW) (Step S103; No), the path selecting section 13 ends the step S13 of FIG. 11 without changing the transfer allocation path number (PA).

On the contrary, as the comparison result at the step S103, if the continuous allocation count (PS) is the value equal to or greater than the maximum continuous allocation count (PW) (Step S103; Yes), the path selecting section 13 firstly sets the value of the transfer allocation path number (PA) obtained at the step S10 of FIG. 11 as N, and holds it in the register and the like (Step S104).

After that, the path selecting section 13 adds one to the value of the transfer allocation path number (PA) (Step S105), and determines whether or not the obtained value is greater than the maximum value of the transfer path number (PN) (Step S106).

At the step S106, if it exceeds the maximum value of the transfer path number (PN) (Step S106; Yes), the value of the transfer allocation path number (PA) is updated to 0 (Step S107), and the operational flow proceeds to a step S108.

Also, at the step S106, if it does not exceed the maximum value of the transfer path number (PN) (Step S106; No), the operational flow proceeds to the step S108, in its original state.

At the step S108, it is determined whether or not a state bit indicating [Allocation Inhibition State] is stored in a bit corresponding to the targeted transfer allocation path number (PA) by using the allocation inhibition bit sequence (AX) read out in accordance with the multi-path identifier (M) (Step S108).

In this determination, if the bit on the corresponding allocation inhibition bit sequence (AX) is at [Allocation Allowance State] (Step S108; No), the value obtained by adding 1 at the step S105 is set as the effective transfer allocation path number (PA), and stored in the path allocation table 130 (Step S109).

After that, the continuous allocation count (PS) to which 1 is added at the step S101 is updated to 0 (Step S110). Then, the step S13 of FIG. 11 is ended.

On the contrary, in the determination at the step S108, if the bit on the corresponding allocation inhibition bit sequence (AX) is at [Allocation Inhibition State] (Step S108; Yes), it is determined whether or not the value set as the transfer allocation path number (PA) is currently equal to the N value stored at the step S104 (Step S111). If it is not equal (Step S111; No), the operational flow returns back to the step S105. 1 is further added to the value of the transfer allocation path number (PA) (Step S105). After that, the similar operations are executed (on and after the step S106).

On the contrary, in the determination at the step S111, if the current value of the transfer allocation path number (PA) is equal to the N value (Step S111; Yes), the value of the transfer allocation path number (PA) is set to the value in which 1 is added to the N value stored at the step S104 (Step S112). This reason is as follows. That is, if all the allocation inhibition bit sequences (AX) are at [Allocation Inhibition State] since the transfer allocation path number (PA) is set to N+1, it is intended to prevent all the streams from being allocated to the transfer path number (PN)=[N].

After that, it is determined whether or not the N+1 value calculated at the step S112 exceeds the maximum value of the transfer path number (PN) (Step S113). Here, if it does not exceed the maximum value of the transfer path number (PN) (Step S113; No), in its original state, the transfer allocation path number (PA) is set to [N+1], and the step S13 of FIG. 11 is ended.

On the contrary, if it exceeds the maximum value of the transfer path number (PN) (Step S113; Yes), the value of the transfer allocation path number (PA) is set to [0] (Step S114). After that, the step S13 of FIG. 11 is ended.

The above-mentioned operations enable the value of the transfer allocation path number (PA) stored in the path allocation table 130 at the step S13 of FIG. 11 to be stored in accordance with the order of the value of the transfer path number (PN) and in accordance with the ratio of the maximum continuous allocation count (PW).

However, in the setting of the transfer allocation path number (PA) at the step S111, in addition to the above-mentioned method of returning to the original value, as another example, there may be a method of specifying the transfer path number (PN) having the minimum allocation stream count (PC) and setting this value as the transfer allocation path number (PA) and the like. However, the present invention is not limited to the above-mentioned method. The various variations may be carried out without departing from the spirit and the scope of the present invention.

In this way, the process for updating the transfer allocation path number (PA) can be attained in several clocks by using the hard circuit. Therefore, even if it is installed within the datagram transfer unit 4 and driven, the processing speed does not become extremely slow.

[When Allocation Stream Number (PC) Is Changed]

The operation of the path selecting section 13 in the case of the change in the allocation stream count (PC) will be described below in detail.

In the case of the change in the allocation stream count (PC), the path selecting section 13 compares the changed allocation stream count (PC) of the transfer path number (PN) with the maximum stream count (PH). In this comparison, there are a first comparison for setting the transfer inhibition bit sequence (PX) and a second comparison for setting the allocation inhibition bit sequence (AX).

(First Comparison)

Therefore, in the first comparison for setting the transfer inhibition bit sequence (PX), if the allocation stream count (PC) is greater than the maximum stream count (PH) as the comparison result, the transfer inhibition bit sequence (PX) corresponding to the transfer path number (PN) in the path allocation table 130 is set at [Transfer Inhibition State].

Also, if the allocation stream count (PC) is equal to or less than the maximum stream count (PH) as the first comparison result, the transfer inhibition bit sequence (PX) corresponding to the transfer path number (PN) in the path allocation table 130 is set at [Transfer Allowance State].

(Second Comparison)

Moreover, in the second comparison for setting the allocation inhibition bit sequence (AX), if the allocation stream count (PC) is equal to or greater than the maximum stream count (PH) as the comparison result, the allocation inhibition bit sequence (AX) corresponding to the transfer path number (PN) in the path allocation table 130 is updated to [Allocation Inhibition State].

Also, as the second comparison result, if the allocation stream count (PC) is less than the maximum stream count (PH), the allocation inhibition bit sequence (AX) corresponding to the transfer path number (PN) in the path allocation table 130 is updated to [Allocation Allowance State].

Here, if the cache transfer path number (CPN) is not allocated to the transfer path number (PN) and then the transfer allocation path number (PA) is allocated to it, the path selecting section 13 further adds one to the continuous allocation count (PS) read out from the path allocation table 130, and compares the maximum continuous allocation count (PW) in the transfer path table 131 with the continuous allocation count (PS), as a third comparison.

(Third Comparison)

As this third comparison result, if the continuous allocation count (PS) is less than the maximum continuous allocation count (PW) and if the value after the updating process of the allocation inhibition bit sequence (AX) corresponding to the transfer path number (PN) is changed to [Allocation Allowance State], the continuous allocation count (PS) to which 1 is added and which is then updated is stored in the path allocation table 130.

Also, as the third comparison result, if the continuous allocation count (PS) is greater than the maximum continuous allocation count (PW) or if the value after the updating process of the allocation inhibition bit sequence (AX) corresponding to the transfer path number (PN) is changed to [Allocation Inhibition State], the transfer allocation path number (PA) is updated by the operation shown in FIGS. 12A and 12B, and similarly, the continuous allocation count (PS) is updated to [0].

<Actually Example>

The operation example of the transfer destination determining unit 1 in the first embodiment of the present invention will be described below with reference to FIGS. 13 to 18. For the simplification of explanation, it is described under the target for only the case when the multi-path identifier (M) is [0].

At a time of a setup of the datagram transfer unit 4, let us suppose that the data shown in FIGS. 13 and 14 are set for entries in which the multi-path identifiers (M) in the path allocation table 130 and the transfer path table 131 are [0].

Under this setting, the route determining section 11 performs the load distribution on a path 0-0, a path 0-1, a path 0-2, a path 0-3 and a path 0-4 at the ratio that a packet (PKTO) in which a stream having a multi-path identifier (M) of [0] is determined is 2:3:5:5:1.

Therefore, if a packet 1 (D0) having a multi-path identifier (M) of [0] is firstly inputted to the transfer destination determining unit 1, the path selecting section 13 defines the transfer path number (PN) as [0] stored as the transfer allocation path number (PA). At this time, the continuous allocation count (PS) stored in the path allocation table 130 is updated to [1]. However, the maximum continuous allocation count (PW) is less than [2]. Therefore, the transfer allocation path number (PA) is kept at [0], and it is not updated.

After that, if the multi-path identifier (M) is [0] and a packet (D1) forming a flow different from the packet (D0) arrives, let us suppose that the transfer path number (P) read out by the cache table access section 12 is at [Non-Registered State]. So, the path selecting section 13 similarly sets a transfer allocation path number (PA)=[0] for the transfer path number (PN).

Accordingly, the continuous allocation count (PS) in the path allocation table 130 is updated to [2], and this value agrees with the value [2] of the maximum continuous allocation count (PW). Therefore, the path selecting section 13 updates the transfer allocation path number (PA) to [1], and clears the continuous allocation count (PS) to [0].

After that, if a packet (D2) having a multi-path identifier (M) of [0] further arrives and the transfer path number (P) read out by the cache table access section 12 is at [Non-Registered State], the transfer path number (PN) is allocated to a transfer allocation path number (PA)=[1].

Accordingly, the continuous allocation count (PS) is updated to [1]. Here, the continuous allocation count (PS)=[1] is less than a value [3] of the maximum continuous allocation count (PW) corresponding to the transfer path number (PN)=[1]. Therefore, the transfer allocation path number (PA) is kept at [1], and it is not updated.

After that, the similar process is performed on the packet (D) belonging to a flow in which a multi-path identifier (M) of a new arrival is [0]. Then, the transfer path (P) is allocated.

Therefore, due to the repetition of the above-mentioned processes, in the packet (D) in which the multi-path identifier (M) is determined, at a time of an arrival of a packet of a stream identifier (S) in which a transfer path number (PN) is not registered in the cache table 120, the allocation of the transfer path (P) is executed at a ratio of two times for the path 0-0: three times for the path 0-1: five times for the path 0-2: five times for the path 0-3: one time for the path 0-4.

In this process, the path selecting section 13 increments the allocation stream count (PC) by 1 each time the path is allocated to the stream.

Therefore, when the allocation stream count (PC) to the transfer path number (PN)=[0] reaches [2×256], it becomes the value identical to the value [2×256] of the maximum stream count (PH). Therefore, the allocation inhibition bit sequence (AX) to the transfer path number (PN)=[0] is set at [Allocation Inhibition State (=1)]. After that, the path selecting section 13 does not execute the allocation to the transfer path number (PN)=[0].

Similarly, with regard to another transfer path number (PN), when the allocation stream count (PC) reaches the maximum stream count (PH), the allocation inhibition bit sequence (AX) is set at [Allocation Inhibition State]. The allocation to the transfer path number (PN) corresponding to this allocation inhibition bit sequence (AX) is not done.

The execution of the above-mentioned processes enables the allocation stream count (PC) to each transfer path (P) and the maximum stream count (PH) to finally agree with each other, in the transfer path table 131, as shown in FIGS. 15 and 16. Therefore, all the bits of the allocation inhibition bit sequence (AX) in the path allocation table 130 become at the allocation inhibition state (=[1]).

The case of the change in the setting ratio of the load distribution from the states in FIGS. 15 and 16 in the path allocation table 130 and the transfer path table 131 will be described below.

Here, with regard to the path allocation table 130 and the transfer path table 131, let us suppose that the changes of the data settings shown in FIGS. 17 and 18 are done from the states set as shown in FIGS. 15 and 16. In this setting change, the allocation to the path 0-3 is deleted, and the allocation to the path 0-5 is newly added. Also, as for the allocation ratio to the respective paths, the load distribution is done at a ratio of 4:3:3:4:1, in the order of the path 0-0, the path 0-1, the path 0-2, the path 0-4 and the path 0-5.

Therefore, the allocation stream count (PC) corresponding to the path 0-2 until the time point immediately before the setting change is [5×256]. However, it is necessary to reduce to [3×256].

Also, the allocation stream count (PC) corresponding to the path 0-3 is allocated as [5×256]. However, it is necessary that this stream is allocated to all other transfer paths.

Therefore, with regard to the transfer path number (PN)=[2] and the transfer path number (PN)=[3], the relation of [Allocation Stream Number (PC)]>[Maximum Stream Number (PH)] is established. Therefore, the transfer inhibition bit sequence (PX) stored in the path allocation table 130 is set at [Transfer Inhibition State]. Hence, in a case of arrivals of packets allocated to the transfer path number (PN) =[2] and the transfer path number (PN)=[3], the path selecting section 13 changes the transfer path number (PN) with regard to this packet from the temporarily allocated cache transfer path number (CPN) to the transfer allocation path number (PA).

After that, as for the transfer inhibition bit sequence (PX) of the transfer path number (PN)=[2], a relation of [Allocation Stream Number (PC)]≦[Maximum Stream Number (PH)] is established since the allocation stream count (PC) is reduced up to [3×256] of the maximum stream count (PH). Therefore, as soon as this relation is established, the setting is changed from [Transfer Inhibition State] to [Transfer Allowance State].

Also, in the path 0-0, the path 0-4 and the path 0-5, it is necessary to increase the allocations correspondingly to the number of flows of [2×256], [3×256] and [1×256], respectively. Therefore, by setting the maximum continuous allocation counts (PW) to 2, 3 and 1, respectively, the paths allocated to the path 0-2 and the path 0-3 are re-allocated at a ratio of 2:3:1 to the path 0-0, the path 0-4 and the path 0-5.

Therefore, the above-mentioned configuration enables the present invention to provide the following effects.

At first, as the first effects, when the transfer path is added or deleted, or when the setting ratio is changed, the operation according to the present invention enables the setting of only the minimum packets to be changed. Therefore, it is possible to attain the packet transfer minimizing the deterioration rate.

This is because the transfer path for each stream can be individually set by using the cache table.

Also, as the second effect, when the transfer path is added or deleted, or when the setting ratio is changed, the reflection of the setting can be done at a high speed.

This reason is as follows. That is, due to the installation of the device for determining the transfer data state for each transfer path, it is enough to change the setting of only the table managed by the path selecting section without directly updating the cache table in which it takes a long time to update.

Also, as the third effect, the process for allocating the transfer path based on the distribution ratio can be installed by using a small number of memory accesses and an easy hardware circuit.

This is because the allocation of the transfer path is attained by using the following two procedures. At first, the first procedure is the procedure for updating the allocation inhibition bit sequence corresponding to the transfer path in which the allocation stream count is changed, and then carrying out the allocation change determination based on this updated allocation inhibition bit sequence. Therefore, the allocation changing process targets only the maximum of two transfer path numbers of the cache transfer path number and the transfer allocation path number for each packet process. And, the second procedure is the procedure for attaining the update of the transfer allocation path number based on the ratio of the maximum stream count of the transfer path table, in accordance with the order of the transfer path number, on the basis of the allocation inhibition bit sequence. Those two procedures can be both processed by a small number of overheads and attained by the simple configuration. Moreover, the memory reference does not require a wide bit width for a memory interface. Therefore, it is possible to process and attain at a high speed.

<Second Embodiment>

Also, the second embodiment exemplifies a device different from that of the first embodiment, with regard to the method of selecting the transfer path (P) in the path selecting section 13.

The first embodiment is designed such that the transfer path (P) is allocated to the transfer path number (PN) divided for each multi-path identifier (M). Therefore, when the transfer path (P) is allocated to the packet received by the datagram transfer unit 4, the path selecting section 13 refers to the multi-path identifier (M) and the transfer path number (PN). Accordingly, the transfer is allowed in accordance with the transfer inhibition bit sequence (PX) corresponding to this multi-path identifier (M). And, the allocation is performed in accordance with the ratio of the maximum continuous allocation count (PW) so as not to exceed the maximum stream count (PH), on the transfer path number (PN) for which the allocation is allowed in accordance with the allocation inhibition bit sequence (AX).

On the contrary, in the second embodiment, a channel identifier (C) for individually identifying physical links connected to a datagram relaying device 4 is managed on a channel path table 134, correspondingly to the multi-path identifier (M) and the transfer path number (P). Moreover, a transfer path status bit sequence (PD) indicating whether or not a fault has occurred on the transfer path (P) corresponding to the channel identifier (C) is managed on a path allocation table 132, correspondingly to the multi-path identifier (M).

Also, the second embodiment is designed as follows. That is, when a fault has occurred in any section of a transfer path (P) managed by a certain multi-path identifier (M), a transfer inhibition determination for determining whether or not a transfer to a transfer path number (P) is possible refers to the transfer path status bit sequence (PD), instead of the transfer inhibition bit sequence (PX). Moreover, the process for allocating the transfer path (P) refers to the transfer path status bit sequence (PD), instead of the allocation inhibition bit sequence (AX).

Therefore, when a transfer destination is allocated to a stream needing a change of a transfer path (P) allocated until this time because of an occurrence of a fault in accordance with a load distribution ratio, this case does not require a re-calculation process of the maximum stream count (PH) covered by each transfer path (P), by using a software. This reason is as follows. That is, when the allocation is changed, the path selecting section 13 need not refer to the allocation inhibition bit sequence (AX) and the transfer inhibition bit sequence (PX) whose values are changed because of the update of the maximum stream count (PH).

Therefore, in the second embodiment, when a transfer destination is allocated to a stream needing a change of an allocated transfer path (P) because of an occurrence of a fault in accordance with a load distribution allocation ratio, an allocation changing process is done in accordance with a transfer path state bit. Therefore, it is possible to avoid the usage of an allocation inhibition bit sequence (AX) that is changed in conjunction with a change of a maximum stream count (PH) as described in the first embodiment. Hence, the load distribution allocation can be executed at a high speed without the execution of the re-calculating process using the software of the maximum stream count (PH).

Figure 19:
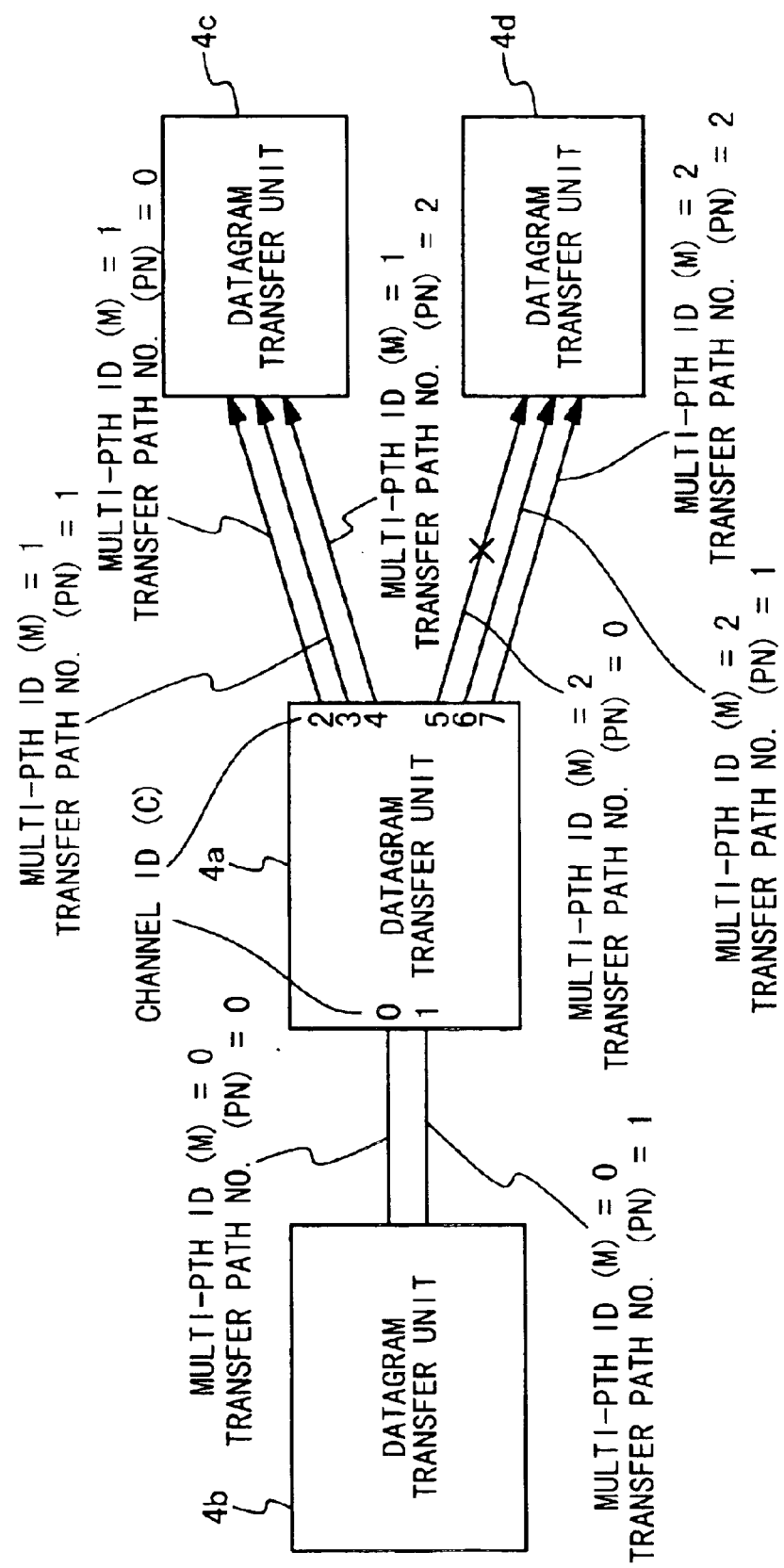
FIG. 19 is a block diagram showing the configuration of a network of datagram transfer units according to a second embodiment of the present invention.

When the second embodiment is described by using the example shown in FIG. 19, let us suppose that in a datagram transfer unit 4a, one or more transfer paths (P) are respectively set between other datagram transfer units 4b, 4c and 4d. This is assumed, for example, as follows. That is, between the datagram transfer units 4a, 4b, the multi-path identifier (M) is [0], and two transfer paths (P) allocated in which the transfer path numbers (PN) are [0] and [1]. Between the datagram transfer units 4a, 4c, the multi-path identifier (M) is [1], and three transfer paths (P) are allocated in which the transfer path numbers (PN) are [0], [1] and [2]. And, between the datagram transfer units 4a, 4d, the multi-path identifier (M) is [2], and three transfer paths (P) are allocated in which the transfer path numbers (PN) are [0], [1] and [2].

Figure 21:
FIG. 21 is a diagram showing a channel path table in the transfer destination determining unit according to the second embodiment of the present invention.

As shown in FIG. 21, in the second embodiment, on the channel path table 134, the channel identifier (C) is stored in an address section. So as to correspond to it, the multi-path identifier (M) and the transfer path number (PN) are stored in a data section.

Figure 20:
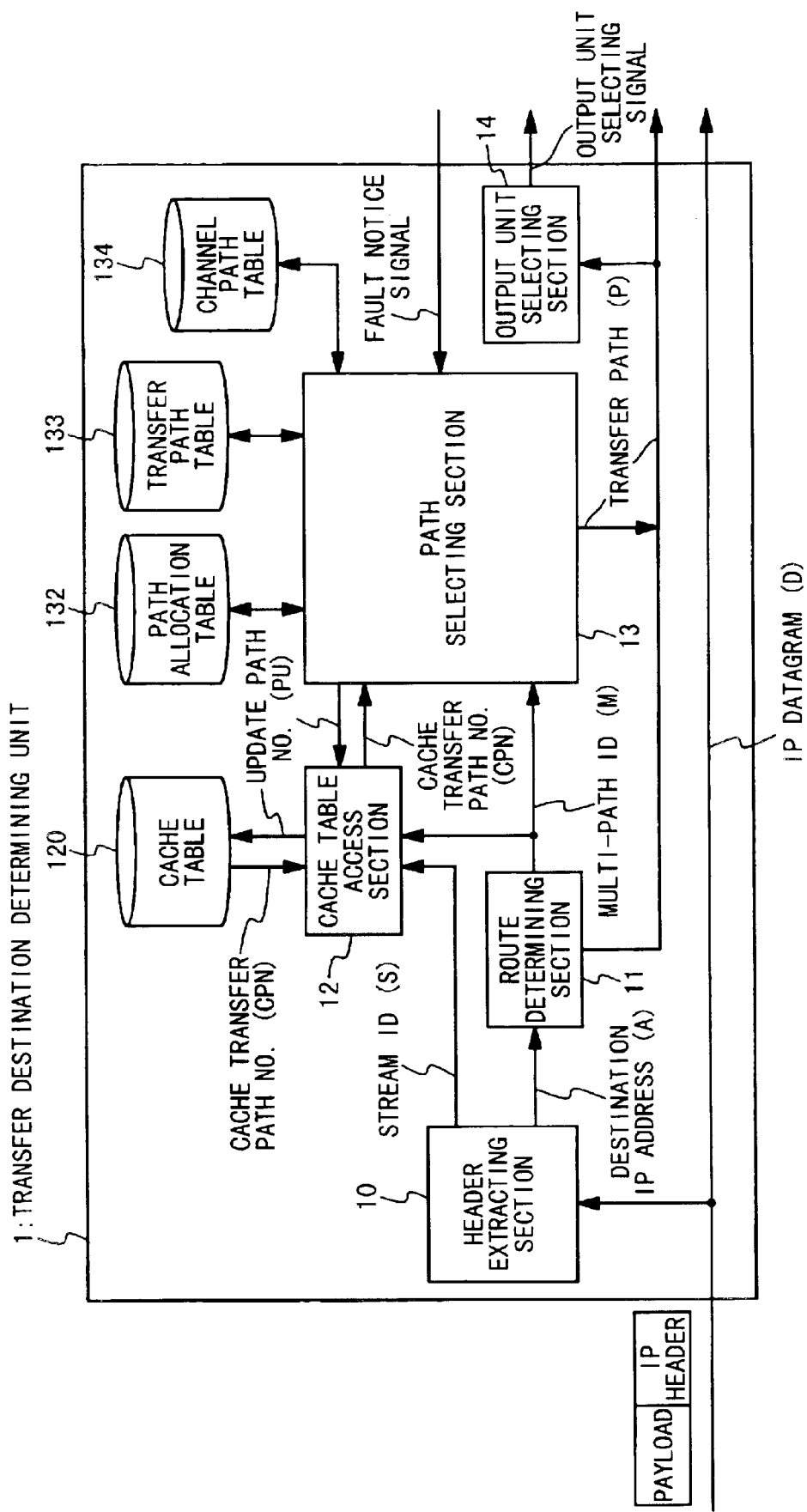
FIG. 20 is a block diagram showing the structure of a transfer destination determining unit of the datagram transfer unit according to the second embodiment of the present invention.

Therefore, referring to FIG. 20, the path selecting section 13 in the transfer destination determining unit 1 is further connected to the channel path table 134, as compared with the first embodiment.

In the configuration shown in FIG. 20, at a normal time when any fault is not induced on the transfer path (P), in the transfer destination determining unit 1, similarly to the first embodiment, the cache table access section 12 selects the cache transfer path number (CPN) based on the stream identifier (S) inputted from the header extracting section 10 and the multi-path identifier (M) inputted from the route determining section 11. Moreover, the path selecting section 13 receives this cache transfer path number (CPN) as the temporary transfer path number (PN), and determines the transfer path (P) based on this temporary transfer path number (PN) and the multi-path identifier (M).

On the contrary, if any fault has occurred on the transfer path (P), namely, if in the datagram transfer unit 4a, any fault occurs on a physical link to which the transfer path (P) is allocated, and thereby the impossibility of the transmission/reception of the packet is detected and this detected result is inputted to the path selecting section 13 by using a fault report signal, the path selecting section 13 refers to the channel path table 134 based on the channel identifier (C) corresponding to the transfer path (P) which becomes at [Transfer Inhibition State] because of the occurrence of the fault, and then specifies the multi-path identifier (M) and the transfer path number (PN).

Also, the path selecting section 13 specifies the transfer path status bit sequence (PD) corresponding to this specified multi-path identifier (M), from the path allocation table 132, and stores the state bit indicating [Transfer Inhibition State] in the bit corresponding to the transfer path number (PN) similarly specified on this specified transfer path number (PN).

Accordingly, when the allocation change is performed on the packet needing the change of the allocation of the transfer path (P), the allocation change is performed on the transfer path (P) correlated to the combination of the transfer path number (PN) and the multi-path identifier (M), which is not at [Transfer Inhibition State], by referring to the transfer path status bit sequence (PD), in accordance with the ratio of the maximum continuous allocation count (PW) in the transfer path table 133 and in accordance with the order of the transfer path number (PN), similarly to the first embodiment.

In order to attain the above-mentioned operations, the path allocation table 132 installed in the transfer destination determining unit 1 to which two parameters are added as shown in FIG. 22 is stored as compared with the first embodiment.

Referring to FIG. 22, in the path allocation table 132, the transfer inhibition bit sequence (PX), the allocation inhibition bit sequence (AX), the transfer allocation path number (PA) and the continuous allocation count (PS) are stored in the data section, correspondingly to the multi-path identifier (M) stored in the address section, similarly to the first embodiment. Moreover, an operation mode (AM) and the transfer path status bit sequence (PD) are stored differently from the first embodiment. Here, the transfer inhibition bit sequence (PX), the allocation inhibition bit sequence (AX), the transfer allocation path number (PA) and the continuous allocation count (PS) are similar to those of the first embodiment. So, their explanations are omitted.

Also, the operation mode (AM) indicates whether or not in one or more transfer paths (P) corresponding to the multi-path identifier (M), any fault occurs on one or more physical links within the physical links corresponding to the respective transfer paths (P). When the occurrence of the fault on the physical link is reported by using the fault report signal, a state bit indicating [Trouble State] is stored in the operation mode (AM) corresponding to the specified multi-path identifier (M). Therefore, at the normal time, a state bit indicating [Normal State] is stored. When the occurrence of the fault on the transfer path (P) is reported, it is updated to the state bit indicating [Trouble State]. Here, the bit configuration indicating [Normal State] and [Trouble State] is not limited. If it is the configuration enabling the identification of the state, any configuration can be applied without departing from the essentials of the present invention.

Also, in the transfer path status bit sequence (PD), each bit corresponds to each of the transfer path numbers (PN), and indicates an occurrence state of a fault in each transfer path number (PN) divided by the multi-path identifier (M).

Here, for example, let us suppose that [Transfer Allowance State] is represented by [0] and [Transfer Inhibition State] is represented by [1]. In this case, there are a total of 8 kinds of combinations of the transfer path numbers (PN) and the multi-path identifiers (M) in the datagram transfer unit 4a, as shown in FIG. 19. In the case when the channel identifiers (C)=[0] to [7] are allocated to the combinations, if a fault occurs in the transfer path (P) corresponding to the channel identifier (C)=[5] as shown in FIG. 19, the transfer path status bit sequence (PD) is represented by [00000001] since [1] indicating [Transfer Inhibition State] is stored in a bit in which a transfer path number (PN) of a transfer path status bit sequence (PD) having a multi-path identifier (M) of [2] corresponds to [0], as shown in FIG. 16. Here, this embodiment uses an example designed such that an (n+1)-th bit from a right corresponds to a transfer path number (PN)=[n].

Also, the transfer path table 133 shown in FIG. 23 is designed such that the transfer path (P) defined by the multi-path identifier (M) and the transfer path number (PN) has a data of a channel identifier (C) corresponding to a physical link.

Under the above-mentioned configuration, the path selecting section 13 stores [Trouble State] in the operation mode (AM) when any fault occurs in any transfer path (P) to be divided into a corresponding multi-path identifier (M). Also, the path selecting section 13 specifies the transfer path number (PN) and the multi-path identifier (M) corresponding to the channel identifier (C) having the fault, in accordance with the channel path table 134. In accordance with this specified multi-path identifier (M), in the path allocation table 132, the path selecting section 13 specifies the transfer path status bit sequence (PD), and further stores a state bit indicating [Transfer Inhibition State] in a bit corresponding to the specified transfer path number (PN) on the transfer path status bit sequence (PD).

In the second embodiment, the above-mentioned operations enable the bit on the transfer path status bit sequence (PD) corresponding to the transfer path number (PN) correlated to the transfer path (P) having the fault to be at [Transfer Inhibition State], and thereby enables the transfer to this transfer path (P) to be avoided.

Next, the case is described when the allocation change is performed on the packet in which the allocation of the transfer path (P) must be changed after the above-mentioned operations. When the allocation change of the transfer path (P) is done as mentioned above, the path selecting section 13 specifies a transfer path number (PN) to be re-allocated, in accordance with the order of the transfer path number (PN), in accordance with the ratio of the maximum continuous allocation count (PW) stored in the transfer path table 133, on the basis of the transfer path status bit sequence (PD), independently of the transfer inhibition bit sequence (PX) and the allocation inhibition bit sequence (AX).

The schematic operation for executing this load distribution allocation will be described below.

At first, when a packet is inputted to the transfer destination determining unit 1, a multi-path identifier (M) specified by the route determining section 11 is inputted to the path selecting section 13. Moreover, a cache transfer path number (CPN) specified by the cache table access section 12 is inputted to the path selecting section 13. The path selecting section 13 receives it as a temporary transfer path number (PN).

Next, this path selecting section 13 refers to the operation mode (AM) based on the input multi-path identifier (M). If this operation mode (AM) indicates [Normal State], the path selecting section 13 executes the transferring process, or the allocation changing process of the transfer path (P), similarly to the operation described in the first embodiment. If the operation mode (AM) indicates [Trouble State], the path selecting section 13 refers to the transfer path status bit sequence (PD) based on the multi-path identifier (M) instead of the transfer inhibition bit sequence (PX), and determines whether or not the temporary transfer path number (PN) is at [Transfer Inhibition State].

Here, if this temporary transfer path number (PN) is at [Transfer Allowance State], the transferring process is done similarly to the first embodiment. However, if it is [Transfer Inhibition State], the path selecting section 13 refers to the transfer path status bit sequence (PD) instead of the allocation inhibition bit sequence (AX), and targets only the transfer path number (PN) corresponding to the bit in which the state bit indicating [Transfer Allowance State] in this transfer path status bit sequence (PD) is stored, and then specifies the transfer path (P) to be allocated in accordance with the order of the transfer path number (PN), on the basis of the ratio of the maximum continuous allocation count (PW).

Due to the above-mentioned operations, in the second embodiment, when the transfer destination is allocated to the stream needing the change of the allocated transfer path (P) because of the occurrence of the fault in accordance with the load distribution allocation process, it is not necessary to execute the re-calculating process using the software of the maximum stream count (PH) covered by each transfer path (P).

This reason is as follows. That is, when the transfer destination is allocated to the stream needing the change of the allocated transfer path (P) because of the occurrence of the fault in accordance with the load distribution allocation process, the fault report signal from the physical link included on the route of the transfer path (P) is used as a trigger. Also, the process for allocating to another transfer path (P) in accordance with the order of the transfer path number (PN), in accordance with the ratio of the maximum continuous allocation count (PW) based on the transfer path status bit sequence (PD) is executed instead of the execution of the allocation change based on the allocation inhibition bit sequence (AX) as described in the first embodiment. Therefore, the path selecting section 13 need not to refer to the transfer inhibition bit sequence (PX) and the allocation inhibition bit sequence (AX) in which the value is changed because of the update of the maximum stream count (PH).

The cache table 120, the path allocation table 132, the transfer path table 133 and the channel path table 134 in the present invention are set and updated as necessary. As the device for executing the setting and the update, there may be a manner done through a system by a user, a manner automatically done through a system, and the like. However, it is not especially limited, in the present invention.
(Operation of Second Embodiment)

In view of the above-mentioned explanations, the operation at a time of an occurrence of a fault according to the second embodiment will be described below in detail with reference to FIG. 25, and the operation at a time of a recovery of the fault will be described below in detail with reference to a flowchart shown in FIG. 26.

Here, the second embodiment is intended to quickly allocate a transfer path (P) with no fault by using a small number of overheads and a small number of data accesses when a fault occurs on a transfer path (P). Therefore, it is necessary to install a device for determining whether or not a transfer to a transfer path (P) is correctly done.

For this reason, in the second embodiment, in order to install this device, the operation mode (AM) for determining whether or not any fault occurs on the transfer path (P) is installed on the path allocation table 132. The operation for driving this operation mode (AM) will be described below with reference to flowcharts shown in FIGS. 25 and 26.

Figure 25:
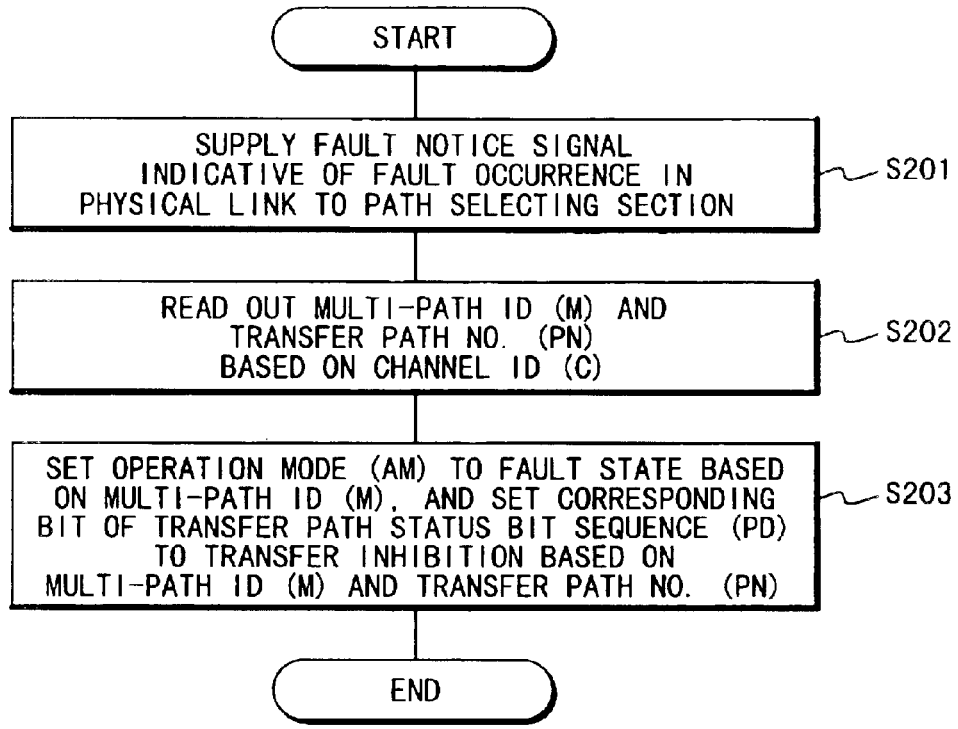
FIG. 25 is a flow chart showing an operation of the transfer destination determining unit according to the second embodiment of the present invention when an operation mode (AM) and a transfer path status bit sequence (PD) are updated based on a fault.

At first, referring to FIG. 25, if a fault occurs, for example, in a channel identifier (C)=[5] in FIG. 19, and the occurrence of the fault is reported to the datagram transfer unit 4a, the path selecting section 13 specifies a channel identifier (C) corresponding to a transfer path (P) having the fault, in accordance with an data included in a reported fault report signal (Step S201). Here, the report of the fault occurrence to the datagram transfer unit 4a can be attained by using the method evident in the conventional technique. So, it is not especially described.

Next, the path selecting section 13 reads out the transfer path number (PN) and the multi-path identifier (M) from the channel path table 134, in accordance with the channel identifier (C) having the fault specified at the step S201 (Step S202).

After that, the path selecting section 13 changes the setting of the operation mode (AM) corresponding on the path allocation table 132 to [Trouble State], in accordance with the multi-path identifier (M) read out at the step S202. Moreover, it updates the proper bit on the transfer path status bit sequence (PD) to [Transfer Inhibition State] in accordance with the transfer path number (PN) and the multi-path identifier (M) read out at the step S202 (Step S203). Then, the process is ended.

In the second embodiment, the above-mentioned operation causes the proper bit on the transfer path status bit sequence (PD) to be updated to [Transfer Inhibition State], after the report of the fault occurrence. Therefore, the path selecting section 13, when the packet needing the allocation change of the transfer path (P) is inputted after the update, refers to the transfer path status bit sequence (PD) based on the corresponding transfer path (P), and further refers to the maximum continuous allocation count (PW) stored in the transfer path table 133 based on the multi-path identifier (M), and then carries out the operation for allocating the transfer path (P), which is not at [Transfer Inhibition State], to the stream, in accordance with the ratio of the maximum continuous allocation count (PW) for each transfer path number (PN).

The operation to be executed when the fault occurring on the transfer path (P) is recovered and the communication can be done will be described below in detail with reference to FIG. 26.

Figure 26:
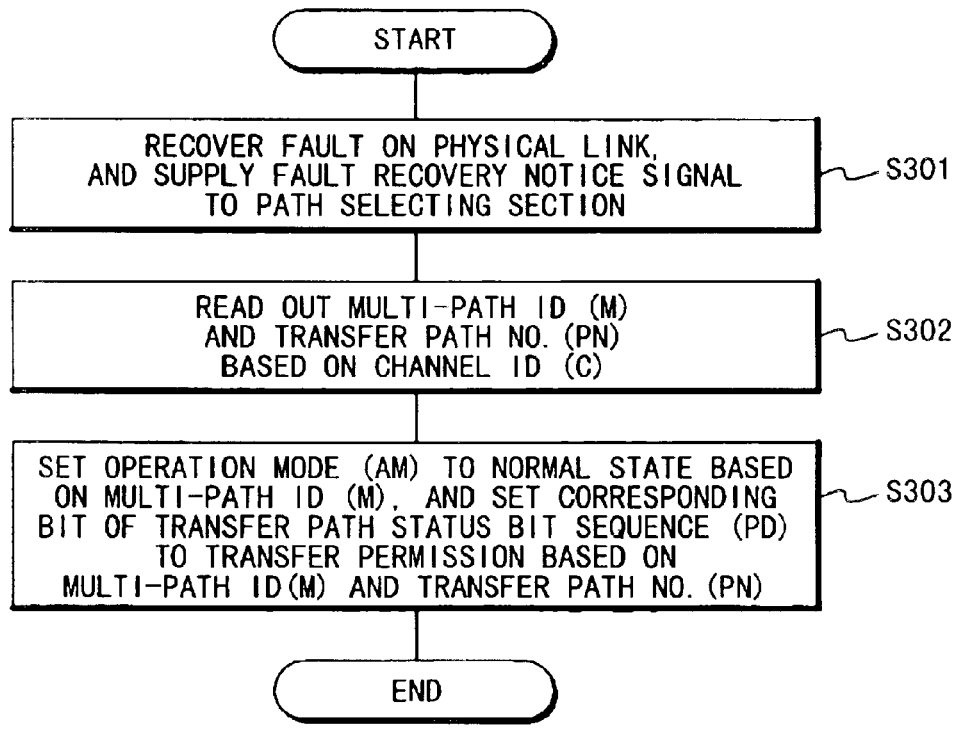
FIG. 26 is a flow chart showing an operation of the transfer destination determining unit according to the second embodiment of the present invention when the operation mode (AM) and the transfer path status bit sequence (PD) are updated based on recovery of the fault.

Referring to FIG. 26, when the fault occurring, for example, in the channel identifier (C)=[5] in FIG. 19 is recovered and the recovery of the fault is reported to the datagram transfer unit 4a, the path selecting section 13 specifies the transfer path (P) in which the fault is recovered and the corresponding channel identifier (C), in accordance with an data included in a reported fault recovery report signal (Step S301). Here, the report of the fault recovery to the datagram transfer unit 4a can be attained by using the method that is evident in the conventional technique. Hence, the particular explanation is omitted.

Next, the path selecting section 13 reads out the transfer path number (PN) and the multi-path identifier (M) from the channel path table 134, in accordance with the channel identifier (C) specified at the step S301 in which the fault is recovered (Step S302).

After that, the path selecting section 13 changes the setting of the operation mode (AM) corresponding on the path allocation table 132 to [Normal State], in accordance with the multi-path identifier (M) read out at the step S302, and further updates the proper bit on the transfer path status bit sequence (PD) to [Transfer Allowance State], in accordance with the transfer path number (PN) and the multi-path identifier (M) read out at the step S302 (Step S303). Then, the process is ended.

The above-mentioned operations enable the allowance of the allocation to the transfer path (P) in which the fault is recovered.

As the method of allocating the transfer path (P) to the stream, there may be the allocating method based on the distribution ratio, in the order starting with the smallest number for the transfer path number (PN), as described in the first embodiment. However, in the present invention, it is not limited to this style. Various variations may be done without departing from the spirit and the scope of the present invention.

Moreover, in updating the cache transfer path number (PN) stored in the cache table 120, as described in the first embodiment, the effective transfer path number (PN) is outputted as the update path number (PU) to the cache table access section 12. On the contrary, the cache table access section 12 registers the input update path number (PU) in a data section corresponding on the cache table 120, on the basis of the held multi-path identifier (M) and stream identifier (S), similarly to the first embodiment.

The operation for changing the allocation of the transfer path (P) at the time of [Trouble State] in the second embodiment after the change of the operation mode (AM) will be described below with reference to a flowchart of FIGS. 27A and 27B.

Figure 27B:
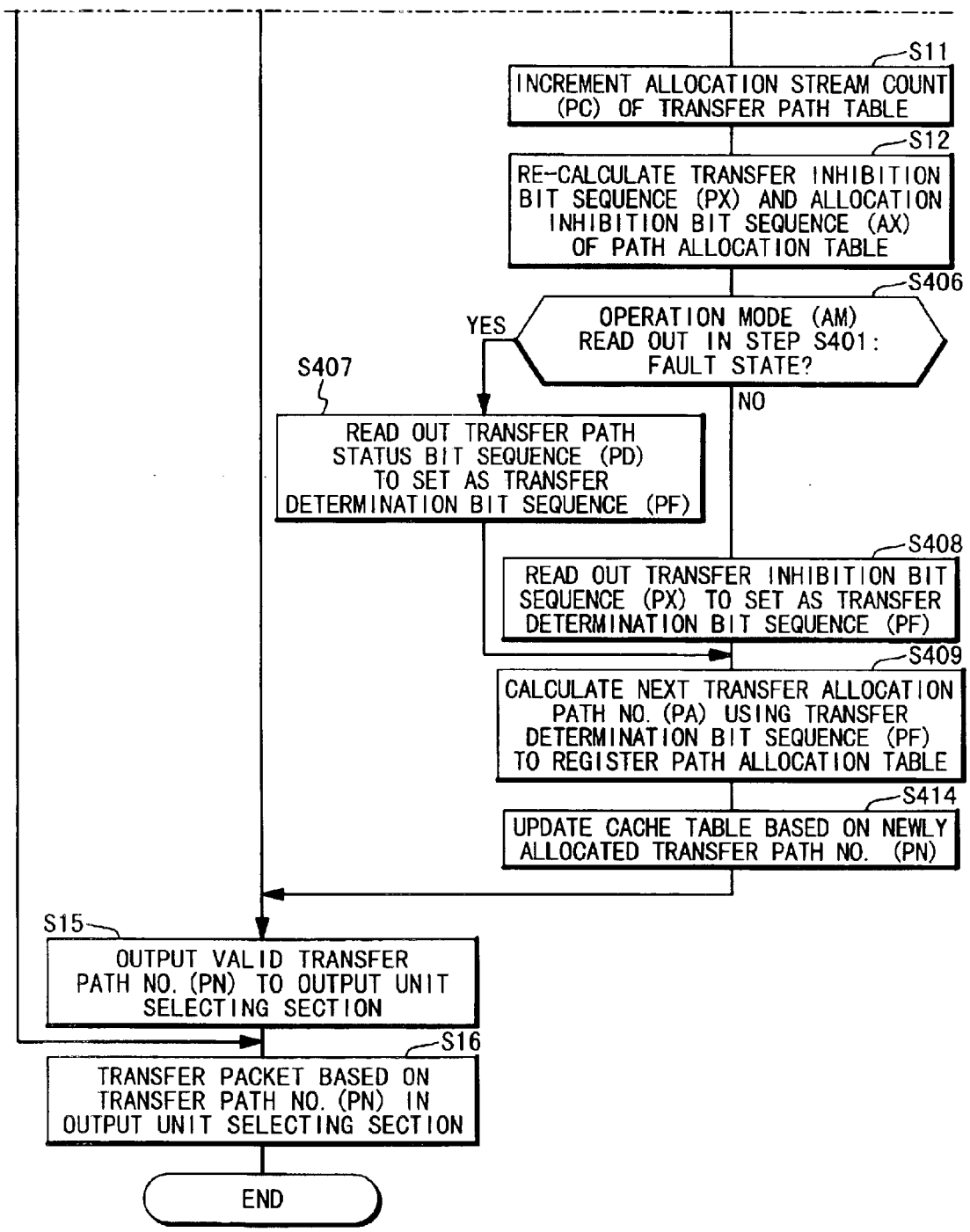

Referring to FIGS. 27A and 27B, when the packet is firstly inputted (Step S1), in the transfer destination determining unit 1, the header extracting section 10 extracts the destination IP address (A) and the stream identifier (S) from the header of the packet, and outputs the stream identifier (S) to the cache table access section 12, and outputs the destination IP address (A) to the route determining section 11. The route determining section 11 determines the transfer destination route (Step S2).

Next, it is determined whether or not the transfer destination route determined at the step S2 targets the multi-path (Step S3). If it targets the single path (Step S3; No), the transfer path (P) implying the determined transfer destination route is outputted to the output unit selecting section 14, and the packet transfer is executed (Step S16).

On the contrary, if the transfer destination route determined at the step S2 targets the multi-path (Step S3; Yes), the route determining section 11 outputs the determined multi-path identifier (M) to the cache table access section 12 and the path selecting section 13. The cache table access section 12 uses this multi-path identifier (M) and the stream identifier (S) inputted from the header extracting section 10, and specifies the corresponding cache transfer path number (CPN) from the cache table 120 (Step S4).

The flow until this time is the process similar to the operations described in the first embodiment. On the contrary, new processes on and after a step S401 are added to the second embodiment.

At the step S401, the path selecting section 13 receives the cache transfer path number (CPN) specified at the step S4 as the temporary transfer path number (PN), and also reads out the operation mode (AM) of the path allocation table 132, in accordance with the multi-path identifier (M) inputted from the route determining section 11 (Step S401).
[0320]
Next, the path selecting section 13 determines whether or not the temporary transfer path number (PN) is composed of the bit indicating [Non-Registered State] as described in the first embodiment (Step S5).

At the step S5, if the transfer path number (PN) indicates [Registered State] (Step S5; No), the path selecting section 13 determines whether or not the operation mode (AM) read out at the step S401 is at [Trouble State] (Step S402). Here, if the corresponding operation mode (AM) is at [Trouble State] (Step S402; Yes), the path selecting section 13 reads out the transfer path status bit sequence (PD) from the path allocation table 132 based on the multi-path identifier (M), and defines the state bit stored in the bit corresponding to the temporary transfer path number (PN) as a transfer determination bit (PJ), on this transfer path status bit sequence (PD) (Step S403).

Also, at the step S402, if the corresponding operation mode (AM) is at [Normal State] (Step S402; No), the path selecting section 13 reads out the transfer inhibition bit sequence (PX) from the path allocation table 132 based on the multi-path identifier (M), and defines the state bit stored in the bit corresponding to the temporary transfer path number (PN) as the transfer determination bit (PJ), on this transfer inhibition bit sequence (PX), similarly to the step S403 (Step S404).

Since the transfer determination bit (PJ) is specified to then use this transfer determination bit (PJ) as mentioned above, the path selecting section 13 can attain the operation for determining whether or not the transfer can be done in accordance with the transfer inhibition bit sequence (PX), similarly to the first embodiment, if the operation mode (AM) is at [Normal State], and avoiding the allocation and the transfer of the stream to the transfer path (P) having the fault in accordance with the transfer path status bit sequence (PD) if the operation mode (AM) is at [Trouble State], under the same flow.

Therefore, after the specification of the transfer determination bit (PJ) as mentioned above, the path selecting section 13 determines whether or not the transfer determination bit (PJ) is the state bit indicating [Transfer Inhibition State] (Step S405).

As the determined result at this step S405, if the transfer determination bit (PJ) is at [Transfer Allowance State] (Step S405; No), the path selecting section 13 sets the temporary transfer path number (PN) as the effective transfer path number (PN), similarly to the first embodiment, and uses the multi-path identifier (M) and this transfer path number (PN) and specifies the corresponding transfer path (P), and then outputs this transfer path (P) to the output unit selecting section 14 (Step S15). After that, similarly to the first embodiment, the output unit selecting section 14 transfers the packet in accordance with the input transfer path (P) (Step S16).

Also, as the determined result at the step S405, if the transfer determination bit (PJ) is at [Transfer Inhibition State] (Step S405; Yes), the path selecting section 13 refers to the allocation stream count (PC) from the transfer path table 133, in accordance with the combination of the multi-path identifier (M) and the temporary transfer path number (PN), and subtracts 1 from this value, and again stores it (Step S8).

Next, the path selecting section 13 re-calculates the transfer inhibition bit sequence (PX) and the allocation inhibition bit sequence (AX) on the path allocation table 132, in accordance with the allocation stream count (PC) stored in the transfer path table 133 updated at the step S8, and again stores this re-calculated transfer inhibition bit sequence (PX) and allocation inhibition bit sequence (AX) in the path allocation table 132 (Step S9). The method of re-calculating the transfer inhibition bit sequence (PX) and the allocation inhibition bit sequence (AX) is executed by the process similar to the method described in the first embodiment.

Also, the path selecting section 13 reads out the transfer allocation path number (PA) from the path allocation table 132 based on the multi-path identifier (M), and sets this value as the effective transfer path number (PN) (Step S10). Here, the cache transfer path number (CPN) set as the temporary transfer path number (PN) is discarded, and the transfer path number (PN) is replaced by the transfer allocation path number (PA).

After that, the path selecting section 13 adds one to the allocation stream count (PC) corresponding to the transfer path number (PN) that becomes effective on the transfer path table 133, and again stores it (Step S11).

Moreover, the path selecting section 13 recalculates the transfer inhibition bit sequence (PX) and the allocation inhibition bit sequence (AX), in accordance with the transfer path table 133 re-calculated at the step S11, and updates the path allocation table 132 based on this value (Step S12). The method of re-calculating the transfer inhibition bit sequence (PX) and the allocation inhibition bit sequence (AX) is also executed by the process similar to that of the first embodiment.

Next, the path selecting section 13 checks whether or not the operation mode (AM) read out at the step S401 is at [Trouble State] (Step S406). If the operation mode (AM) is at [Trouble State] (Step S406; Yes), it reads out the transfer path status bit sequence (PD), and sets this transfer path status bit sequence (PD) as a transfer determination bit sequence (PF) (Step S407). Then, the operational flow proceeds to a step S409.

Also, as the checked result at the step S406, if the operation mode (AM) read out at the step S401 is at [Normal State] (Step S406; No), the multi-path identifier (M) is used to read out the allocation inhibition bit sequence (AX) from the path allocation table 132. This allocation inhibition bit sequence (AX) is set as the transfer determination bit sequence (PF). Then, the operational flow proceeds to the step S408.

After that, the path selecting section 13 uses the specified transfer determination bit sequence (PF), at the step S409, calculates a next transfer allocation path number (PA), and stores in the path allocation table 132 (Step S409). Here, the method of calculating this next transfer allocation path number (PA) is described in detail with reference to FIG. 28, as described below.

Also, the path selecting section 13, in order to update the cache transfer path number (CPN) on the cache table 120 read out at the step S4 to the transfer path number (PN) re-allocated at the step S10, outputs this re-allocated transfer path number (PN) as the update path number (PU) to the cache table access section 12. On the contrary, the cache table access section 12, in accordance with the multi-path identifier (M) and the stream identifier (S) held in the register and the like, stores the update path number (PU) inputted from the path selecting section 13 in the corresponding cache transfer path number (CPN) in the data section, and updates it (Step S14).

After that, the path selecting section 13 outputs the transfer path (P) corresponding to the effective transfer path number (PN) to the output unit selecting section 14, as mentioned above (Step S15). On the contrary, the output unit selecting section 14 transfers the packet, in accordance with the input transfer path (P) (Step S16).

Moreover, as the determined result at the step S405, if the transfer determination bit (PJ) is at [Transfer Inhibition State] (Step S405; Yes), the path selecting section 13 proceeds to the step S10. Then, as mentioned above, it sets the transfer allocation path number (PA) read out from the path allocation table 132 based on the multi-path identifier (M) as the effective transfer path number (PN) (Step S10). After that, it adds one to the allocation stream count (PC) corresponding on the transfer path table 133, and again stores it (Step S11), and further re-calculates the transfer inhibition bit sequence (PX) and the allocation inhibition bit sequence (AX) in accordance with the transfer path table 133 re-calculated at the step S11, and again stores it (Step S12).

Next, the path selecting section 13 determines whether or not the operation mode (AM) read out at the step S401 is at [Trouble State] (Step S406). If the operation mode (AM) is at [Trouble State] (Step S406; Yes), it reads out the transfer path status bit sequence (PD), and sets this as the transfer determination bit sequence (PF) (Step S407). Also, at the determined result at the step S406, if the operation mode (AM) read out at the step S401 is at [Normal State] (Step S406; No), it reads out the allocation inhibition bit sequence (AX), and sets this as the transfer determination bit sequence (PF) (Step S408). After that, at the step S409, this transfer determination bit sequence (PF) is used to calculate a next transfer allocation path number (PA) and store it (Step S409).

Also, the path selecting section 13, in order to update the cache transfer path number (CPN) on the cache table 120 read out at the step S4, outputs the update path number (PU) to the cache table access section 12. On the contrary, the cache table access section 12 stores the update path number (PU) in the corresponding data section (Step S14). After that, the path selecting section 13 outputs the transfer path (P) corresponding to the effective transfer path number (PN) to the output unit selecting section 14 (Step S15).

On the contrary, the output unit selecting section 14 transfers the packet based on the input transfer path (P) (Step S16).

The operation for calculating the next transfer allocation path number (PA) at the step S409 in the flowchart shown in FIGS. 27A and 27B and storing in the path allocation table 132 will be described below in detail with reference to a flowchart shown in FIG. 28.

Figure 28:
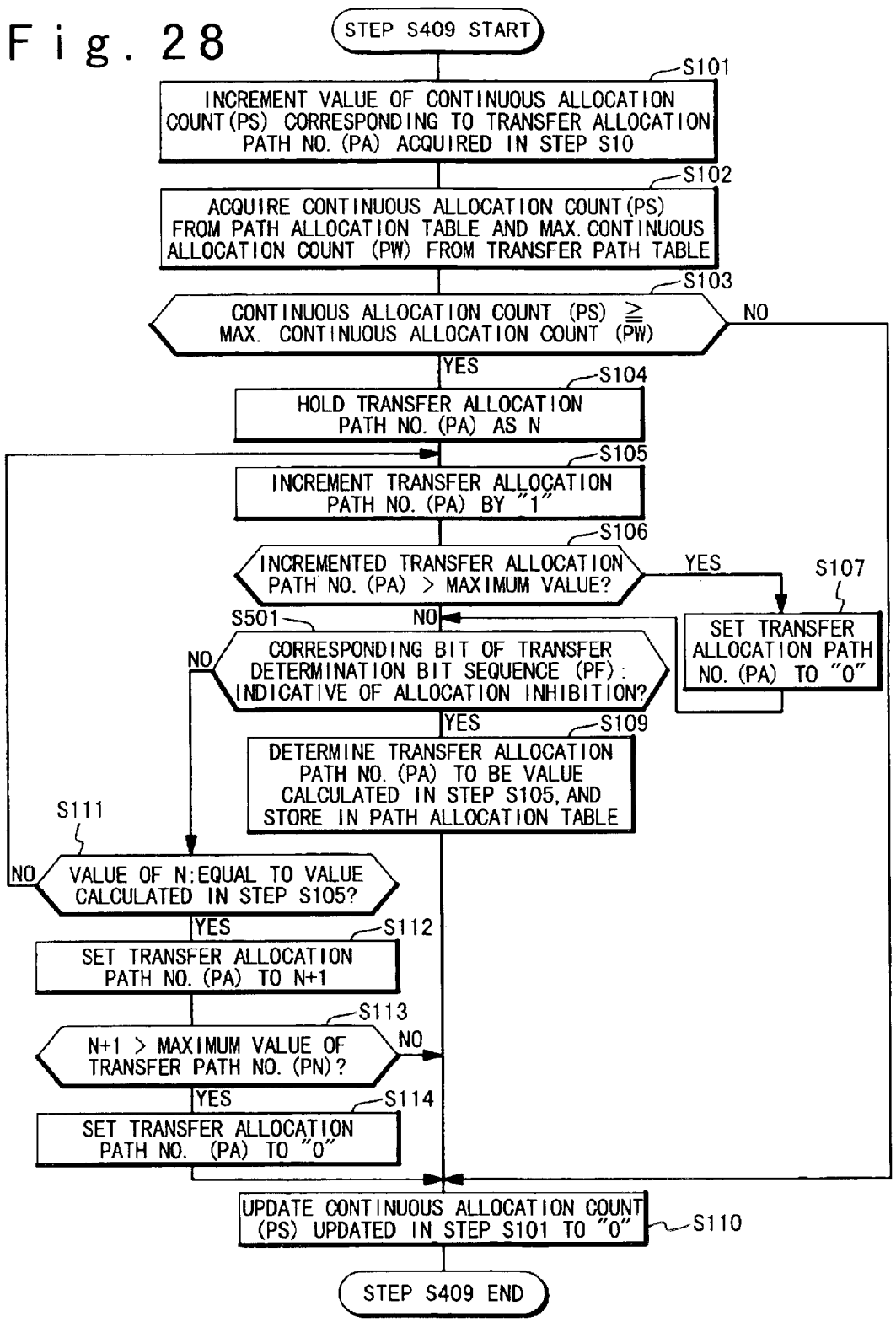
FIG. 28 is a flow chart showing an operation of the transfer destination determining unit according to the second embodiment of the present invention when a transfer allocation path number (PA) is updated.

Referring to FIG. 28, the path selecting section 13 adds one to the continuous allocation count (PS) corresponding to the transfer allocation path number (PA) obtained at the step S10 in FIGS. 27A and 27B on the transfer path table 133, and updates it (Step S101).

Next, the path selecting section 13 specifies the continuous allocation count (PS) from the path allocation table 132 based on the multi-path identifier (M), and also specifies the maximum continuous allocation count (PW) from the transfer path table 133 based on the multi-path identifier (M) and the transfer allocation path number (PA) obtained at the step S10 of FIGS. 27A and 27B (Step S102).

After that, it compares the continuous allocation count (PS) specified at the step S101 with the maximum continuous allocation count (PW) (Step S103).

As the comparison result at the step S103, if the continuous allocation count (PS) is the value less than the maximum continuous allocation count (PW) (Step S103; No), the path selecting section 13 ends the step S409 of FIGS. 27A and 27B without changing the transfer allocation path number (PA).

On the contrary, as the comparison result at the step S103, if the continuous allocation count (PS) is the value equal to or greater than the maximum continuous allocation count (PW) (Step S103; Yes), the path selecting section 13 firstly sets the value of the transfer allocation path number (PA) obtained at the step S10 of FIGS. 27A and 27B as N, and holds it in the register and the like (Step S104).

After that, the path selecting section 13 adds one to the value of the transfer allocation path number (PA) (Step S105), and determines whether or not the obtained value is greater than the maximum value of the transfer path number (PN) (Step S106).

At the step S106, if it exceeds the maximum value of the transfer path number (PN) (Step S106; Yes), the value of the transfer allocation path number (PA) is updated to 0 (Step S107), and the operational flow proceeds to a step S501.

Also, at the step S106, if it does not exceed the maximum value of the transfer path number (PN) (Step S106; No), the operational flow proceeds to the step S501, in its original state.

At the step S501, it is determined whether or not a state bit indicating [Transfer Inhibition State] is stored in a bit corresponding to the targeted transfer allocation path number (PA) by using the transfer determination bit sequence (PF) obtained at the step S407 or S408 in FIGS. 27A and 27B (Step S501).

In this determination, if the bit on the corresponding transfer determination bit sequence (PF) is at [Transfer Allowance State] (Step S501; No), the value obtained by adding 1 at the step S105 is set as the effective transfer allocation path number (PA), and stored in the path allocation table 132 (Step S109).

After that, the continuous allocation count (PS) to which 1 is added at the step S101 is updated to 0 (Step S110). The step S409 of FIGS. 27A and 27B is ended.

On the contrary, in the determination at the step S501, if the bit on the corresponding transfer determination bit sequence (PF) is at [Transfer Inhibition State] (Step S501; Yes), it is determined whether or not the value set as the transfer allocation path number (PA) is currently equal to the N value stored at the step S104 (Step S111). If it is not equal (Step S111; No), the operational flow returns back to the step S105. 1 is further added to the value of the transfer allocation path number (PA) (Step S105). After that, the similar operations are executed (on and after the step S506).

On the contrary, in the determination at the step S111, if the current value of the transfer allocation path number (PA) is equal to the N value (Step S111; Yes), the value of the transfer allocation path number (PA) is set to the value in which 1 is added to the N value stored at the step S104 (Step S112). This reason is as follows. That is, if all the allocation inhibition bit sequences (AX) are at [Allocation Inhibition State] since the transfer allocation path number (PA) is set to N+1, it is intended to prevent all the streams from being allocated to the transfer path number (PN)=[N].

After that, it is determined whether or not the N+1 value calculated at the step S112 exceeds the maximum value of the transfer path number (PN) (Step S113). Here, if it does not exceed the maximum value of the transfer path number (PN) (Step S113; No), in its original state, the transfer allocation path number (PA) is set to [N+1], and the step S409 of FIGS. 27A and 27B is ended.

On the contrary, if it exceeds the maximum value of the transfer path number (PN) (Step S113; Yes), the value of the transfer allocation path number (PA) is set to [0] (Step S114). After that, the step S409 of FIGS. 27A and 27B is ended.

The above-mentioned operations enable the value of the transfer allocation path number (PA) stored in the path allocation table 132 at the step S409 of FIGS. 27A and 27B to be stored in accordance with the order of the value of the transfer path number (PN) and in accordance with the ratio of the maximum continuous allocation count (PW).

<Effect of Second Embodiment>

As mentioned above, as evident from the operations explained by using the drawings, for example, if the fault occurs in the transfer path (P) corresponding to the channel identifier (C)=[5] as shown in FIG. 19, the path selecting section 13 specifies the transfer path number (PN)=[0] and the multi-path identifier (M)=[2] corresponding to the channel identifier (C)=[5], in accordance with the channel path table 134, and stores [Trouble State] in the operation mode (AM) corresponding to this multi-path identifier (M). Moreover, the path selecting section 13 specifies the transfer path status bit sequence (PD) in the path allocation table 132, in accordance with the specified multi-path identifier (M)=[2], and stores the bit indicating [Transfer Inhibition State] in the bit corresponding to the transfer path number (PN)=[0] in this transfer path status bit sequence (PD). Accordingly, in the path allocation table 132, the respective parameters are changed as shown in FIG. 24.

Therefore, if the allocation change is performed on the packet in which the allocation of the transfer path (P) must be changed, the transfer path (P) to be re-allocated is specified by referring to the transfer path status bit sequence (PD), independently of the transfer inhibition bit sequence (PX) and the allocation inhibition bit sequence (AX).

When the above-mentioned explanations are abstracted, in the second embodiment, the allocation changing process can be executed in accordance with the load distribution allocation ratio at the high speed, without the re-calculating process using the software of the maximum stream count (PH) covered by each transfer path (P), when the transfer destination is allocated in accordance with the load distribution allocation ratio to the stream needing the change of the allocated transfer path (P) because of the occurrence of the fault, after the update of the transfer path status bit sequence (PD), in the case of the occurrence of the fault on the transfer path (P).

The reason why the re-calculating process using the software is unnecessary as mentioned above is as follows. That is, when it is determined whether or not the allocated transfer path (P) needs to be changed because of the occurrence of the fault, instead of the execution of the allocation change determination based on the allocation inhibition bit sequence (AX) as described in the first embodiment, if the fault report signal from the physical link included on the route of the transfer path (P) is used as the trigger, and the allocation change determination is executed on the basis of the transfer path status bit sequence (PD), and the transfer destination is allocated in accordance with the load distribution allocation to the stream needing the change of the allocated transfer path (P) because of the occurrence of the fault, instead of the execution of the allocation change based on the allocation inhibition bit sequence (AX) as described in the first embodiment, the fault report signal from the physical link included on the route of the transfer path (P) is used as the trigger, and then the process for allocating to another transfer path (P) is executed on the basis of the transfer path status bit sequence (PD). Therefore, the path selecting section 13 need not to refer to the transfer inhibition bit sequence (PX) and the allocation inhibition bit sequence (AX) where the value is changed because of the update of the maximum stream count (PH).

<Third Embodiment>

Also, in a third embodiment, a device further different from the first embodiment is exemplified with regard to the method of selecting the transfer path (P) in the path selecting section 13.

In the second embodiment, the channel identifier (C) for individually identifying the physical link connected to the data-gram transferring device 4 is managed on the channel path table 134, correspondingly to the multi-path identifier (M) and the transfer path number (PN). Moreover, the operation mode (AM) for indicating whether or not any fault occurs on any transfer path (P) divided by the multi-path identifier (M), and the combination of the multi-path identifier (M) and the transfer path number (PN), namely, the transfer path status bit sequence (PD) indicating whether or not any fault occurs on each transfer path (P) corresponding to the channel identifier (C) are managed correspondingly to the multi-path identifier (M) on the path allocation table 132.

Accordingly, the second embodiment is designed as follows. That is, in the allocation changing process of the transfer path (P) when any fault occurs at any section of the transfer path (P) managed by a certain multi-path identifier (M), the path selecting section 13 determines the presence or absence of the usage of the transfer path status bit sequence (PD) by using the operation mode (AM) specified on the basis of the multi-path identifier (M) corresponding to the channel identifier (C) specified by the input fault report signal, and further determines the allocation change by using the transfer determination bit (PJ) specified by the transfer path status bit sequence (PD) or the transfer inhibition bit sequence (PX) based on the multi-path identifier (M) and the transfer path number (PN) similarly corresponding to the channel identifier (C), and in the allocating process for re-allocating the transfer path (P), uses the transfer path status bit sequence (PD) and selecting the transfer path number (PN) that can be allocated.

On the contrary, the third embodiment is designed such that the transfer path number (PN) corresponds to the transfer path (P) set in the data-gram transferring device 4 in a one-to-one relationship, and the transfer path status bit sequence (PD) is not divided into the multi-path identifier (M) and it is collectively managed in the register of the path selecting section 13 and the like.

For this reason, as compared with the second embodiment, the third embodiment is designed so as to remove the channel path table 134 connected to the path selecting section 13, the operation mode (AM) and the transfer path status bit sequence (PD) on the path allocation table 132, and the transfer path (P) on the transfer path table 133, and newly install a usage path bit sequence (UP) on a transfer path table 136 and further manage a transfer path state table 137 on the path selecting section 13 and thereby reduce a necessary memory capacity.

Also, the transfer path number (PN) and the transfer path (P) are composed of the same information so that the transfer path number (PN) and the transfer path (P) correspond to each other in a one-to-one relationship.

In this way, the third embodiment is designed as follows. That is, in the process for changing the allocation of the transfer path (P) when any fault occurs on any portion of the transfer path (P) managed by a certain multi-path identifier (M), the path selecting section 13 carries out the allocation change determination for determining whether or not the allocation change is performed on a packet, in accordance with the transfer path status bit sequence (PD) in which the setting of the bit corresponding to the transfer path (P) specified by the input fault report signal is changed to [Transfer Inhibition State], and the usage path bit sequence (UP) indicative of the transfer path (P) under usage. If it is determined in this determination that the transfer path (P) to be allocated is changed, the process for changing the allocation of the transfer path (P) uses the transfer path status bit sequence (PD) to be allocated and the usage path bit sequence (UP), and then specifies the transfer path (P) to be re-allocated.

Figure 29:
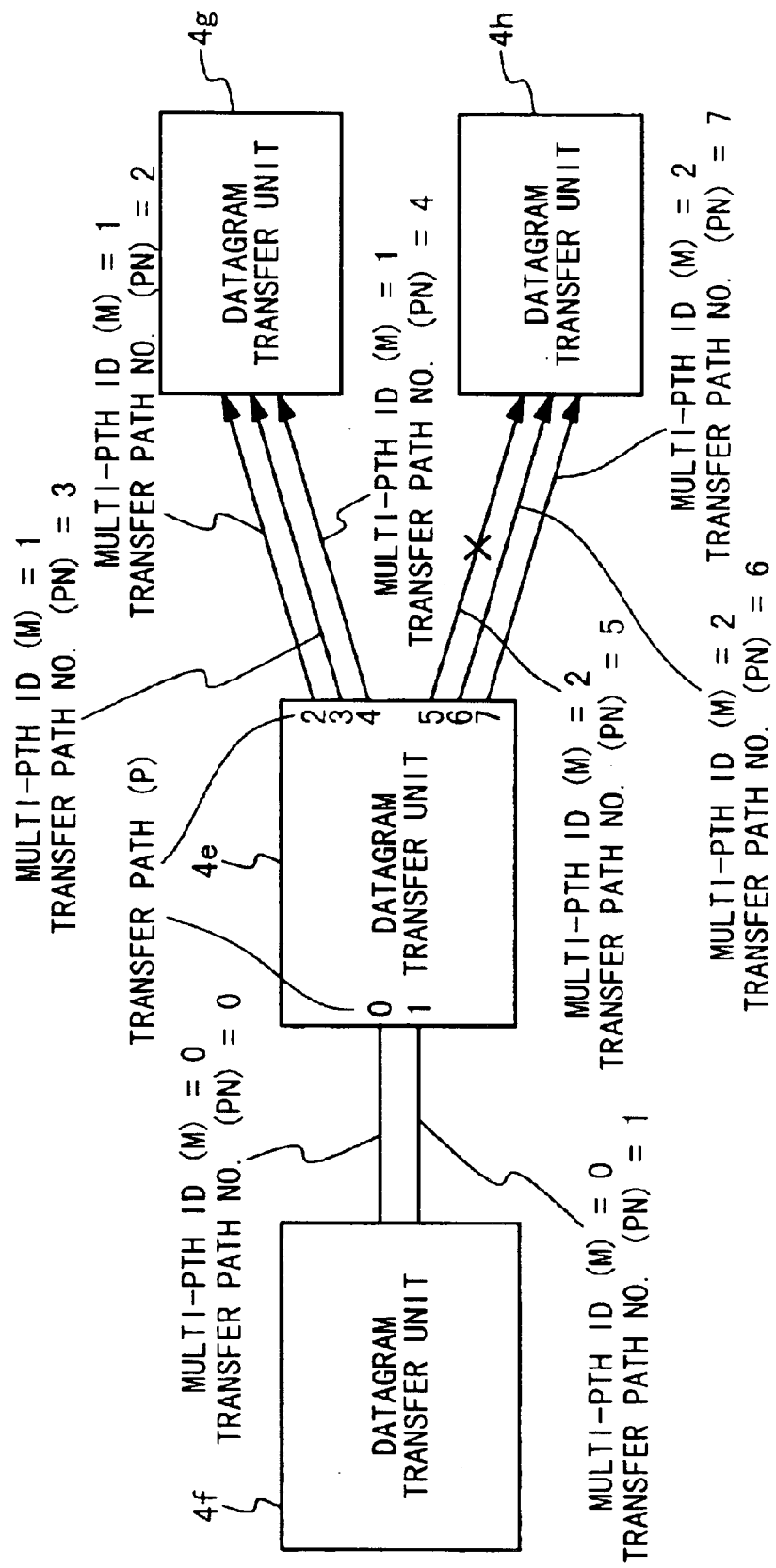
FIG. 29 is a block diagram showing the configuration of a network of datagram transfer units according to a third embodiment of the present invention.

In view of the above-mentioned circumstances, when the third embodiment is described by using an example shown in FIG. 29, let us suppose that in a data-gram transferring device 4e, one or more transfer paths (P) are respectively set between other data-gram transferring devices 4f, 4g and 4h. This is assumed, for example, as follows. That is, two transfer paths (P) in which the transfer path numbers (PN) are [0] and [1] are allocated between the data-gram transferring devices 4a, 4b. Three transfer paths (P) in which the transfer path numbers (PN) are [2], [3] and [4] are allocated between the data-gram transferring devices 4a, 4c. And, three transfer paths (P) in which the transfer path numbers (PN) are [5], [6] and [7] are allocated between the data-gram transferring devices 4a, 4d.

In the third embodiment, as shown in FIG. 31, correspondingly to a multi-path identifier (M) stored in an address section on a path allocation table 135, the usage path bit sequence (UP), the transfer inhibition bit sequence (PX), the allocation inhibition bit sequence (AX), the transfer allocation path number (PA) and the continuous allocation count (PS) are managed in a data section. Therefore, in the third embodiment, the operation mode (AM) and the transfer path status bit sequence (PD) are removed from the data section, and the usage path bit sequence (UP) is newly added, as compared with the second embodiment. This reason is as follows. That is, it is determined whether or not any fault occurs on the transfer path (P) divided for each multi-path identifier (M), by using the transfer path status bit sequence (PD) and a bit sequence in which each bit on the usage path bit sequence (UP) is inverted, instead of the operation mode (AM). Therefore, the operation mode (AM) is not necessary. Also, it is not necessary to configure the transfer path status bit sequence (PD) correlated to each multi-path identifier (M). Here, the transfer path status bit sequence (PD) is designed such that it is managed as a transfer path state table 137 shown in FIG. 33, in the register of the path selecting section 13 and the like.

Also, as shown in FIG. 34, in the third embodiment, as compared with the second embodiment, on the transfer path table 136, correspondingly to the combination of the transfer path (P) and the multi-path identifier (M) in the address section, the allocation stream count (PC), the maximum stream count (PH) and the maximum continuous allocation count (PW) are managed in the data section, and the transfer path (P) is removed. This is because the transfer path (P) and the transfer path number (PN) need not correspond to each other since they are composed of the same information.

Figure 30:
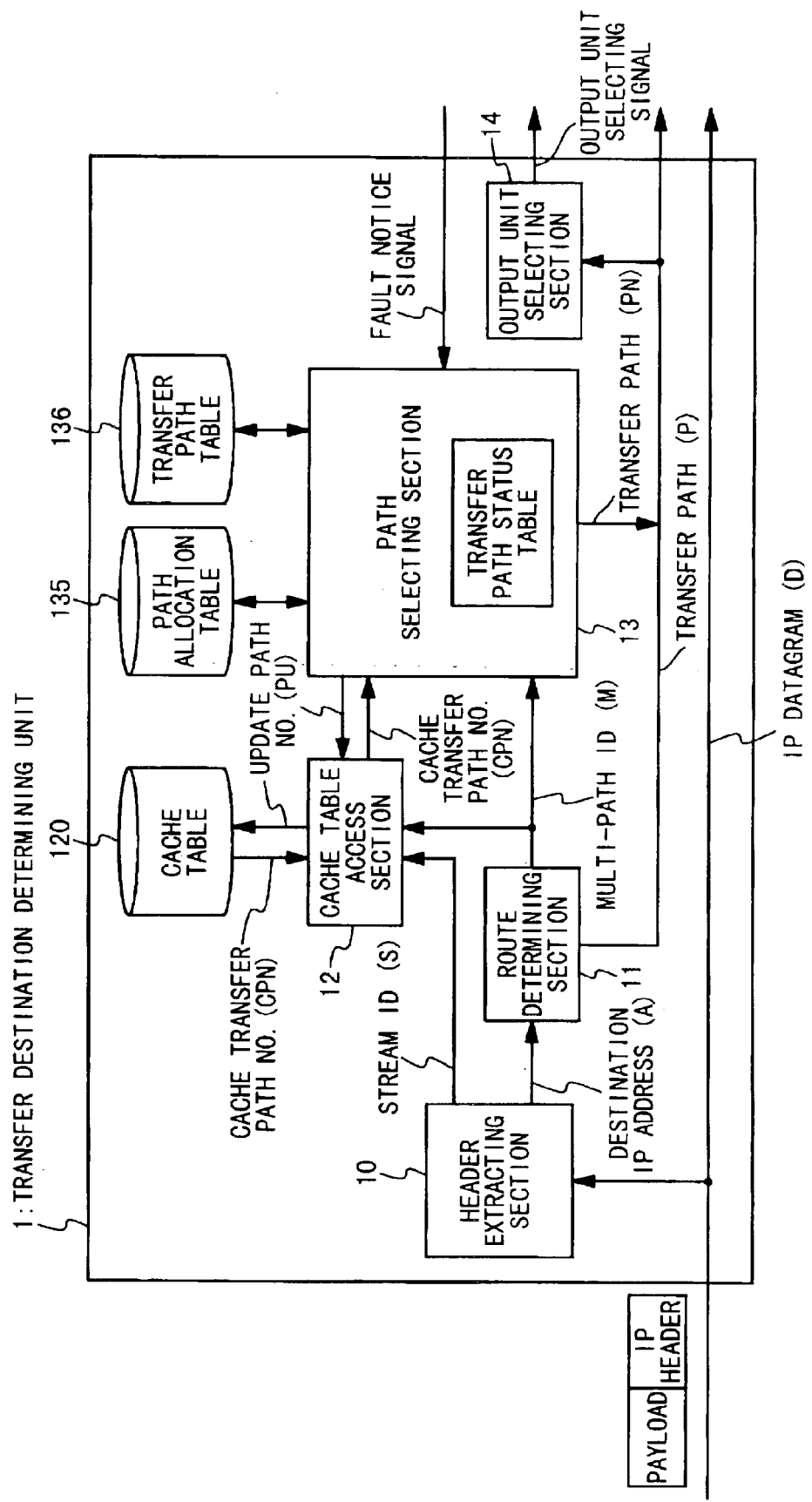
FIG. 30 is a block diagram showing the structure of a transfer destination determining unit of the datagram transfer unit according to the third embodiment of the present invention.

Therefore, referring to FIG. 30, in the transfer destination determining unit 1, the channel path table 134 is removed as compared with the second embodiment. Moreover, the transfer path state table 137 is held on the path selecting section 13.

As mentioned above, due to the configuration shown in FIG. 30, in the third embodiment, at a normal time when any fault does not occur on the transfer path (P), in the transfer destination determining unit 1, similarly to the first embodiment, the cache table access section 12 selects the cache transfer path number (CPN) based on the stream identifier (S) inputted from the header extracting section 10 and the multi-path identifier (M) inputted from the route determining section 11. Moreover, the path selecting section 13 receives this cache transfer path number (CPN) as the temporary transfer path number (PN), and determines the effective transfer path number (PN), in accordance with this temporary transfer path number (PN) and the multi-path identifier (M).

On the contrary, if any fault occurs on the transfer path (P), namely, if in the data-gram transferring device 4e, any fault occurs on the physical link to which the transfer path (P) is allocated, and thereby the impossibility of the transmission/reception of the packet is detected and this detected result is inputted to the path selecting section 13 by using the fault report signal, the path selecting section 13 stores the state bit indicating [Transfer Inhibition State] in the bit corresponding on the transfer path number (PN), in accordance with the transfer path (P) that becomes at [Transfer Inhibition State] because of the occurrence of the fault.

Accordingly, when the allocation change is performed on the packet needing the change of the allocation of the transfer path (P), it refers to the transfer path status bit sequence (PD) and the usage path bit sequence (UP), and performs the allocation change on the transfer path number (PN) that is not at [Transfer Inhibition State], in accordance with the ratio of the maximum continuous allocation count (PW) in the transfer path table 133 and in accordance with the order of the transfer path number (PN), similarly to the first embodiment.

Here, the usage path bit sequence (UP) that is a parameter newly added to the third embodiment is the bit sequence indicating a transfer path (P) to which each multi-path identifier (M) corresponds. Each of the bits constituting the usage path bit sequence (UP) corresponds to each different transfer path (P).

Here, for example, let us suppose that [Usage State] is represented by [0] and [Non-Usage State] is represented by [1]. Therefore, when there are a total of 8 kinds of the transfer path numbers (PN) in the data-gram transferring device 4e as shown in FIG. 29, if a fault occurs on the transfer path (P)=[5] as similarly shown in FIG. 29, the transfer path status bit sequence (PD) is represented by [00100001] since [1] indicating [Transfer Inhibition State] is stored in a bit in which a transfer path (P) corresponds to [0], as shown in FIG. 27. Here, this embodiment uses an example designed such that an (n+1)-th bit from a right corresponds to a transfer path number (PN)=[n].

Under the above-mentioned configuration, the path selecting section 13, when any fault occurs on the transfer path (P), stores the state bit indicating [Transfer Inhibition State] in the bit on the transfer path status bit sequence (PD) corresponding to the input transfer path (P).

Due to the above-mentioned operations, in the third embodiment, when the allocation change is performed on the packet in which the allocation of the transfer path (P) must be changed, it can specify a transfer path (P) to be re-allocated, in accordance with the order of the transfer path number (PN), in accordance with the ratio of the maximum continuous allocation count (PW) stored in the transfer path table 136, on the basis of the transfer path status bit sequence (PD) and the usage path bit sequence (UP), independently of the transfer inhibition bit sequence (PX) and the allocation inhibition bit sequence (AX).

The operation for executing this load distribution allocation will be described below.

At first, when a packet is inputted to the transfer destination determining unit 1, a multi-path identifier (M) specified by the route determining section 11 is inputted to the path selecting section 13. Moreover, a cache transfer path number (CPN) specified by the cache table access section 12 is inputted to the path selecting section 13. On the contrary, the path selecting section 13 receives it as a temporary transfer path number (PN).

Next, this path selecting section 13 reads out the usage path bit sequence (UP) based on the input multi-path identifier (M). In accordance with this usage path bit sequence (UP) and the similarly read out transfer path status bit sequence (PD), it is determined whether or not any fault occurs on the transfer path (P) divided by the proper multi-path identifier (M). If any fault does not occur, the path selecting section 13 executes the transferring process, or the allocation changing process of the transfer path (P), similarly to the operation described in the first embodiment. If any fault occurs, the path selecting section 13 determines whether or not the temporary transfer path number (PN) is at [Transfer Inhibition State], in accordance with the transfer path status bit sequence (PD) instead of the transfer inhibition bit sequence (PX).

Here, if this temporary transfer path number (PN) is at [Transfer Allowance State], the transferring process is done similarly to the first embodiment. However, if it is at [Transfer Inhibition State], the path selecting section 13 refers to the transfer path status bit sequence (PD) and the usage path bit sequence (UP) instead of the allocation inhibition bit sequence (AX), and targets only the transfer path (P) corresponding to the bit in which the state bit indicating [Transfer Allowance State] in the combination of the transfer path status bit sequence (PD) and the usage path bit sequence (UP) is stored, and then specifies the transfer path (P) to be allocated in accordance with the order of the transfer path number (PN), on the basis of the ratio of the maximum continuous allocation count (PW).

Due to the above-mentioned operations, in the third embodiment, when the transfer destination is allocated to the stream needing the change of the allocated transfer path (P) because of the occurrence of the fault in accordance with the load distribution allocation process, it is not necessary to execute the re-calculating process using the software of the maximum stream count (PH) covered by each transfer path (P).

This reason is as follows. That is, when the transfer destination is allocated to the stream needing the change of the allocated transfer path (P) because of the occurrence of the fault in accordance with the load distribution allocation process, the process for allocating to another transfer path (P) in accordance with the order of the transfer path number (PN), in accordance with the ratio of the maximum continuous allocation count (PW) based on the transfer path status bit sequence (PD) and the usage path bit sequence (UP) is executed instead of the execution of the allocation change based on the allocation inhibition bit sequence (AX) as described in the first embodiment. Therefore, the path selecting section 13 need not refer to the transfer inhibition bit sequence (PX) and the allocation inhibition bit sequence (AX) in which the value is changed because of the update of the maximum stream count (PH).

Also, the cache table 120, the path allocation table 135, the transfer path table 136 and the transfer path state table 137 in the present invention are set and updated as necessary. As the device for executing the setting and the update, there may be the manner done through the system by the user, the manner automatically done through the system, and the like. However, it is not especially limited, in the present invention.

(Operation of Third Embodiment)

In view of the above-mentioned explanations, the operation at a time of an occurrence of a fault according to the third embodiment will be described below in detail with reference to FIG. 36, and the operation at a time of a recovery of the fault will be described below in detail with reference to a flowchart shown in FIG. 37.

Here, the third embodiment is intended to quickly allocate a transfer path (P) with no fault by using a small number of overheads and a small number of data accesses when a fault occurs on a transfer path (P), similarly to the second embodiment. Therefore, it is necessary to install a device for determining whether or not a transfer to a transfer path (P) is correctly done.

For this reason, in the third embodiment, in order to install this device, the transfer path state table 137 for determining whether or not any fault occurs on the transfer path (P) is installed on the path selecting section 13. The operation for driving this transfer path state table 137 will be described below with reference to the flowcharts shown in FIGS. 36 and 37.

Figure 36:
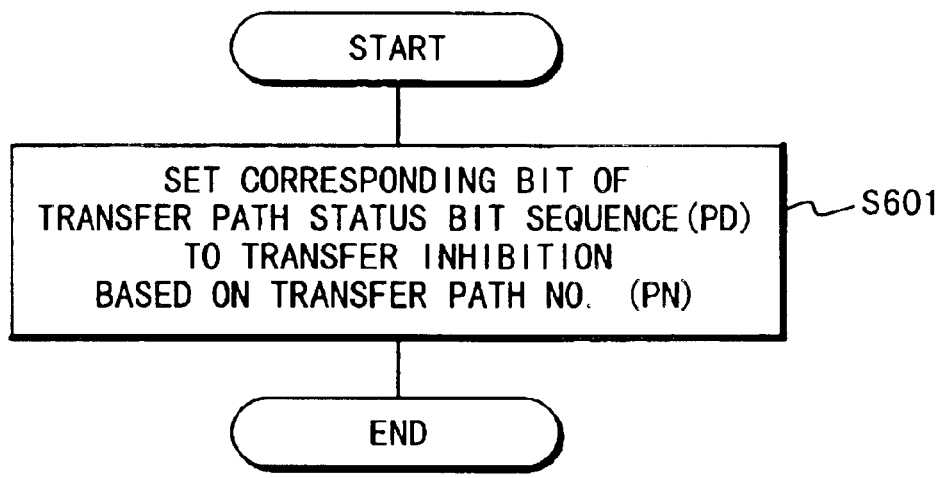
FIG. 36 is a diagram showing a path allocation table after the update in the transfer destination determining unit according to the third embodiment of the present invention.

At first, referring to FIG. 36, if a fault occurs, for example, on a transfer path (P)=[5] in FIG. 29, and the occurrence of the fault is reported to the data-gram transferring device 4e, the path selecting section 13 specifies a transfer path number (PN) having the fault, in accordance with an information included in a reported fault report signal, and updates the bit corresponding on the transfer path status bit sequence (PD) to [Transfer Inhibition State] in accordance with this specified transfer path number (PN) (Step S601). Then, the process is ended. Here, the report of the fault occurrence to the data-gram transferring device 4e can be attained by using the method evident in the conventional technique. So, it is not especially described.

Due to the above-mentioned operations, in the third embodiment, the proper bit on the transfer path status bit sequence (PD) is updated to [Transfer Inhibition State], after the report of the fault occurrence. Therefore, the path selecting section 13, when receiving the packet needing the allocation change of the transfer path (P) after the update, refers to the transfer path status bit sequence (PD) and the usage path bit sequence (UP), and further refers to the maximum continuous allocation count (PW) stored in the transfer path table 133 based on the multi-path identifier (M), and then carries out the operation for allocating to the stream the transfer path (P) that is not at [Transfer Inhibition State] in accordance with the ratio of the maximum continuous allocation count (PW) for each transfer path number (PN).

The operation to be executed when the fault occurring on the transfer path (P) is recovered and the communication can be done will be described below in detail with reference to FIG. 37.

Figure 37:
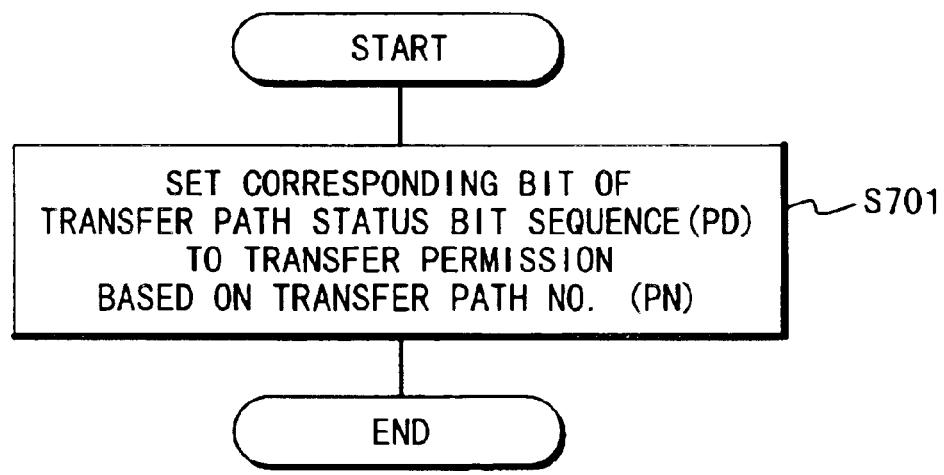
FIG. 37 is a flow chart showing an operation of the transfer destination determining unit according to the second embodiment of the present invention when the operation mode (AM) and the transfer path status bit sequence are updated based on recovery of the fault.

Referring to FIG. 37, when the fault occurring, for example, on the transfer path (P)=[5] in FIG. 29 is recovered and the recovery of the fault is reported to the data-gram transferring device 4e, the path selecting section 13 specifies the transfer path number (PN) in which the fault is recovered, in accordance with an information included in a reported fault recovery report signal, and updates the bit corresponding on the transfer path status bit sequence (PD) to [Transfer Inhibition State] (Step S701). Then, the process is ended. Here, the report of the fault recovery to the data-gram transferring device 4e can be attained by using the method that is evident in the conventional technique. So, the particular explanation is omitted.

The above-mentioned operations enable the allowance of the allocation to the transfer path (P) in which the fault is recovered.

As the process for allocating the transfer path (P) to the stream, there may be the allocating method based on the distribution ratio, in the order starting with the smallest number for the transfer path number (PN). However, in the present invention, it is not limited to this style. Various variations may be done without departing from the spirit and the scope of the present invention.

Moreover, in updating the cache transfer path number (PN) stored in the cache table 120, as described in the first embodiment, the effective transfer path number (PN) is outputted as the update path number (PU) to the cache table access section 12. On the contrary, the cache table access section 12 registers the input update path number (PU) in a data section corresponding on the cache table 120, on the basis of the held multi-path identifier (M) and stream identifier (S), similarly to the first embodiment.

The operation for changing the allocation of the transfer path (P) at the time of [Trouble State] in the second embodiment after the change of the operation mode (AM) as mentioned above will be described below in detail with reference to a flowchart of FIGS. 38A and 38B.

Figures 38, 38A, 38B:
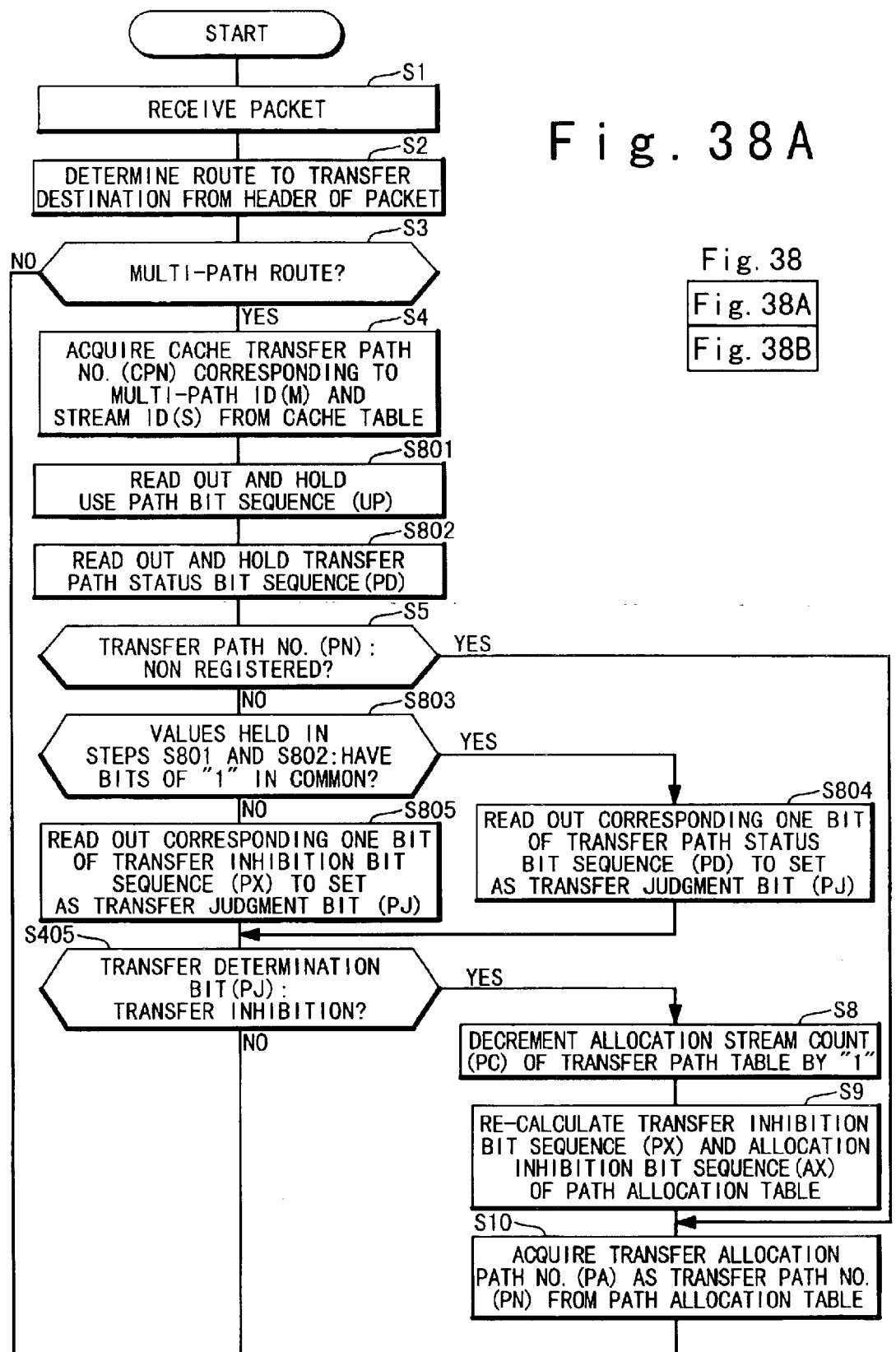
FIGS. 38A and 38B are a flow chart showing an operation of the transfer destination determining unit according to the second embodiment of the present invention.
Figure 38B:
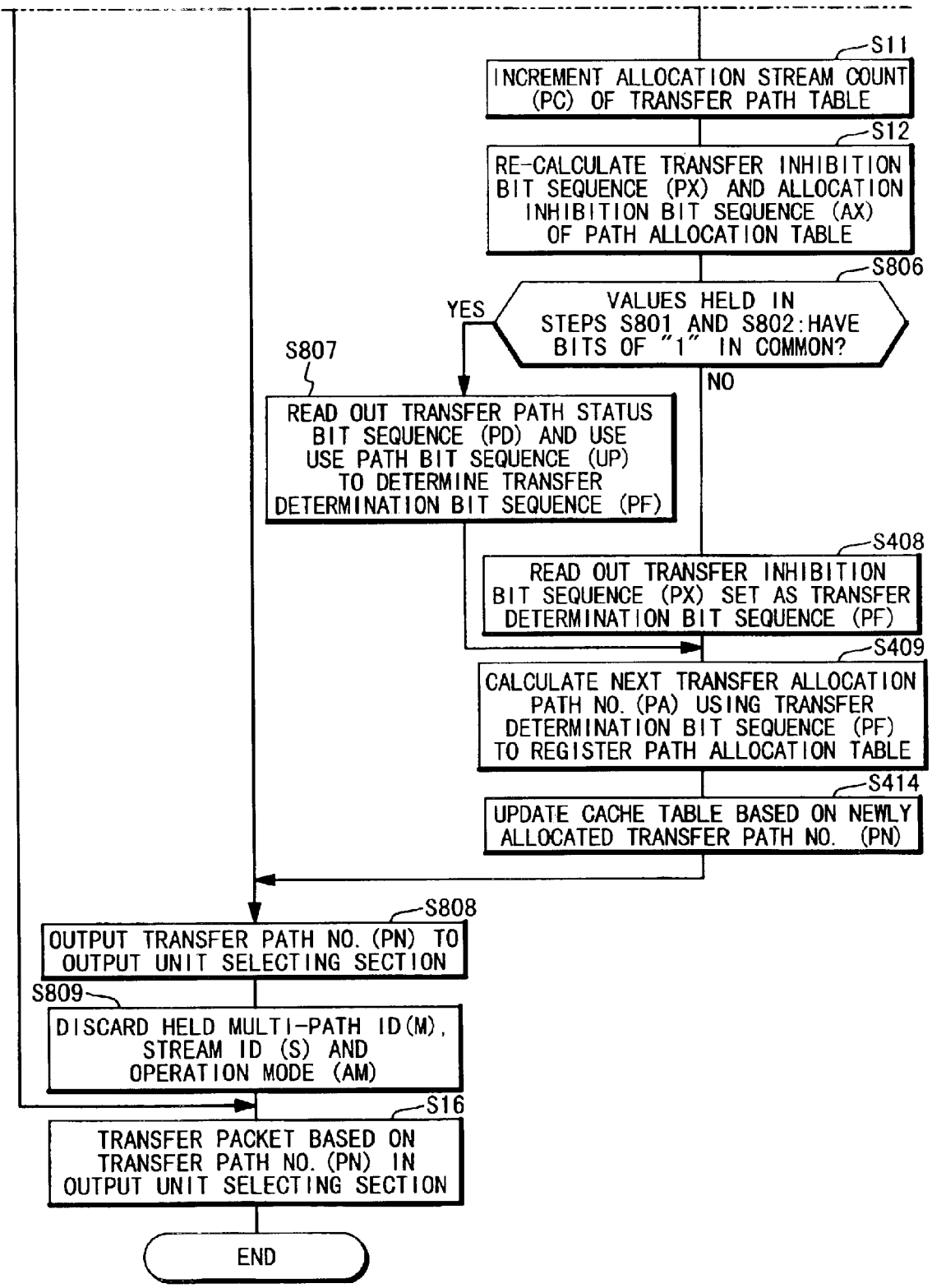

Referring to FIGS. 38A and 38B, when the packet is firstly inputted (Step S1), in the transfer destination determining unit 1, the header extracting section 10 extracts the destination IP address (A) and the stream identifier (S) from the header of the packet, and outputs the stream identifier (S) to the cache table access section 12, and outputs the destination IP address (A) to the route determining section 11. The route determining section 11 determines the transfer destination route (Step S2).

Next, it is determined whether or not the transfer destination route determined at the step S2 targets the multi-path (Step S3). If it targets the single path (Step S3; No), the transfer path (P) implying the determined transfer destination route is outputted to the output unit selecting section 14, and the packet transfer is executed (Step S16).

On the contrary, if the transfer destination route determined at the step S2 targets the multi-path (Step S3; Yes), the route determining section 11 outputs the determined multi-path identifier (M) to the cache table access section 12 and the path selecting section 13. The cache table access section 12 uses this multi-path identifier (M) and the stream identifier (S) inputted from the header extracting section 10, and specifies the corresponding cache transfer path number (CPN) from the cache table 120 (Step S4). At this time, the cache table access section 12 holds the multi-path identifier (M) and the stream identifier (S) in the register and the like, for subsequent treatments.

The flow until this time is the process similar to the operations described in the first embodiment. On the contrary, new processes on and after a step S801 are added to the third embodiment.

At the step S801, the path selecting section 13 receives the cache transfer path number (CPN) specified at the step S4 as the temporary transfer path number (PN), and also reads out the usage path bit sequence (UP) on the path allocation table 135, on the basis of the multi-path identifier (M) inputted from the route determining section 11 (Step S801).

Also, the path selecting section 13 reads out the transfer path status bit sequence (PD) (Step S802).

Next, the path selecting section 13 determines whether or not the temporary transfer path (P) is composed of the bit indicating [Non-Registered State] as described in the first embodiment (Step S5).

At the step S5, if the transfer path number (PN) indicates [Registered State] (Step S5; No), the path selecting section 13 compares the transfer path status bit sequence (PD) with a bit sequence generated by inverting the usage path bit sequence (UP) held at the step S801, and determines whether or not there are bits in which both the same digits are at [1] (Step S803).

Here, if there are the bits in which both are at [1] (Step S803; Yes), the path selecting section 13 reads out the transfer path status bit sequence (PD) from the transfer path state table 137, and defines, as the transfer determination bit (PJ), the state bit stored in the bit corresponding to the temporary transfer path number (PN), on this transfer path status bit sequence (PD) (Step S804).

Also, if there are not the bits in which both are at [1] at the step S803 (Step S803; No), the path selecting section 13 reads out the transfer inhibition bit sequence (PX) from the path allocation table 132, and defines, as the transfer determination bit (PJ), the state bit stored in the bit corresponding to the temporary transfer path number (PN), on the transfer inhibition bit sequence (PX), similarly to the step S804 (Step S805).

Since the transfer determination bit (PJ) is specified to then use this transfer determination bit (PJ) as mentioned above, the path selecting section 13 can substantially attain the operation for determining whether or not the transfer can be done in accordance with the transfer inhibition bit sequence (PX), similarly to the first embodiment, if any fault does not occur on the transfer path (P), and avoiding the allocation and the transfer of the stream to the transfer path (P) having the fault in accordance with the transfer path status bit sequence (PD) if any fault occurs on the corresponding transfer path (P), under the same flow.

Therefore, after the specification of the transfer determination bit (PJ) as mentioned above, the path selecting section 13 determines whether or not the transfer determination bit (PJ) is the state bit indicating [Transfer Inhibition State], similarly to the second embodiment (Step S405).

As the determined result at this step S405, if the transfer determination bit (PJ) is at [Transfer Allowance State] (Step S405; No), the path selecting section 13 sets the temporary transfer path number (PN) as the effective transfer path number (PN), and outputs this transfer path (PN) to the output unit selecting section 14 (Step S808). Here, as mentioned above, the transfer path number (PN) is composed of the same information as the transfer path (P). Therefore, the output unit selecting section 14 can execute the transfer on the basis of the input transfer path number (PN).

After that, similarly to the first embodiment, the output unit selecting section 14 transfers the packet on the basis of the input transfer path (P) (Step S16).

As the determined result at the step S405, if the transfer determination bit (PJ) is at [Transfer Inhibition State] (Step S405; Yes), the path selecting section 13 refers to the allocation stream count (PC) from the transfer path table 133, in accordance with the combination of the multi-path identifier (M) and the temporary transfer path number (PN), and subtracts 1 from this value, and again stores it (Step S8).

Next, the path selecting section 13 recalculates the transfer inhibition bit sequence (PX) and the allocation inhibition bit sequence (AX) on the path allocation table 132, in accordance with the allocation stream count (PC) stored in the transfer path table 133 updated at the step S8, and again stores this re-calculated transfer inhibition bit sequence (PX) and allocation inhibition bit sequence (AX) in the path allocation table 132 (Step S9). The method of re-calculating the transfer inhibition bit sequence (PX) and the allocation inhibition bit sequence (AX) is executed by the process similar to the method described in the first embodiment.

Also, the path selecting section 13 reads out the transfer allocation path number (PA) from the path allocation table 132 based on the multi-path identifier (M), and sets this value as the effective transfer path number (PN) (Step S10). Here, the cache transfer path number (CPN) set as the temporary transfer path number (PN) is discarded, and the transfer path number (PN) is replaced by the transfer allocation path number (PA).

After that, the path selecting section 13 adds one to the allocation stream count (PC) corresponding to the transfer path number (PN) that becomes effective on the transfer path table 133, and again stores it (Step S11).

Moreover, the path selecting section 13 re-calculates the transfer inhibition bit sequence (PX) and the allocation inhibition bit sequence (AX), in accordance with the transfer path table 133 re-calculated at the step S11, and updates the path allocation table 132 based on this value (Step S12). The method of re-calculating the transfer inhibition bit sequence (PX) and the allocation inhibition bit sequence (AX) is also executed by the process similar to that of the first embodiment.

Similarly to the step S803, the path selecting section 13 compares the transfer path status bit sequence (PD) with the bit sequence generated by inverting the usage path bit sequence (UP) held at the step S801, and determines whether or not there are the bits in which both the same digits are at [1] (Step S806).

Here, if there are the bits in which both are at [1] (Step S806; Yes), the path selecting section 13 reads out the transfer path status bit sequence (PD) from the transfer path state table 137, and also reads out the usage path bit sequence (UP) from the path allocation table 135 based on the multi-path identifier (M). Then, in those two bit sequences, it stores [1] in both the bit in which [1] are stored, and stores [0] in other bits, and accordingly calculates the transfer determination bit sequence (PF) (Step S807).

In this way, as the device for storing [1] in the bits corresponding to both the bits in which [1] are stored, on the transfer determination bit sequence (PF), and storing [0] in the other bits, there may be a method of calculating by inserting an OR circuit for each bit corresponding on a circuit and the like. However, the present invention is not limited to them. Various variations may be done without departing from the spirit and the scope of the present invention.

Also, if there are not the bits in which both are at [1] at the step S806 (Step S806; No), the path selecting section 13 reads out the transfer inhibition bit sequence (PX) from the path allocation table 132 based on the held multi-path identifier (M), and defines this value as the transfer determination bit sequence (PF), similarly to the step S807 (Step S408).

After that, the path selecting section 13 uses the specified transfer determination bit sequence (PF), at the step S409, calculates a next transfer allocation path number (PA), and stores in the path allocation table 132 (Step S409). Here, the method of calculating this next transfer allocation path number (PA) is identical to the method described by using FIG. 28, in the second embodiment. So, the explanation is omitted.

Also, the path selecting section 13, in order to update the cache transfer path number (CPN) on the cache table 120 read out at the step S4 to the transfer path number (PN) re-allocated at the step S10, outputs this re-allocated transfer path number (PN) as the update path number (PU) to the cache table access section 12. On the contrary, the cache table access section 12, in accordance with the multi-path identifier (M) and the stream identifier (S) held in the register and the like, stores the update path number (PU) inputted from the path selecting section 13 in the corresponding cache transfer path number (CPN) in the data section, and updates it (Step S14).

After that, the path selecting section 13 outputs the effective transfer path number (PN) to the output unit selecting section 14, as mentioned above (Step S808). On the contrary, the output unit selecting section 14 transfers the packet, in accordance with the input transfer path (P) (Step S16).

Moreover, as the determined result at the step S803, if there are the bits in which both are at [1] (Step S803; Yes), the path selecting section 13 proceeds to the step S10. Then, as mentioned above, it sets the transfer allocation path number (PA) read out from the path allocation table 132 based on the multi-path identifier (M) as the effective transfer path number (PN) (Step S10). After that, it adds one to the allocation stream count (PC) corresponding on the transfer path table 133, and again stores it (Step S11), and further re-calculates the transfer inhibition bit sequence (PX) and the allocation inhibition bit sequence (AX) in accordance with the transfer path table 133 re-calculated at the step S11, and again stores it (Step S12).

Next, the path selecting section 13 determines whether or not there are the bits in which both are at [1], similarly to the step S803 (Step S806). If there are the bits in which both are at [1] (Step S806; Yes), it reads out the transfer path status bit sequence (PD) and the usage path bit sequence (UP), and defines a component in which this "OR" is removed, as the transfer determination bit sequence (PF) (Step S807). Also, as the determined result at the step S806, if there are not the bits in which both are at [1] (Step S806; No), it reads out the allocation inhibition bit sequence (AX), and defines this as the transfer determination bit sequence (PF) (Step S408). After that, at the step S409, it uses this transfer determination bit sequence (PF), calculates a next transfer allocation path number (PA), and stores it (Step S409).

Also, the path selecting section 13, in order to update the cache transfer path number (CPN) on the cache table 120 read out at the step S4, outputs the update path number (PU) to the cache table access section 12. On the contrary, the cache table access section 12 stores the update path number (PU) in the corresponding data section (Step S14). After that, the path selecting section 13 outputs the effective transfer path number (PN) to the output unit selecting section 14 (Step S808).

On the contrary, the output unit selecting section 14 transfers the packet based on the input transfer path (P) (Step S16).

As mentioned above, as evident from the operations explained by using the drawings, for example, if the fault occurs on the transfer path (P)=[5] as shown in FIG. 29, the path selecting section 13 stores the bits indicating [Transfer Inhibition State] in the bit corresponding to the transfer path number (PN)=[5] in the transfer path status bit sequence (PD) of the transfer path state table 137. Therefore, in the transfer path state table 137, the respective parameters are changed as shown in FIG. 35.

Therefore, if the allocation change is performed on the packet in which the allocation of the transfer path (P) must be changed, the transfer path (P) to be re-allocated is specified by referring to the transfer path status bit sequence (PD) and the usage path bit sequence (UP), independently of the transfer inhibition bit sequence (PX) and the allocation inhibition bit sequence (AX).

When the above-mentioned explanations are abstracted, in the third embodiment, when the transfer destination is allocated in accordance with the load distribution allocation ratio to the stream needing the change of the allocated transfer path (P) because of the occurrence of the fault similar to the second embodiment, the effect resulting from the execution of the allocation changing process in accordance with the load distribution allocation ratio at the high speed can be attained by using a smaller memory capacity.

The reason why the re-calculating process using the software is unnecessary similarly to the second embodiment is as follows. That is, when it is determined whether or not the allocated transfer path (P) needs to be changed because of the occurrence of the fault, instead of the execution of the allocation change determination based on the allocation inhibition bit sequence (AX) as described in the first embodiment, if the fault report signal from the physical link included on the route of the transfer path (P) is used as the trigger, and the allocation change determination is executed on the basis of the transfer path status bit sequence (PD), and the transfer destination is allocated in accordance with the load distribution allocation to the stream needing the change of the allocated transfer path (P) because of the occurrence of the fault, instead of the execution of the allocation change based on the allocation inhibition bit sequence (AX) as described in the first embodiment, the fault report signal from the physical link included on the route of the transfer path (P) is used as the trigger, and then the process for allocating to another transfer path (P) is executed on the basis of the transfer path status bit sequence (PD) and the usage path bit sequence (UP). Therefore, the path selecting section 13 need not refer to the transfer inhibition bit sequence (PX) and the allocation inhibition bit sequence (AX) where the value is changed because of the update of the maximum stream count (PH).

Moreover, the third embodiment can provide the similar effect by using the smaller memory capacity, as compared with the second embodiment. This reason is as follows. That is, the transfer path (P) and the transfer path number (PN) correspond to each other in the one-to-one relationship. Therefore, the table is not required to specify the correspondence between the transfer path number (PN), the multi-path identifier (M) and the transfer path (P) having the actual fault, and the correspondence between the transfer path (P) and the allocated transfer path number (PN). It is further possible to collectively manage the transfer path status bit sequence (PD).

<Fourth Embodiment>

In a fourth embodiment, data to perform an aging process on the data section of the cache table 120 is set in the above-mentioned respective embodiments. Due to this configuration, the cache table access section 12 sets a transfer path number (PN) of a transfer path (P) at which a packet does not arrive in a certain time, at [Non-Registered State] so that a transfer path can be flexibly allocated depending on the circumstance.

Therefore, the cache table access section 12, when the transfer path number (PN) in the cache table 120 is set at [Non-Registered State], reports a deleted transfer path number (PN) and a multi-path identifier (M) corresponding to this deleted transfer path number (PN) to the path selecting section 13. The path selecting section 13 receiving this report subtracts 1 from the proper allocation stream count (PC) in the transfer path table 131.

When the allocation stream count (PC) is updated, the transfer inhibition bit sequence (PX) and the allocation inhibition bit sequence (AX) in the path allocation table 130 are updated as described in the first embodiment.

Accordingly, in the fourth embodiment, at the times of the addition/deletion of the transfer path and the change of the distribution ratio, the transfer path (P) is re-allocated to the stream removed by the aging. Therefore, it is possible to reduce the deterioration rate.

<Fifth Embodiment>

With regard to the transfer path determining method in the path selecting section 13 described in the explanation of the above-mentioned respective embodiments, an example using another device will be described below as a fifth embodiment.

The fifth embodiment is designed so as to remove the data of the continuous allocation count (PS) from the path allocation table 130, and remove the data of the maximum continuous allocation count (PW) from the transfer path table 131, and thereby reduce the memory capacity.

Therefore, the process for allocating the transfer path (P) changes the transfer path (P) targeted for the allocation each time one stream is allocated to the transfer path (P). That is, it is assumed that only one stream is continuously allocated to the transfer path (P).

Also, it is designed to update the transfer allocation path number (PA) for each allocation of a transfer path (P). Therefore, it is designed to be precisely driven for the transfer allocation path number (PA) changed for each allocation of one stream. Here, the method of updating the transfer allocation path number (PA) is similar to that of the first embodiment. So, its explanation is omitted in this embodiment.

<Sixth Embodiment>

Also, in a sixth embodiment, still another device is exemplified with regard to the transfer path determining method in the path selecting section 13.

The sixth embodiment is designed so as to remove the data of the continuous allocation count (PS) from the path allocation table 130, and remove the data of the maximum continuous allocation count (PW) from the transfer path table 131, and thereby reduce the memory capacity.

Therefore, in the process for allocating the transfer path (P), when the allocation to a certain transfer path number (PN) is started, it is continuously allocated until the allocation stream count (PC) reaches the maximum stream count (PH). After that, when the allocation stream count (PC) reaches the maximum stream count (PH), the transfer allocation path number (PA) is updated. Then, the operational flow proceeds to the allocation to another transfer path number (PN).

At this time, as the selection/determination of the transfer allocation path number (PA), there may be a method of selecting the transfer allocation path number (PA) having the greatest value, a method of selecting in an order starting with the smallest number of the multi-path identifier (M) and the like. Here, the method of updating the transfer allocation path number (PA) is similar to that of the first embodiment. So, its explanation is omitted in this embodiment.

<Seventh Embodiment>

Also, in a seventh embodiment, still another device is exemplified with regard to the transfer path determining method in the path selecting section 13.

The seventh embodiment is designed so as to remove the data of the continuous allocation count (PS) from the path allocation table 130, and remove the data of the maximum continuous allocation count (PW) from the transfer path table 131, and thereby reduce the memory capacity.

Therefore, whenever the process for allocating the transfer path (P) is done, the transfer allocation path number (PA) held in the transfer path table 131 is updated. Hence, the path selecting section 13 calculates [Allocation Rate (=Allocation Stream Number/Maximum Stream Number)] for all the transfer path numbers in the targeted multi-path identifier (M), and updates the smallest allocation rate as the transfer allocation path number (PA), and stores it.

Due to the execution of the above-mentioned processes, it is possible to execute the process for allocating the transfer path (P), while maintaining the final distribution ratio for each transfer path determined from the maximum stream count (PH), even in the course of the allocation of the transfer path.

Advantageous Effects of the Invention

As mentioned above, according to the data-gram relaying apparatus and the data-gram relaying method based on the present invention, in the case of the occurrence of the addition/deletion of the transfer path, or in the case of the occurrence of the change in the distribution ratio for each transfer path, it is possible to avoid the transfer to the transfer path (P) at [Transfer Inhibition State] and thereby possible to allocate to another transfer path (P), by changing only the transfer path table 131 and the path allocation table 130 in the path selecting section 13, without changing the correspondence between the transfer path (P) and the multi-path identifier (M) held in the cache table 120.

Therefore, in the present invention, with regard to the streams already allocated to the transfer path (P) changed to [Transfer Inhibition State] immediately after the change of the transfer path table 131 and the path allocation table 130 in the path selecting section 13, it is possible to change so as to allocate only the minimum number of streams among those allocated streams to another transfer path (P). Hence, it is possible to attain the allocating process of the transfer path (P) in accordance with the load distribution ratio minimizing the deterioration ratio.

Also, in the process for executing the allocation change of the transfer path (P) in the present invention, in order to carry out the allocation change of the transfer path (P) for each arrival of the data-gram having the stream identifier (S) allocated to the transfer path (P) changed to [Transfer Inhibition State], after the change of the transfer path table 131 and the path allocation table 130 in the path selecting section 13, it is not necessary to perform the similar process for changing the allocation of the transfer path (P) on the data-gram having the same stream identifier (S) as the data-gram on which the allocation change is once performed. Moreover, with regard to the data-gram needing the change of the transfer path (P), the transfer path number (PN) corresponding to the combination of the multi-path identifier (M) and the stream identifier (S) to be required is updated to the newly required transfer path number (PN). Therefore, after the update, the data-gram on which the allocation changing process is performed is never sent out to the network without any change of the transfer path (P).

Moreover, the present invention is designed such that the path selecting section 13 manages the maximum continuous allocation count (PW) of the streams for each transfer path and allocates the streams by each maximum continuous allocation count (PW). Therefore, the transfer path (P) can be allocated in accordance with the load distribution ratio only by referring to the maximum of two transfer path entries, without referring to all the entries of the transfer path numbers (PN) managed by the multi-path identifier (M). Therefore, the entry can be updated in a short time.

In view of the above-mentioned circumstances, the first embodiment can provide the following three effects.

At first, as the first effects, when the transfer path is added or deleted, or when the setting ratio is changed, the operation according to the present invention enables the setting of only the minimum packets to be changed. Therefore, it is possible to attain the packet transfer minimizing the deterioration rate.

This is because the transfer path for each stream can be individually set by using the cache table.

Also, as the second effect, when the transfer path is added or deleted, or when the setting ratio is changed, the reflection of the setting can be done at the high speed.

This reason is as follows. That is, due to the installation of the device for determining the transfer inhibition state for each transfer path, it is enough to change the setting of only the table managed by the path selecting section without directly updating the cache table in which it takes a long time to update.

Also, as the third effect, the process for allocating the transfer path based on the set distribution ratio can be installed by using the small number of memory accesses and the easy hardware circuit.

This is because the allocation of the transfer path is attained by using the following two procedures. At first, the first procedure is the procedure for updating the allocation inhibition bit sequence corresponding to the transfer path in which the allocation stream count is changed, and then carrying out the allocation change determination based on this updated allocation inhibition bit sequence. Therefore, the allocation changing process targets only the maximum of two transfer path numbers of the cache transfer path number and the transfer allocation path number for each packet process. And, the second procedure is the procedure for attaining the update of the transfer allocation path number based on the ratio of the maximum stream count of the transfer path table, in accordance with the order of the transfer path number, on the basis of the allocation inhibition bit sequence. Those two procedures can be both processed by the small number of overheads and attained by the simple configuration. Moreover, the memory reference does not require the wide bit width for the memory interface. Therefore, it is possible to process and attain at the high speed.

In the second embodiment, the channel identifier (C) for individually identifying the physical links connected to the data-gram relaying device 4 is managed on the channel path table 134, correspondingly to the multi-path identifier (M) and the transfer path number (P). Moreover, the transfer path status bit sequence (PD) indicating whether or not the fault occurs on the transfer path (P) corresponding to the channel identifier (C) is managed on the path allocation table 132, correspondingly to the multi-path identifier (M).

Also, the second embodiment is designed as follows. That is, when the fault occurs in any section of the transfer path (P) managed by a certain multi-path identifier (M), the transfer inhibition determination for determining whether or not the transfer to the transfer path number (P) is possible refers to the transfer path status bit sequence (PD) instead of the transfer inhibition bit sequence (PX). Moreover, the process for allocating the transfer path (P) refers to the transfer path status bit sequence (PD) instead of the allocation inhibition bit sequence (AX).

Accordingly, in the second embodiment, when any fault occurs on the transfer path (P), after the update of the transfer path status bit sequence (PD), if the transfer destination is allocated in accordance with the load distribution allocation ratio to the stream needing the change of the allocated transfer path (P) because of the occurrence of the fault, it is not necessary to execute the re-calculating process using the software of the maximum stream count (PH) covered by each transfer path (P). Therefore, the allocation changing process can be executed in accordance with the load distribution allocation ratio at the high speed.

The reason why the re-calculating process using the software is unnecessary as mentioned above is as follows. That is, when it is determined whether or not the allocated transfer path (P) needs to be changed because of the occurrence of the fault, instead of the execution of the allocation change determination based on the allocation inhibition bit sequence (AX) as described in the first embodiment, if the fault report signal from the physical link included on the route of the transfer path (P) is used as the trigger, and the allocation change determination is executed on the basis of the transfer path status bit sequence (PD), and the transfer destination is allocated in accordance with the load distribution allocation to the stream needing the change of the allocated transfer path (P) because of the occurrence of the fault, instead of the execution of the allocation change based on the allocation inhibition bit sequence (AX) as described in the first embodiment, the fault report signal from the physical link included on the route of the transfer path (P) is used as the trigger, and then the process for allocating to another transfer path (P) is executed on the basis of the transfer path status bit sequence (PD). Therefore, the path selecting section 13 need not to refer to the transfer inhibition bit sequence (PX) and the allocation inhibition bit sequence (AX) where the value is changed because of the update of the maximum stream count (PH).

Also, in the second embodiment, the path selecting section 13 stores [Trouble State] in the operation mode (AM) when any fault occurs on any transfer path (P) divided into the corresponding multi-path identifier (M). Also, the path selecting section 13 specifies the transfer path number (PN) and the multi-path identifier (M) corresponding to the channel identifier (C) having the fault, in accordance with the channel path table 134. In accordance with this specified multi-path identifier (M), in the path allocation table 132, the path selecting section 13 specifies the transfer path status bit sequence (PD), and further stores the state bit indicating [Transfer Inhibition State] in the bit corresponding to the specified transfer path number (PN) on the transfer path status bit sequence (PD).

In the second embodiment, the above-mentioned operations enable the bit on the transfer path status bit sequence (PD) corresponding to the transfer path number (PN) correlated to the transfer path (P) having the fault to be at [Transfer Inhibition State], and thereby enable the transfer to this transfer path (P) to be avoided.

Also, the third embodiment is designed such that the transfer path number (PN) corresponds to the transfer path (P) set in the data-gram transferring device 4 in the one-to-one relationship, and the transfer path status bit sequence (PD) is not divided into the multi-path identifier (M) and it is collectively managed in the register of the path selecting section 13 and the like.

For this reason, as compared with the second embodiment, the third embodiment is designed so as to remove the channel path table 134 connected to the path selecting section 13, the operation mode (AM) and the transfer path status bit sequence (PD) on the path allocation table 132, and the transfer path (P) on the transfer path table 133, and newly install the usage path bit sequence (UP) on the transfer path table 136 and further manage the transfer path state table 137 on the path selecting section 13 and thereby reduce the necessary memory capacity.

Also, the transfer path number (PN) and the transfer path (P) are composed of the same information so that the transfer path number (PN) and the transfer path (P) correspond to each other in the one-to-one relationship.

In this way, the third embodiment is designed as follows. That is, in the process for changing the allocation of the transfer path (P) when any fault occurs on any portion of the transfer path (P) managed by a certain multi-path identifier (M), the path selecting section 13 carries out the allocation change determination for determining whether or not the allocation change is performed on the packet, in accordance with the transfer path status bit sequence (PD) in which the setting of the bit corresponding to the transfer path (P)

specified by the input fault report signal is changed to [Transfer Inhibition State], and the usage path bit sequence (UP) indicative of the transfer path (P) under usage. If it is determined in this determination that the transfer path (P) to be allocated is changed, the process for changing the allocation of the transfer path (P) uses the transfer path status bit sequence (PD) to be allocated and the usage path bit sequence (UP), and then specifies the transfer path (P) to be re-allocated.

Due to the above-mentioned configuration, in the third embodiment, when the transfer destination is allocated, in accordance with the load distribution allocation ratio, to the stream needing the change of the allocated transfer path (P) because of the occurrence of the fault similar to the second embodiment, the effect resulting from the execution of the allocation changing process in accordance with the load distribution allocation ratio at the high speed can be attained by using the smaller memory capacity.

The reason why the re-calculating process using the software is unnecessary similarly to the second embodiment is as follows. That is, when it is determined whether or not the allocated transfer path (P) needs to be changed because of the occurrence of the fault, instead of the execution of the allocation change determination based on the allocation inhibition bit sequence (AX) as described in the first embodiment, if the fault report signal from the physical link included on the route of the transfer path (P) is used as the trigger, and the allocation change determination is executed on the basis of the transfer path status bit sequence (PD), and the transfer destination is allocated in accordance with the load distribution allocation to the stream needing the change of the allocated transfer path (P) because of the occurrence of the fault, instead of the execution of the allocation change based on the allocation inhibition bit sequence (AX) as described in the first embodiment, the fault report signal from the physical link included on the route of the transfer path (P) is used as the trigger, and then the process for allocating to another transfer path (P) is executed on the basis of the transfer path status bit sequence (PD) and the usage path bit sequence (UP). Therefore, the path selecting section 13 need not refer to the transfer inhibition bit sequence (PX) and the allocation inhibition bit sequence (AX) where the value is changed because of the update of the maximum stream count (PH).

Moreover, the third embodiment can provide the similar effect by using the smaller memory capacity, as compared with the second embodiment. This reason is as follows. That is, the transfer path (P) and the transfer path number (PN) correspond to each other in the one-to-one relationship. Therefore, the table is not required to specify the correspondence between the transfer path number (PN), the multi-path identifier (M) and the transfer path (P) having the actual fault, and the correspondence between the transfer path (P) and the allocated transfer path number (PN). It is further possible to collectively manage the transfer path status bit sequence (PD).

In the fourth embodiment, the data to perform the aging process on the data section of the cache table 120 is set in the above-mentioned respective embodiments. Due to this configuration, the cache table access section 12 sets the transfer path number (PN) of the transfer path (P) at which the packet does not arrive in a certain time, at [Non-Registered State] so that the transfer path can be flexibly allocated depending on the circumstance.

Therefore, in the fourth embodiment, at the times of the addition/deletion of the transfer path and the change of the distribution ratio, the transfer path (P) is re-allocated to the stream removed by the aging. Therefore, it is possible to reduce the deterioration rate.

Also, in the fifth embodiment, the process for allocating the transfer path (P) changes the transfer path (P) targeted for the allocation each time one stream is allocated to the transfer path (P). That is, it is assumed that only one stream is continuously allocated to the transfer path (P).

Therefore, the fifth embodiment is designed so as to remove the data of the continuous allocation count (PS) from the path allocation table 130, and remove the data of the maximum continuous allocation count (PW) from the transfer path table 131, and thereby reduce the memory capacity.

Also, in the sixth embodiment, in the process for allocating the transfer path (P), when the allocation to a certain transfer path number (PN) is started, it is continuously allocated until the allocation stream count (PC) reaches the maximum stream count (PH). After that, when the allocation stream count (PC) reaches the maximum stream count (PH), the transfer allocation path number (PA) is updated. Then, the operational flow proceeds to the allocation to another transfer path number (PN).

Therefore, the sixth embodiment is designed so as to remove the data of the continuous allocation count (PS) from the path allocation table 130, and remove the data of the maximum continuous allocation count (PW) from the transfer path table 131, and thereby reduce the memory capacity The seventh embodiment is designed so as to remove the data of the continuous allocation count (PS) from the path allocation table 130, and remove the data of the maximum continuous allocation count (PW) from the transfer path table 131, and thereby reduce the memory capacity.

Therefore, whenever the process for allocating the transfer path (P) is done, the transfer allocation path number (PA) held in the transfer path table 131 is updated. Hence, the path selecting section 13 calculates [Allocation Rate (=Allocation Stream Number/Maximum Stream Number)] for all the transfer path numbers in the targeted multi-path identifier (M), and updates the smallest allocation rate as the transfer allocation path number (PA), and stores it.

Due to the execution of the above-mentioned processes, it is possible to execute the process for allocating the transfer path (P), while maintaining the final distribution ratio for each transfer path determined from the maximum stream count (PH), even in the course of the allocation of the transfer path.

What is claimed is:

1. A datagram relaying apparatus comprising:
 a plurality of protocol terminating units; and
 a destination determining processor which comprises:
  a path selecting section to determine a transfer destination route for a stream of packets received from any of said protocol terminating units based on a combination of a stream identifier and a multi-path identifier associated with the received stream of packets, wherein said path selecting section is configured to determine whether transfer of said received stream of packets to said transfer destination route is in an inhibition state, and select another transfer destination route when the transfer of the stream of packets to said transfer destination route is in the inhibition state.

2. A datagram relaying apparatus according to claim 1, wherein said path selecting section determines said transfer destination route or said another transfer destination route based on a load distribution ratio previously set for each said transfer destination route.

3. A datagram relaying apparatus according to claim 2, wherein said path selecting section manages a stream count being currently allocated and a maximum stream count to be allocated, for each said transfer destination route, and determines whether or not the transfer of said received steam of packets to said transfer destination route is in the inhibition state, based on comparison between the stream count being currently allocated and the maximum stream count to be allocated.

4. A datagram relaying apparatus according to claim 3, wherein said path selecting section determines that the transfer of said received stream of packets to said transfer destination route is in the inhibition state, when the stream count being currently allocated is greater than the maximum stream count to be allocated.

5. A datagram relaying apparatus according to claim 4, wherein said path selecting section determines whether or not the transfer of said received stream of packets to said another transfer destination route is in the inhibition state, when determining said another transfer destination route for said received stream of packets.

6. A datagram relaying apparatus according to claim 1, wherein said path selecting section manages a stream count being currently allocated and the maximum stream count to be allocated, for each said transfer destination route, and determines whether or not the transfer of said received stream of packets to said another transfer destination route is in the inhibition state, based on the comparison between the stream count being currently allocated and the maximum stream count to be allocated.

7. A datagram relaying apparatus according to claim 1, wherein said path selecting section manages a stream count being currently allocated and a maximum stream count to be allocated, for each said transfer destination route, and determines that the transfer of said received stream of packets to said another transfer destination route is in the inhibition state when the stream count being currently allocated is equal to or greater than the maximum stream count to be allocated.

8. A datagram relaying apparatus according to claim 1, wherein said path selecting section monitors whether or not a fault has occurred on said transfer destination route, and assigns a stream of packets allocated to said transfer destination route to said another transfer destination route when said fault has occurred on said transfer destination route.

9. A datagram relaying apparatus according to claim 8, wherein said path selecting section manages whether or not said fault has occurred, for every transfer destination route, and determines said another transfer destination route based on said faults managed for the respective transfer destination routes.

10. A datagram relaying apparatus according to claim 9, wherein said path selecting section manages the transfer destination routes individually based on single data.

11. A datagram relaying apparatus according to claim 1, wherein said path selecting section determines said another transfer destination route based on a predetermined order.

12. A datagram relaying apparatus according to claim 1, wherein said path selecting section manages a maximum stream count to be continuously allocated, for each said transfer destination route, and continuously determines said another transfer destination route for said received stream of packets based on the maximum stream count to be continuously allocated, and then determines still another transfer destination route for another received stream of packets.

13. A datagram relaying apparatus according to claim 1, wherein said path selecting section changes said transfer destination route each time said transfer destination route is determined.

14. A datagram relaying apparatus according to claim 1, wherein said path selecting section manages a stream count being currently allocated and a maximum stream count to be allocated, for each said transfer destination route, and after continuously allocating said another transfer destination route until the stream count being currently allocated reaches the maximum stream count to be allocated, determines a still another transfer destination route.

15. A datagram relaying apparatus according to claim 1, wherein said path selecting section calculates an allocation rate of a stream count being currently allocated to a load distribution ratio for each said transfer destination route, and determines said transfer destination route having a smallest allocation rate as said another transfer destination route, when determining said another transfer destination route for said received stream of packets.

16. A datagram relaying apparatus according to claim 1, wherein said path selecting section manages a stream count being currently allocated and a maximum stream count to be allocated, for each said transfer destination route, and determines said transfer destination route having a smallest value when the stream count being currently allocated is divided by the maximum stream count to be allocated, as said another transfer destination route.

17. A datagram relaying apparatus according to claim 1, wherein said path selecting section discards a correspondence between said transfer destination route and said received stream of packets when a packet does not arrive for a predetermined time.

18. A datagram relaying apparatus comprising:
a plurality of protocol terminating units;
a destination address extracting section to identify a destination address within a packet received from one of said protocol terminating units;
a stream identifier calculating section to determine a stream identifier to identify a stream associated with the packet;
a route determining section to determine a multi-path identifier to uniquely identify a plurality of transfer destination routes based on said destination address;
a path selecting section to:
  identify one of the transfer destination routes, as a transfer path, for said packet based on said multi-path identifier and said stream identifier,
  determine whether transfer of the packet on the transfer path is inhibited, and
  identify another one of the transfer destination routes, as the transfer path, for the packet when transfer of the packet on the transfer path is inhibited; and
an output section selector to transfer the packet to said transfer path.

19. A datagram relaying apparatus according to claim 18, further comprising an allocation inhibition bit string memory which stores said multi-path identifier and an allocation inhibition bit string indicating whether allocation of said packet to said transfer path is in an inhibition state for each said transfer destination route,
wherein said path selecting section is configured to read said allocation inhibition bit string based on said multi-path identifier to determine whether transfer of the packet on the transfer path is inhibited.

20. A datagram relaying apparatus according to claim 18, further comprising:
an allocation stream count memory to store said multi-path identifier, a transfer path number corresponding to the transfer path, and an allocation stream count indicating a stream count being currently allocated to said transfer path number; and a maximum stream count memory to store said multi-path identifier, said transfer path number, and a maximum stream count indicating a maximum stream count to be allocated to said transfer path number, wherein said path selecting section reads said allocation stream count and said maximum stream count and compares the allocation stream count with said maximum stream count, when said allocation stream count is greater than said maximum stream count, the path selecting section stores an indicator that transfer of said packet to said transfer path is in an inhibition state, and when said allocation stream count is less than said maximum stream count, the path selecting section stores an indicator that the transfer of the packet to said transfer path is in a permission state.

21. A datagram relaying apparatus according to claim 19, wherein said path selecting section is configured to store an indication that the allocation of said packet to said transfer path is in the inhibition state in said allocation inhibition bit string when an allocation stream count is equal to or greater than a maximum stream count, and store an indication that the allocation of the packet to said transfer path is in a permission state in said allocation inhibition bit string when said allocation stream count is less than said maximum stream count.

22. A datagram relaying apparatus according to claim 20, wherein said path selecting section updates the transfer path number by either adding or subtracting one to or from said allocation stream count compares said added or subtracted allocation stream count with said maximum stream count, and updates said inhibition state based on the comparison result.

23. A datagram relaying apparatus according to claim 20, wherein said path selecting section reads said allocation stream count and said maximum stream count for each transfer path number associated with each of the transfer destination routes based on said multi-path identifier, divides the allocation stream count by said maximum stream count to calculate an allocation rate for each said transfer path number, and determines a transfer allocation path number based on said transfer path number with a smallest allocation rate.

24. A datagram relaying apparatus according to claim 18, further comprising:

a continuous allocation count memory to store said multi-path identifier and a continuous allocation count indicating a stream count continuously allocated to a transfer path number associated with the transfer path until a current time; and a maximum continuous allocation count memory to store said multi-path identifier, said transfer path number, and a maximum continuous allocation count indicating the maximum stream count continuously allocated to said transfer path number, wherein said path selecting section adds one to said continuous allocation count corresponding to said multi-path identifier, compares the added continuous allocation count with said maximum continuous allocation count, specifies said transfer path number in which the allocation of said packet is not in an inhibition state when said continuous allocation count is equal to or greater than said maximum continuous allocation count, and determines a transfer allocation path number corresponding to said multi-path identifier based on the specified transfer path number.

25. A datagram relaying apparatus according to claim 18, further comprising:

a channel identifier memory to store a channel identifier corresponding to said transfer path said multi-path identifier, and a transfer path number associated with the transfer path;

an operation mode memory to store said multi-path identifier and an operation mode indicating whether or not a fault has occurred on a physical link corresponding to said transfer path; and wherein said path selecting section specifies said channel identifier corresponding to said transfer path corresponding to said physical link having said fault based on a fault occurrence report signal from said physical link, determines said transfer path number and said multi-path identifier corresponding to the specified channel identifier from said channel identifier memory, and updates said operation mode corresponding to the specified multi-path identifier to a fault occurrence state.

26. A datagram relaying apparatus according to claim 25, further comprising:

a transfer path state bit string memory to store said multi-path identifier and a transfer path state bit string indicating whether allocation of said packet and transfer of said packet for each transfer path number associated with each of the transfer destination routes are in an inhibition state because of a fault occurrence, wherein said path selecting section reads said transfer path state bit string based on said multi-path identifier, when the transfer path state bit string indicates that the allocation and transfer of said packet are not in the inhibition state, the path selecting section determines a transfer allocation path number corresponding to said multi-path identifier based on said transfer path number.

27. A datagram relaying apparatus according to claim 18, further comprising:

a usage path bit string memory to store said multi-path identifier and a usage path bit string indicating one or more of said transfer destination routes corresponding to the multi-path identifier, wherein a transfer path number corresponds to each of said transfer destination routes, said path selecting section reads the usage path bit string based on said multi-path identifier received from said route determining section when said packet is received from said one of said protocol terminating units, determines presence or absence of said transfer path which is used in the usage path bit string, in the case of the presence of said transfer path which is used in said usage path bit string the path selecting section determines a transfer allocation path number based on said multi-path identifier, updates said transfer path number based on the transfer allocation path number, and outputs the updated transfer path number to said output section selector, and said output section selector transfers said packet based on said transfer path number received from said path selecting section.

28. A datagram relaying apparatus according to claim 19, wherein said allocation inhibition bit string includes a number of bits equal to or greater than a number of said transfer path numbers divided by the corresponding multi-path identifier, and in each of the respective bits constituting said allocation inhibition bit string, each of the respective bits corresponds to said transfer path number divided by said multi-path identifier.

29. A datagram relaying apparatus according to claim 26, wherein said transfer path state bit string includes a number of bits equal to or greater than a number of said transfer path numbers divided by the corresponding multi-path identifier, and in each of the respective bits constituting said transfer path state bit string, each of the respective bits corresponds to said transfer path number divided by said multi-path identifier.

30. A datagram relaying apparatus according to claim 18, further comprising:
   an aging processing section to determine when a packet for said transfer path and associated with said multi-path identifier corresponding to said transfer path is not transferred for a predetermined time, and set an indicator corresponding to said transfer path and the multi-path identifier to a non-registered state.

31. A datagram relaying apparatus according to claim 30, wherein said path selecting section subtracts one from an allocation stream count corresponding to a transfer path number associated with said transfer path and said multi-path identifier associated with the packet that is not transferred for said predetermined time, and updates a memory based on the subtracted allocation stream count.

32. A datagram relaying method comprising:
   receiving a stream of packets;
   determining a transfer destination route for said received stream of packets based on a combination of a stream identifier and a multi-path identifier associated with the received stream of packets;
   wherein said determining a transfer destination route also includes:
   determining whether the transfer of said received stream of packets to the determined transfer destination route is in an inhibition state; and
   determining another transfer destination route, when the transfer of said received stream of packets to said transfer destination route is in the inhibition state.

33. A datagram relaying method according to claim 32, wherein said determining a transfer destination route includes:
   determining said transfer destination route or said another transfer destination route based on a load distribution ratio preliminarily set for each said transfer destination route.

34. A datagram relaying method according to claim 32, wherein said determining a transfer destination route includes:
   determining whether or not the transfer of said received stream of packets to said transfer destination route is in the inhibition state based on a comparison between a stream count being currently allocated and a maximum stream count to be allocated, which are managed for each said transfer destination route.

35. A datagram relaying method according to claim 32, wherein said determining a transfer destination route includes:
   determining that the transfer of said received stream of packets to said transfer destination route is in the inhibition state, when a stream count being currently allocated is greater than a maximum stream count to be allocated.

36. A datagram relaying method according to claim 32, wherein said determining a transfer destination route includes:
   determining whether allocation of said received stream to said another transfer destination route is in the inhibition state.

37. A datagram relaying method according to claim 32, wherein said determining a transfer destination route includes:
   determining whether the allocation of said received stream of packets to said another transfer destination route is in the inhibition state based on a comparison between a stream count being currently allocated and a maximum stream count to be allocated, which are managed for each said transfer destination route, when said another transfer destination route is determined for said received stream of packets.

38. A datagram relaying method according to claim 32, wherein said determining a transfer destination route includes:
   determining that the allocation of said received stream of packets to said another transfer destination route is in the inhibition state, when a stream count being currently allocated which is managed for each said transfer destination route is equal to or greater than a maximum stream count to be allocated which is managed for each said transfer destination route.

39. A datagram relaying method according to claim 32, wherein said determining a transfer destination route includes:
   allocating said received stream of packets allocated to said transfer destination route to said another transfer destination route, when a fault has occurred on said transfer destination route.

40. A datagram relaying method according to claim 32, wherein said determining a transfer destination route includes:
   determining said another transfer destination route based on a fault occurrence managed for each said transfer destination route, when said another transfer destination route is determined.

41. A datagram relaying method according to claim 32, wherein said transfer destination route is managed individually based on each packet in the received stream of packets.

42. A datagram relaying method according to claim 32, wherein said determining a transfer destination route includes:
   determining said another transfer destination route based on a preset predetermined order.

43. A datagram relaying method according to claim 32, wherein said determining a transfer destination route includes:
   continuously determining said another transfer destination route for said received stream of packets based on a maximum stream count to be continuously allocated, which is managed for each said transfer destination route; and
   determining still another transfer destination route for said received stream of packets.

44. A datagram relaying method according to claim 32, wherein said determining a transfer destination route includes:
   changing said transfer destination route every time, when said another transfer destination route is determined for said received stream of packets.

45. A datagram relaying method according to claim 32, wherein said determining a transfer destination route includes:
   determining other transfer destination routes, until a stream count being currently allocated which is managed for each said transfer destination route reaches a maximum stream count to be allocated which is managed for each said transfer destination route.

46. A datagram relaying method according to claim 32, wherein said determining a transfer destination route includes:

calculating an allocation rate of a stream count being currently allocated to a load distribution ratio for each said transfer destination route, when said another transfer destination route is determined for said received stream of packets; and determining said transfer destination route having a smallest allocation rate as said another transfer destination route.

47. A datagram relaying method according to claim 32, wherein said determining a transfer destination route includes:

determining as said another transfer destination route, said transfer destination route having a smallest value when a stream count being currently allocated which is managed for each said transfer destination route is divided by a maximum stream count to be allocated which is managed for each said transfer destination route, when said another transfer destination route is determined for said received stream of packets.

48. A datagram relaying method according to claim 32, wherein said determining a transfer destination route includes:

discarding a correspondence between said received stream of packets and said transfer destination route when a packet of the received stream of packets does not arrive for a predetermined time.

49. A datagram relaying method comprising:

extracting a destination address from header data of each of received packets of a stream to determine a transfer destination route for the stream of packets;

calculating a stream identifier to identify said stream from said header data of said packets;

determining a multi-path identifier to uniquely identify a a plurality of transfer destination routes based on said destination address;

determining one of the transfer destination routes, as a transfer path, for the stream of packets based on said multi-path identifier and said stream identifier;

determining whether transfer of the stream of packets on the transfer is inhibited;

determining another one of the transfer destination routes, as the transfer path, for the stream of packets when transfer of the stream of packets on the transfer is inhibited; and transferring said received stream of packets to said transfer path.

* * * * *

UNITED STATES PATENT AND TRADEMARK OFFICE
CERTIFICATE OF CORRECTION

PATENT NO. : 6,940,853 B2 Page 1 of 1
DATED : September 6, 2005
INVENTOR(S) : Kenshin Yamada et al.

It is certified that error appears in the above-identified patent and that said Letters Patent is hereby corrected as shown below:

Column 67,
Line 5, "steam" should be -- stream --.

Signed and Sealed this

Twenty-first Day of March, 2006

JON W. DUDAS
*Director of the United States Patent and Trademark Office*